US012769128B2

(12) United States Patent
Pagano et al.

(10) Patent No.: US 12,769,128 B2
(45) Date of Patent: Oct. 20, 2026

(54) SYSTEM AND METHOD FOR HOLOGRAPHIC LASER BACKLIGHT

(71) Applicant: Red Six Aerospace Inc., Orlando, FL (US)

(72) Inventors: Glenn Pagano, Los Angeles, CA (US); David Ryan Bonelli, Hayward, CA (US); Glenn Thomas Snyder, Venice, CA (US)

(73) Assignee: Red Six Aerospace Inc., Orlando, FL (US)

( * ) Notice: Subject to any disclaimer, the term of this patent is extended or adjusted under 35 U.S.C. 154(b) by 0 days.

(21) Appl. No.: 18/587,534

(22) Filed: Feb. 26, 2024

(65) Prior Publication Data

US 2024/0192503 A1 Jun. 13, 2024

Related U.S. Application Data

(63) Continuation-in-part of application No. 18/523,150, filed on Nov. 29, 2023, now abandoned, and a continuation-in-part of application No. 18/523,128, filed on Nov. 29, 2023, and a continuation-in-part of application No. PCT/US2023/081630, filed on Nov. 29, 2023.

(60) Provisional application No. 63/523,738, filed on Jun. 28, 2023, provisional application No. 63/523,759, filed on Jun. 28, 2023, provisional application No. 63/456,165, filed on Mar. 31, 2023, provisional application No. 63/448,025, filed on Feb. 24, 2023, provisional application No. 63/434,645, filed on Dec. 22, 2022, provisional application No. 63/428,606, (Continued)

(51) Int. Cl.

| | |
|---|---|
| ***G02B 27/01*** | (2006.01) |
| ***G02B 27/30*** | (2006.01) |
| ***G02F 1/13357*** | (2006.01) |

(52) U.S. Cl.

CPC ......... *G02B 27/0172* (2013.01); *G02B 27/30* (2013.01); *G02F 1/133605* (2013.01); *G02B 2027/0174* (2013.01)

(58) Field of Classification Search

CPC ................ G02B 27/0172; G02B 27/30; G02B 2027/0174; G02F 1/133605

See application file for complete search history.

(56) References Cited

U.S. PATENT DOCUMENTS

| | | | |
|---|---|---|---|
| 4,997,263 | A | 3/1991 | Cohen |
| 5,499,139 | A | 3/1996 | Chen |

(Continued)

FOREIGN PATENT DOCUMENTS

| | | |
|---|---|---|
| CN | 106324838 | 1/2017 |
| EP | 3264160 B1 | 8/2019 |
| WO | 2023007329 A1 | 2/2023 |

OTHER PUBLICATIONS

International Search Report and Written Opinion of the International Searching Authority mailed Jul. 24, 2024, in International Application No. PCT/US2024/017286.

(Continued)

*Primary Examiner* — Tracie Y Green

(74) *Attorney, Agent, or Firm* — FisherBroyles LLP

(57) ABSTRACT

Aspects of the present inventions relate to back lighting systems for computer displays. Embodiments involve using a laser, expanded and holographic surfaces to generate a plane of light configured to illuminate an LCD display.

9 Claims, 28 Drawing Sheets

Related U.S. Application Data filed on Nov. 29, 2022, provisional application No. 63/428,601, filed on Nov. 29, 2022.

(56) References Cited

U.S. PATENT DOCUMENTS

| | | | | |
|---|---|---|---|---|
| 6,160,666 | A | 12/2000 | Rallison | |
| 9,511,870 | B2 | 12/2016 | Dabaga | |
| 10,437,325 | B2 | 10/2019 | Le Gros | |
| 10,725,308 | B1 | 7/2020 | Trail | |
| 10,732,407 | B1 * | 8/2020 | Wood | G02B 5/30 |
| 11,067,802 | B1 | 7/2021 | Harrison | |
| 2005/0066275 | A1 | 3/2005 | Gannon | |
| 2005/0276448 | A1 | 12/2005 | Pryor | |
| 2006/0017654 | A1 | 1/2006 | Romo | |
| 2007/0236800 | A1 | 10/2007 | Cakmakci | |
| 2008/0273005 | A1 | 11/2008 | Chen | |
| 2011/0077804 | A1 | 3/2011 | He | |
| 2012/0002256 | A1 * | 1/2012 | Lacoste | G03H 1/22 359/489.08 |
| 2012/0212400 | A1 * | 8/2012 | Border | G02B 27/017 345/8 |
| 2013/0278631 | A1 | 10/2013 | Border | |
| 2014/0132629 | A1 | 5/2014 | Pandey | |
| 2014/0140654 | A1 | 5/2014 | Brown | |
| 2015/0187330 | A1 | 7/2015 | Yang | |
| 2016/0306533 | A1 | 10/2016 | Agarwal | |
| 2018/0188542 | A1 * | 7/2018 | Waldern | G06F 3/0433 |
| 2018/0275399 | A1 | 9/2018 | Zhang | |
| 2018/0284440 | A1 | 10/2018 | Popovich | |
| 2019/0179149 | A1 | 6/2019 | Curtis | |
| 2019/0310481 | A1 | 10/2019 | Blum | |
| 2020/0098335 | A1 | 3/2020 | Chen | |
| 2020/0146546 | A1 | 5/2020 | Chene | |
| 2021/0008981 | A1 | 1/2021 | Suzuki | |
| 2021/0049925 | A1 | 2/2021 | Robinson | |
| 2021/0239972 | A1 | 8/2021 | Robinson | |
| 2021/0278875 | A1 | 9/2021 | Allin | |
| 2021/0311312 | A1 | 10/2021 | Ato | |
| 2022/0187655 | A1 | 6/2022 | Park | |
| 2022/0334392 | A1 * | 10/2022 | Kim | G06T 19/006 |
| 2024/0118746 | A1 | 4/2024 | Yerkes | |
| 2024/0160013 | A1 * | 5/2024 | El-Haddad | G02B 27/0093 |
| 2025/0020919 | A1 | 1/2025 | Samaniego | |

OTHER PUBLICATIONS

International Search Report mailed Mar. 26, 2024, in International Application No. PCT/US2023/081630.

Written Opinion of the International Searcing Authority mailed Mar. 26, 2024, in International Application No. PCT/US2023/081630.

* cited by examiner

SYSTEM AND METHOD FOR HOLOGRAPHIC LASER BACKLIGHT

CROSS REFERENCE TO RELATED APPLICATIONS

The present patent application claims the benefit of U.S. Provisional Patent Application 63/448,025, filed Feb. 24, 2023, U.S. Provisional Patent Application 63/456,165, filed Mar. 31, 2023, U.S. Provisional Patent Application 63/523,738, filed Jun. 28, 2023, and U.S. Provisional Patent Application 63/523,759, filed Jun. 28, 2023, the entire disclosures of each of which are hereby incorporated by reference. This application is also a continuation-in-part of U.S. application Ser. No. 18/523,128, filed Nov. 29, 2023, a continuation-in-part of U.S. application Ser. No. 18/523,150, filed Nov. 29, 2023, and a continuation-in-part of International Application No. PCT/US2023/081630, filed Nov. 29, 2023. Each of U.S. application Ser. No. 18/523,128, U.S. application Ser. No. 18/523,150, and International Application No. PCT/US2023/081630, claim the benefit of U.S. Provisional Patent Application 63/428,601, filed Nov. 29, 2022, U.S. Provisional Patent Application 63/428,606, filed Nov. 29, 2022, and U.S. Provisional Patent Application 63/434,645, filed Dec. 22, 2022, the entire disclosures of each of which are hereby incorporated by reference.

FIELD OF INVENTION

Generally, the present disclosure relates to the field of data processing. More specifically, the present disclosure relates to a system and method for backlighting or front lighting a computer display and controlling computer display brightness in augmented reality applications.

BACKGROUND OF INVENTION

Display devices are used for various types of training, such as in simulators. Such display devices may display virtual reality and augmented reality content.

However, in some situations, movement of a display device with respect to a user using the display device may alter a perception of the content that may be displayed. For instance, due to the display device moving due to external forces, such as movement of display devices in flight helmets due to acceleration of aircraft, the user's perception of the displayed content may change, which is not desired.

Therefore, there is a need for improved methods, systems, apparatuses and devices for facilitating provisioning of a virtual experience that may overcome one or more of the above-mentioned problems and/or limitations.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

There is disclosed new backlight systems for use in backlighting or front-lighting computer displays (e.g., backlighting of an LCD display, front-lighting of an LCoS display). In embodiments, the backlight includes a laser light source, a holographic surface patterned to expand the laser light into a line and a second holographic surface patterned to reflect the expanded light substantially evenly as a plane of light configured to irradiate the computer display.

There is disclosed new compact optical systems for mixed reality headsets with reduced stray light and improved image quality. Some mixed reality headsets use compact arrangement of lenses through which a user views a computer display. The arrangement of lenses tends to have and number of surfaces and some or all of the services may be covered or coated with surface treatments (e.g., polarization films, partially reflecting materials). The displays typically produce image light that is directed into the arrangement of lenses. The inventors discovered that the beam angle of the image light tend to be relatively wide and not very precisely controlled. This leads to image light being transmitted into the lens stack at a wide variety of angles. This results in some of the image light being transmitted through the lens stack appropriately and some of the image light being transmitted into and thus through the lens stack at inappropriate angles leading to stray light and poor image quality.

An aspect of the present inventions relates to a display back lighting system that has precise control over the beam angle of light generated and transmitted through the display, in embodiments, the backlight is generated with a laser. The laser has both a narrow band gap in which it produces energy and a very narrow beam angle in which it produces energy. I narrow band gap and the narrow beam angle can be reflected off of a holographic surface with great precision. The holographic surface can be patterned to reflect the light in one or more or many directions; the surface can be printed to generate custom lighting patterns with a high degree of precision. In embodiments, the holographic surface is are flat plane. The wave front of the flat plane may be flat, convex, concave, asymmetrical, symmetrical, etc. The wave front and beam angle can be tailored to match the input surface characteristics of a compact lens stack resulting in high image quality with low stray light.

A lighting system, comprising a laser light source configured to transmit laser light into a collimator and expander optical system to output a column of light; a first waveguide with at least one first holographic surface configured to receive the column of light, wherein the at least one first holographic surface is configured to reflect the column of light out of the first waveguide as a line of light; a second waveguide with at least one second holographic surface configured to receive the line of light, wherein the second holographic surface is configured to reflect the line of light as a two-dimensional plane of light; and an image display configured to receive the two-dimensional plane of light and convert the two-dimensional plane of light into an image.

An XR display system, comprising a laser light source configured to illuminate a holographic surface to generate a plane of light; and an image display configured to receive the plane of light and convert the plane of light into image light, wherein the image light is convergent on an eye-box of the XR display system.

An XR helmet, comprising a backlit display system to generate image light; a backlight comprising a holographic surface positioned to reflect light originating as coherent light and configured to backlight the backlit display system; a combiner configured to reflect the image light towards an eye of a user; and a mechanical system configured to move a position of the combiner in at least one of an XR position where the user sees XR content and an unobstructed position where combiner is not in front of the user's eye.

SUMMARY OF FIGURES

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION

Figure 1:
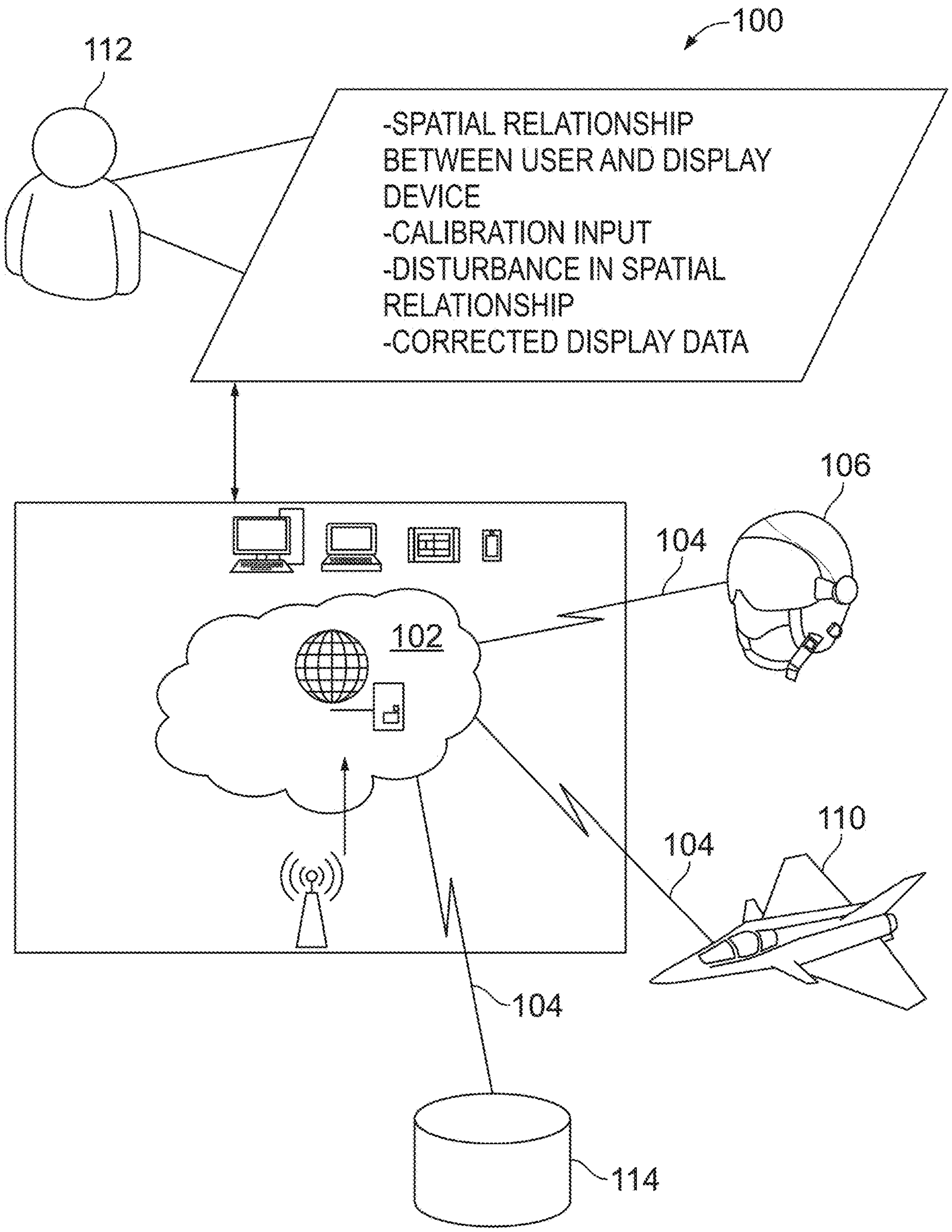
FIG. 1 is an illustration of an online platform consistent with various embodiments of the present disclosure.

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, “a” and “an” each generally denotes “at least one,” but does not exclude a plurality unless the contextual use dictates otherwise. When used herein to join a list of items, “or” denotes “at least one of the items,” but does not exclude a plurality of items of the list. Finally, when used herein to join a list of items, “and” denotes “all of the items of the list.”

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of facilitating provisioning of a virtual experience, embodiments of the present disclosure are not limited to use only in this context.

The inventors discovered that augmented reality systems are not capable of locking geospatially located augmented reality content in a position within an environment lacking real objects or has limited objects. Imagine that you are flying a plane 10,000 feet above the ground. The pilot’s view may be expansive, but it may absent any real objects that are geolocated with any precision. For example, the pilot may see clouds, the sun, other planes temporarily, but the pilot does not see objects that are generally used to anchor content, such as walls, outdoor geolocated buildings, mapped roads, etc.

The inventors further discovered that in such environments, the systems, in embodiments, required precision location of the user, precision identification of where the user is looking and tracking of these attributes in real-time such that the geolocated content can be more precisely fixed in position. Add to this problem, as the inventors discovered, that when presenting augmented reality content to a fast-moving vehicle in such an environment, the issues get even more challenging.

Systems and methods discovered by the inventors may be used in such environments or even in environments where there are real objects that could be used for anchoring of virtual content. Systems and methods in accordance with the principles of the present inventions may relate to a situation referred to as ‘within visual range’ of a vehicle. Training within visual range is generally training based on up to approximately 10 miles from an aircraft because that is approximately how far a pilot can see on a clear day. The training may involve presenting visual information in the form of augmented reality content to the pilot where the augmented reality content represents a training asset within the pilot’s visual range.

Embodiments of the present invention may provide systems and methods for training a pilot in a real aircraft while flying and performing maneuvers. Such a system may include an aircraft sensor system affixed to the aircraft configured to provide a location of the aircraft, including an altitude of the aircraft, speed of the aircraft, and directional attitude of the aircraft, etc. The system may also include a head mounted display (HMD) sensor system (e.g. helmet position sensor system) configured to determine a location of HMD within a cockpit of the aircraft and a viewing direction of a pilot wearing the helmet. The HMD may have a see-through computer display through which the pilot sees an environment outside of the aircraft with computer content overlaying the environment to create an augmented reality view of the environment for the pilot. The system may include a computer content presentation system configured to present computer content to the see-through computer display at a virtual marker, generated by the computer content presentation system, representing a geospatial position of a training asset moving within a visual range of the pilot, such that the pilot sees the computer content from a perspective consistent with the aircraft’s position, altitude, attitude, and the pilot’s helmet position when the pilot’s viewing direction is aligned with the virtual marker. The virtual marker may represent one in a series of geospatial locations that define the movement of the training asset and one of the series may be used as an anchor for the presentation of the virtual training asset content in a frame at a time representing a then current time.

In embodiments, the computer content represents a virtual asset in a training exercise for the pilot. The pilot may use the aircraft controls to navigate the aircraft in response to the virtual asset’s location or movement. The computer content presentation system may receive information relating to the pilot’s navigation of the aircraft and causes the virtual asset to react to the navigation of the aircraft. The reaction may be selected from a set of possible reactions and/or based on artificial intelligence systems. The virtual training asset may be a virtual aircraft, missile, enemy asset, friendly asset, ground asset, etc.

In embodiments, the augmented reality content’s virtual marker’s geospatial position is not associated with a real object in the environment. The environment may or may not have real objects in it, but the virtual marker may not be associated with the real object. The inventor’s discovered that augmented reality content is generally locked into a location by using a physical object in the environment as an anchor for the content. For example, generally the content may be associated or ‘connected’ with a building, wall, street, sign, or other object that is either mapped to a location or not. A system or method according to the principles of the present invention may lock the content to a virtual marker in the air such that it can represent a virtual object can be presented as being in the air without being associated with an object in the environment. The apparent stability of such content, as viewed from an operator of a vehicle, may depend on maintaining an accurate geometric understanding of the relative position of the operator's HMD and the content virtual marker's geospatial location. A main cause of error in maintaining the geometric understanding may be maintaining an accurate understanding of the vehicle's position, attitude, speed, vibrations, etc. The geometric understanding between the vehicle and the geospatially located virtual marker may be accurate if the vehicle's location and condition is well understood. In embodiments, the geometric understanding changes quickly because both the vehicle and the virtual marker may be moving through the environment. For example, the vehicle may be a jet fighter aircraft moving at 800 miles per hour and the augmented reality content may represent an antiaircraft missile moving at 1500 miles an hour towards the aircraft. In such a training simulation both the real aircraft and virtual content are moving very fast and the relative geometry between them is changing even faster. A system and method according to the principles of the present invention update the relative geometric understanding describing the relationship between the vehicle and the virtual marker. The system may further include in the relative geometric understanding the vehicle operator's head location and viewing position and/or eye position. To maintain an accurate geometric understanding, a system and method may track information from sensors mounted within the vehicle, including a one or more sensors such as GPS, airspeed sensor, vertical airspeed sensor, stall sensor, IMU, G-Force sensor, avionics sensors, compass, altimeter, angle sensor, attitude heading and reference system sensors, angle of attack sensor, roll sensor, pitch sensor, yaw sensor, force sensors, vibration sensors, gyroscopes, engine sensors, tachometer, control surface sensors, etc.

Systems and methods according to the principles of the present inventions may include a helmet position sensor system that includes a plurality of transceivers affixed within the aircraft configured to triangulate the location and viewing direction of the helmet. The plurality of transceivers may operate at an electromagnetic frequency outside the visible range. The helmet may include at least one marker configured to be recognized by the triangulation system for the identification of the helmet location and helmet viewing direction. For example, the helmet may have several markers on it at known positions and three or more electromagnetic transceivers may be mounted at known locations in the cockpit of an aircraft, or operator's environment in a vehicle. The transceivers each measure, through time-of-flight measurements, the distance between each transceiver and the marker(s) on the helmet and then the measurements may be used to triangulate the location and viewing position of the helmet. In embodiments, the helmet may be markerless and the triangulation system may 'image' the helmet to understand it's location and position.

Systems and methods according to the principles of the present inventions may include a helmet position sensor system that triangulates the helmet position by measuring a plurality of distances from the helmet (or other HMD) to known locations within the aircraft. This may generally be referred to as an inside out measurement. The known locations may include a material with a particular reflection characteristic that is matched with the transceiver system in the helmet.

As disclosed herein, the augmented reality content presented to an operator of a vehicle may be presented based on the physical environment that the vehicle is actually in or it may be based on a different environment such as an environment of another aircraft involved in the simulated training but is geographically remote from the operator. In such a situation, the virtual content presented to the operator may be influenced by the other vehicle's environment. For example, a first aircraft may be flying in a cloudy environment and a second aircraft may be flying in a bright sunny sky. The first aircraft may be presented a virtual environment based on the second aircraft's actual environment. While the pilot of the second aircraft may have to deal with the bright sun at times, the pilot of the first may not. The virtual content presentation system may present the same virtual training asset to both the first and second pilots, but the content may be faded to mimic a difficult to see asset due to the sun. The computer content may have a brightness and contrast, and at least one of the brightness and contrast may be determined by the pilot's viewing direction when the content is presented. The brightness or contrast may be reduced when the viewing direction is towards the sun.

A system and method according to the principles of the present inventions may involve presenting augmented reality content in an environment without relying on real objects in the environment or in environments without real objects. This may involve receiving a geospatial location, including altitude, of virtual content within an environment to understand where the virtual content is to be represented. It may also involve creating a content anchor point at the geospatial location. The system and method may further involve receiving sensor information from a real aircraft sensor system affixed to a real aircraft to provide a location of the aircraft including an altitude of the aircraft, speed of the aircraft, and directional attitude of the aircraft and receiving head position information identifying a viewing position of a pilot within the aircraft. With the virtual content location anchor point understood and the location and conditions of the real aircraft understood, augmented reality content may be presented in a see-through computer display worn by the pilot when the aircraft sensor data, helmet position data and content anchor point align indicating the pilot sees the anchor point.

A system and method according to the principles of the present inventions may involve two or more real airplanes operating in a common virtual environment where the pilots of the respective airplanes are presented common augmented reality content from each's respective perspectives. In embodiments, a computer product, operating on one or more processors, configured to present augmented reality content to a plurality of aircraft within a common virtual environment may include a data transmission system configured to receive geospatial location data from the plurality of aircraft, wherein each of the plurality of aircraft is within visual proximity of one another. It may further involve a training simulation system configured to generate a content anchor at a geospatial location within visual proximity of the plurality of aircraft in an environment. A content presentation system may be configured to present computer-generated content representing a training asset moving within the visual proximity of the plurality of aircraft to each of the plurality of aircraft such that a pilot in each respective aircraft sees the computer-generated content at a perspective determined at least in part on the respective aircraft's location with respect to the anchor location.

A system and method according to the principles of the present inventions may involve two or more real airplanes operating in a common virtual environment where the pilots of the respective airplanes are presented common augmented reality content from each's respective perspectives. In embodiments, a computer product, operating on one or more processors, configured to present augmented reality content to a plurality of aircraft within a common virtual environment may include a data transmission system configured to receive geospatial location data from the plurality of aircraft, wherein each of the plurality of aircraft is geographically separated such that they cannot see one another. Even though they cannot see one another, the training exercise and virtual environment may be configured such that they are virtually in close proximity. Each pilot may be able to 'see' the other plane by seeing an augmented reality representation of the other plane. It may further involve a training simulation system configured to generate a content anchor at a geospatial location within visual proximity of the plurality of aircraft in an environment. A content presentation system may be configured to present computer-generated content representing a training asset moving within the visual proximity of the plurality of aircraft to each of the plurality of aircraft such that a pilot in each respective aircraft sees the computer-generated content at a perspective determined at least in part on the respective aircraft's location with respect to the anchor location.

A system and method according to the principles of the present inventions may involve a simulated training environment with a moving anchor point for virtual content representing a moving augmented reality training asset. In embodiments, a computer product, operating on one or more processors, may be configured to present augmented reality content to a pilot of an aircraft. A data transmission system may be configured to receive geospatial location data from the aircraft as it moves through an environment. A training simulation system may be configured to generate a series of content anchors at geospatial locations within visual proximity of the aircraft, each of the series of content anchors representing a geospatial position of a virtual training asset moving through the environment. A content presentation system may be configured to present the virtual training asset to the aircraft such that a pilot in the aircraft sees the virtual training asset when it is indicated that the pilot viewing angle is aligned with a content anchor from the series of content anchors that represents a then current location of the virtual training asset. The virtual training asset is shaped in a perspective view consistent with the pilot's viewing angle and the then current location of the virtual training asset. For example, a series of progressively changing geospatial locations may represent the movement of a virtual training asset through a virtual environment over a period of time. The movement may be prescribed or pre-programmed and it may represent a sub-second period of time, second(s) period of time, minute(s) period of time, etc. The time period may represent a future period of time to describe how the virtual training asset is going to move in the future. When it becomes time to present the content to the augmented reality system in the aircraft the content may be located at one of the series of locations that represents the then current time to properly align the content. In embodiments, the selected location from the series of locations may be a time slightly in the future of the then current time to make an accommodation for latency in presenting the content.

A system and method according to the principles of the present inventions may involve a simulated training system where a virtual asset has a geospatial location that is independent of a real aircraft's location that is involved in the training. A system and method of presenting the simulated training exercise to a pilot in a real aircraft may involve generating a virtual environment that includes an indication of where the real aircraft is located and what its positional attitude is within the aircraft's real environment. It may further involve generating, within the virtual environment, a virtual asset that is within a visual range of the real aircraft's location and presenting the virtual asset to the pilot as augmented reality content that overlays the pilot's real view of the environment outside of the real aircraft, wherein the virtual asset is presented at a geospatial position that is independent of the real aircraft's location. In embodiments, the virtual asset may move in relation to the aircraft's location and maintain the virtual asset's autonomous movement and location with respect to the aircraft's location. While the virtual asset may react to the real aircraft's movements, the virtual asset may maintain its autonomous control.

The inventors discovered that predicting the future location(s) of a real vehicle that is moving through a real environment can improve the accuracy of the positioning of virtual content in an augmented reality system. This may be especially important when the real vehicle is moving quickly. A system and method in accordance with the principles of the present inventions may involve receiving a series of progressively changing content geospatial locations representing future movement of a virtual asset within a virtual environment, which may be predetermined and pre-programmed. It may also involve receiving a series of progressively changing real vehicle geospatial locations, each associated with a then current acquisition time, representing movement of a real vehicle in a real environment, wherein the virtual environment geospatially represents the real environment. The system and method may predict, based on the series of vehicle locations and related acquisition times, a future geospatial location, and series of future locations, of the vehicle. Then the augmented reality content may be presented to an operator of the vehicle at a position within a field-of-view of a see-through computer display based on the future geospatial location of the vehicle, or a location from the series of locations. It may further be based on the geospatial location of the virtual content, from the series of progressively changing content geospatial locations, representative of a time substantially the same as a time represented by the future geospatial location.

In embodiments, the prediction of the future geospatial location of the vehicle may be based at least in part on past geospatial vehicle locations identified by a sensor system affixed to the vehicle that periodically communicates a then current geospatial location; wherein the past geospatial vehicle locations are interpolated to form a past vehicle location trend. The prediction of the future geospatial location of the vehicle may then be further based on an extrapolation based at least in part on the past vehicle trend. The vehicle may be further represented by an attitude within the real environment and the virtual asset is represented by an attitude within the virtual environment and the presentation of the augmented reality content is further based on the attitude of the vehicle and the attitude of the virtual asset.

A system according to the principles of the present disclosure tracks an airplane's geospatial location (e.g. through GPS) as it moves through the air. It also tracks inertial movements of the plane as well as the avionics in the plane; such as pilot controls for thrust, rudder, alerions, elevator, thrust direction, compass, airspeed indicator, external temperature, g-force meter, etc. With this data, a processor, either onboard or off-plane, can determine an accurate understanding of the plane's current condition, location, attitude, speed, etc. Such processed data can be tracked over time such that a trend analysis can be performed on the data in real time. This real-time trend analysis can further be used to predict where the plane is going to be at a future point in time. For example, the plane's data may be collected every 4 ms and a saved data set may include thousands of points representing the immediate past. The data set can then be used to accurately predict where the plane is going to be in the relative near future (e.g. in the next milliseconds, seconds, minutes). The extrapolated future location prediction based on the past data gets less precise the further into the future the prediction is making. However, the augmented reality content is being presented to a see-through optic at a fast refresh rate such that the position of the content in the optic can be based on the millisecond or second level predictions. As a further example, the refresh rate from a software product that is generating and producing the virtual content rendering (e.g. a gaming engine) may be on the order of 4 ms to 12 ms. This means that the position of the content can be shifted to accommodate a predicted location and pilot visions direction every 4 ms to 12 ms. Knowing the plane's weight and performance characteristics may also be used in the calculations. For example, the processor may factor in that an F-22 fighter jet weighs just over 40,000 pounds and can make a 5G turn at 1,000 miles per hour and understand what the flight path of such a maneuver may look like. Such flight path characteristics would be quite different in an F-16, Harrier, F-35, Cargo plane, etc.

In embodiments, a system may be equipped with a computer processor to read sensor data from the vehicle (e.g. airplane, ground vehicle, space vehicle, etc.) to locate the vehicle and understand its current conditions (e.g. forces, avionics, environment, attitude, etc.). The processor may store the sensor data and evaluate the sensor data. The type of vehicle and/or its powered movement characteristics may be stored and used in conjunction with the sensor data to further understand the present condition of the vehicle. The current and past sensor data and movement characteristics may be fused and analyzed to understand the past performance of the vehicle and this trend analysis may be further used to predict a future position of the vehicle. With the very near future position of the vehicle predicted with precision, virtual content can be presented to the see-through optical system used by a user such that it aligns with a geospatial location of geospatially located content. For example, when the system predicts the location of an airplane one second from now it will be a very accurate prediction. With the accurate prediction of the future location and knowing the future geospatial positioning of the content (e.g. longitude, latitude, and altitude) the virtual content can be positioned relative to the position of the airplane at the future time. The relative, or near absolute, positioning of the content can be refreshed at a very fast rate (e.g. 4 ms). This is fast enough to accommodate the fast repositioning of the fast reposition of the virtual content (e.g. another plane approaching from the opposite direction).

The inventors further discovered that the head and/or eye position of the operator or passenger of the vehicle needs to be well understood as it relates to the position of the vehicle. For example, with an airplane moving at 1,000 miles an hour and its location and condition well understood (as described herein) it is not enough to determine the relative position of the geospatial content. The content needs to be presented in the see-through optic at a correct position such that the user perceives it as being in the proper geospatial position. In a system where the see-through optic is attached to the vehicle surrounding the user's view of the exterior environment, the relative positioning of the content may require an understanding of the user's eye height since the optic is not moving relative to the vehicle. In a system where the see-through optic is attached to the user (e.g. head mounted display ("HMD"), in a helmet, etc.) the position of the user's head will be considered. For example, if the virtual content is on the right side of the vehicle and the user is looking out the left side of the vehicle, the content should not be presented to the see-through optic because the user cannot see the geospatial location anchoring the content. As the user turns her head to view the anchor point the content will be presented at a location within the optic that correlates with a virtual line connecting her position within the vehicle and the anchor position.

In embodiments, the user's head position may be derived using an inside-out (e.g. where an HMD emits electromagnetic energy to measure distances to objects within a user environment and then determining position through triangulation), outside-in (e.g. where there are electromagnetic energy emitters set at known locations within the user's environment and use distance measurements from the emitters to the HMD to triangulate), mechanical system, electrical system, wireless system, wired system, etc. For example, an outside-in system in a cockpit of a jet fighter may use electromagnetics to triangulate the head position using emitters located at known positions within the cockpit. The helmet or other HMD may have markers or be markerless. Marks on the helmet may be used to identify the user's direction of vision. A markerless HMD may be programmed to understand the electromagnetic signature of the HMD such that its viewing position can be derived.

A system may also include an eye tracking system to identify the direction of the user's eyes. This can be used in conjunction with the head position data to determine the general direction the user is looking (e.g. through head position tracking) and specific direction (e.g. through eye position). This may be useful in conjunction with a foveated display where the resolution of the virtual content is increased in the specific direction and decreased otherwise. The acuity of the human eye is very high within a very narrow angle (e.g. 1 or 2 degrees) and it quickly falls off outside of the narrow angle. This can mean that content outside of the high acuity region can be decreased in resolution or sharpness because it is going to be perceived as 'peripheral vision' and it can save processing power and decrease latency because potentially less data is used to render and present content.

In embodiments, an augmented reality system used by an operator of a vehicle may make a precision prediction of the vehicle's future geospatial location, orientation, angular position, attitude, direction, speed (this collection of attributes or sub set of attributes or other attributes describing the vehicle within an environment is generally referred to as the vehicle's condition herein), and acceleration based on the vehicle's past performance of the same factors, or subset or other set of factors, leading up to the vehicle's current state. Including an understanding of the vehicle's capabilities and abilities throughout a range of motions, speeds, accelerations, etc. can assist in the future prediction. Such an augmented reality system may employ artificial intelligence, machine language and the like to make the prediction based on such data collected over time. Such a system may further include an error prediction and include limits on how much error is tolerable given the current situation. For example, the augmented reality system may be able to predict the future position and geometry with great accuracy for three seconds in the future. At a frame rate of 10 ms that means three hundred frames of virtual content can be 'locked in' as to its location and geometry. If the prediction after three seconds and less than five second, for example, is reasonably predictable, the frames to be generated in that period may be rendered from one perspective (e.g. the geometry may be fixed) but not 'locked in' from another (e.g. the location may be approximate to be updated when it gets to the three second prediction point in the data stream. This means you could have three hundred frames locked in and completely available for presentation along with another two hundred frames that are partially rendered in some way. Optional rendering could also be produced if the future prediction system developed more than one alternative path for the vehicle. A method allowing the future rendering of content within a gaming engine could reduce the latency of presenting the content to the see-through optic.

The future location/geometric position/condition prediction systems described herein are very useful when used in fast moving vehicles. A jet aircraft may travel at speeds of 1,300 miles per hour. That is equivalent to 1.9 feet per millisecond. If the content rendering system has a content data output rate of 10 ms, that means there could be 19 feet travelled between frames. That could lead to significant misplacement or poor rendering of the geometry, orientation, etc. of the virtual content if a future prediction of the vehicle's location, geometric position, and condition is not used to impact the generation of the content. Even at much slower speeds the error produced without a future prediction may be significant. Cutting the speed down from 1300 miles per hour to 130 miles per hour could still lead to a near two-foot error between frames in content rendering and placement. Even at highway speed of 65 miles per hour, a one-foot error could be produced.

The future prediction of the vehicle's location and condition may be made to provide processing time before presenting the virtual content. It may further be made such that when the content is ready for presentation the content can be positioned properly within the see-through optic.

An augmented reality system and method in accordance with the principles of the present disclosure may include a geospatial location system configured to identify a current location of a vehicle (e.g. GPS), a plurality of sensors configured to identify the vehicle's positional geometry within an environment (e.g. inertial measurement unit (IMU), G-Force sensor, compass) at the current location, a plurality of sensors configured to identify vectors of force being applied to the vehicle (e.g. IMU, G-Force sensor); a data association and storage module (e.g. a computer processor with memory) configured to associate and store the geospatial location data, positional geometry data, and force vector data with a time of acquisition of each type of data, a computer processor configured to analyze the stored data and generate a trend of the vehicle's positions and conditions over a period of time and extrapolate the trend into a future period of time to produce a future predicted performance, wherein the processor is further adapted (e.g. programmed to execute) to present geospatially located augmented reality content to an operator of the vehicle based on the future predicted performance. The presentation of content based on the future predicted performance is estimated to be presented at a time corresponding with the then current time and location. In other words, the future prediction is used to determine the location and condition of the vehicle in the future, and presentation of the content is done using the prediction of location and condition that is timestamped with the then current time or nearest then current time.

The system and method may further include a head position tracking system configured to identify a viewing direction of a user of an augmented reality see-through computer display, wherein the presentation of the geospatially located content is further based on the viewing direction of the user. The presentation of the geospatially located content may also involve positioning the content within a field-of-view of the see-through computer display based on the viewing direction of the user. The system and method may further comprise an eye direction detection system (e.g. a camera system or other sensor system for imaging and tracking the position and movement of the user's eyes, wherein the presentation of the geospatially located content within the field-of-view is further based on a measured eye position, direction, or motion of the user.

Now referring to the figures, FIG. 1 is an illustration of an online platform 100 consistent with various embodiments of the present disclosure. By way of non-limiting example, the online platform 100 to facilitate provisioning of a virtual experience may be hosted on a centralized server 102, such as, for example, a cloud computing service. The centralized server 102 may communicate with other network entities, such as, for example, an augmented and virtual reality display device 106, a sensor system 110 of an aircraft, database 114 (such as 3D model database) over a communication network 104, such as, but not limited to, the Internet. Further, users of the online platform 100 may include relevant parties such as, but not limited to, trainees, trainers, pilots, administrators, and so on.

A user 112, such as the one or more relevant parties, may access online platform 100 through a web-based software application or browser. The web-based software application may be embodied as, for example, but not be limited to, a website, a web application, a desktop application, and a mobile application compatible with a computing device 1000.

Figure 2:
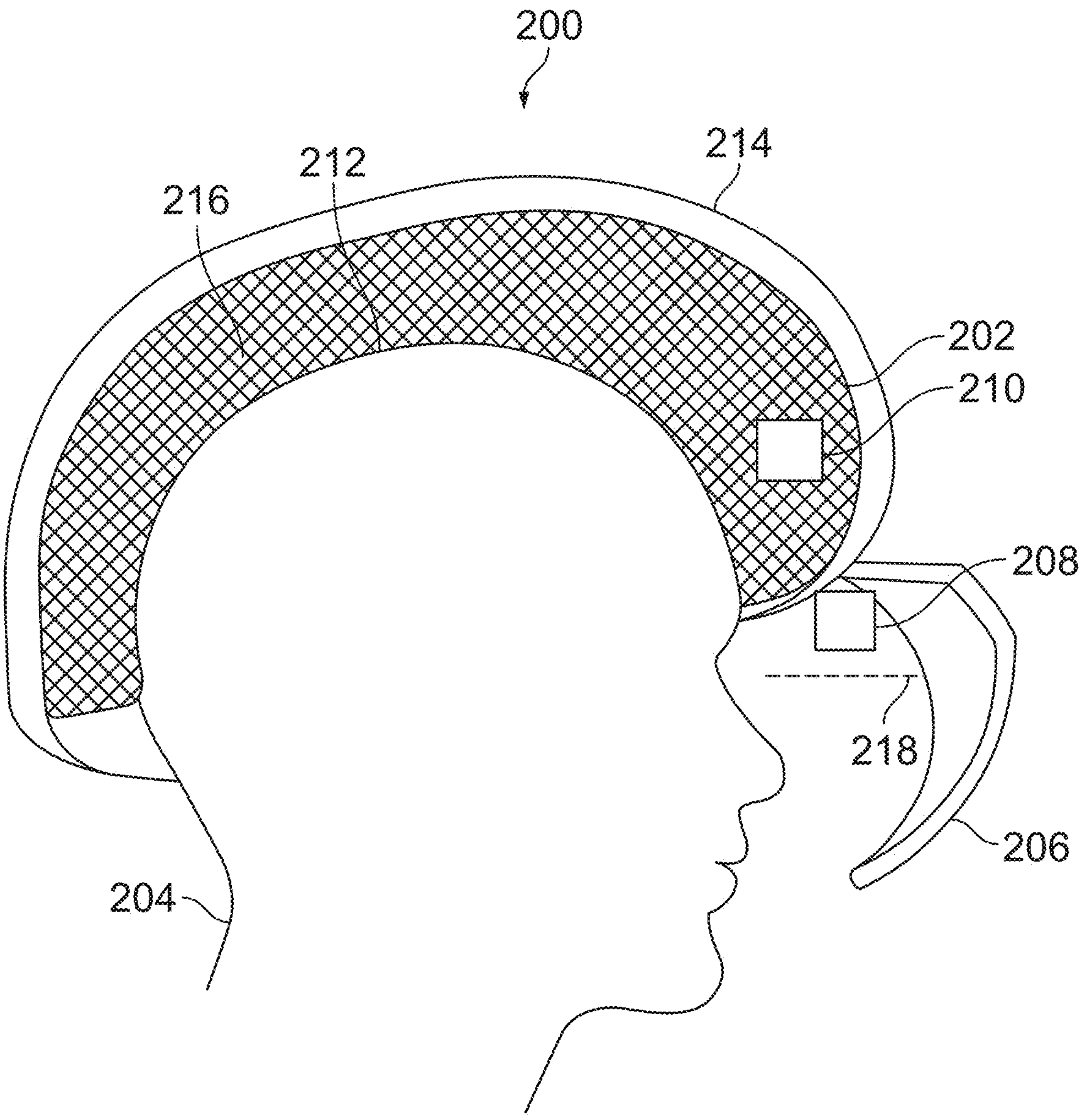
FIG. 2 shows a wearable display device for facilitating provisioning of a virtual experience, in accordance with some embodiments.

FIG. 2 shows a wearable display device 200 for facilitating provisioning of a virtual experience. In some embodiments, the wearable display device 200 may be utilized in conjunction with and/or to effectuate and/or facilitate operation of any element described elsewhere herein or illustrated in any figure herein. Further, the wearable display device 200 may include a support member 202 configured to be mounted on a user 204. Further, the support member 202 may include a structure allowing the support member 202 to be easily mountable on the user 204. For instance, the wearable display device 200 may include a head mounted device (HMD). Further, the wearable display device 200 may include a display device 206 attached to the support member 202. For instance, if the wearable display device 200 is an HMD, the HMD may include a display device in front of one eye of the user 204, (a monocular HMD), in front of both eyes of the user 204, (a binocular HMD), an optical display device (which may reflect projected images), and so on. Further, the display device 206 may be configured for displaying at least one display data. Further, the display data may include virtual reality data related to a simulation, such as a training simulation. For instance, the training simulation may correspond to vehicular racing, such as Formula 1®, and may be used by race car drivers to train for race events. Further, in an instance, the training simulation may correspond to flight training, and may be used by air force pilots for flight training in fighter aircraft. Further, in some embodiments, the display data may include augmented reality data. Accordingly, the display data may include one or more augmented reality components overlaid on top of live image. For instance, the augmented reality data may be related to flight training including a first aircraft training simultaneously with a plurality of aircraft in different locations. Accordingly, the augmented reality data may include augmented reality components displaying the plurality of aircraft in different locations to a display device associated with a pilot of the first aircraft. Further, the wearable display device 200 may include at least one disturbance sensor 208 configured for sensing a disturbance in a spatial relationship between the display device 206 and the user 204. Further, the spatial relationship between the display device 206 and the user 204 may include at least one of distance or orientation. For instance, the spatial relationship may include an exact distance, and an orientation, such as a precise angle between the display device 206 and the eyes of the user 204.

Further, the disturbance in the spatial relationship may include a change in at least one of distance or orientation between the display device 206 and the user 204. Further, the disturbance in the spatial relationship may lead to an alteration in how the user 204 may view the display data. For instance, if the disturbance in the spatial relationship leads to a reduction in the distance between the display device 206 and the user 204, the user 204 may perceive one or more objects in the display data to be closer. For instance, if the spatial relationship between the display device 206 and the user 204 specifies a distance of "x" centimeters, and the disturbance in the spatial relationship leads to a reduction in the distance between the display device 206 and the user 204 to "y" centimeters, the user 204 may perceive the display data to be closer by "x-y" centimeters.

Further, the wearable display device 200 may include a processing device 210 communicatively coupled with the display device 206. Further, the processing device 210 may be configured for receiving the display data. Further, the processing device 210 may be configured for analyzing the disturbance in the spatial relationship. Further, the processing device 210 may be configured for generating a correction data based on the analyzing. Further, the processing device 210 may be configured for generating a corrected display data based on the display data and the correction data. Further, the correction data may include an instruction to shift a perspective view of the display data to compensate for the disturbance in the spatial relationship between the display device 206 and the user 204. Accordingly, the correction data may be generated contrary to the disturbance in the spatial relationship.

For instance, the disturbance may include an angular disturbance, wherein the display device 206 may undergo an angular displacement as a result of the angular disturbance. Accordingly, the correction data may include an instruction of translation of the display data to compensate for the angular disturbance. Further, the display data may be translated along a horizontal axis of the display data, a vertical axis of the display data, a diagonal axis of the display data, and so on, to negate the angular displacement of the display data.

Further, in an instance, the disturbance may include a longitudinal disturbance, wherein the display device 206 may undergo a longitudinal displacement as a result of the longitudinal displacement. Accordingly, the correction data may include an instruction of translation of the display data to compensate for the longitudinal disturbance. Further, the display data may be projected along a distance perpendicular to a line of sight of the user 204 to negate the angular displacement of the display data. For instance, the display data may be projected along a distance perpendicular to the line of sight of the user 204 opposite to a direction of the longitudinal disturbance to compensate for the longitudinal disturbance.

Further, the support member 202 may include a head gear configured to be mounted on a head of the user 204. Further, the head gear may include a helmet configured to be worn over a crown of the head. Further, the head gear may include a shell configured to accommodate at least a part of a head of the user 204. Further, a shape of the shell may define a concavity to facilitate accommodation of at least the part of the head. Further, the shell may include an interior layer 212, an exterior layer 214 and a deformable layer 216 disposed in between the interior layer 212 and the exterior layer 214. Further, the deformable layer 216 may be configured to provide cushioning. Further, the display device 206 may be attached to at least one of the interior layer 212 and the exterior layer 214.

Further, the disturbance in the spatial relationship may be based on a deformation of the deformable layer 216 due to an acceleration of the head gear. Further, the spatial relationship may include at least one vector representing at least one position of at least one part of the display device 206 in relation to at least one eye of the user 204. Further, a vector of the vector may be characterized by an orientation and a distance. For instance, the spatial relationship between the display device 206 and the user 204 may include at least one of distance or orientation. For instance, the spatial relationship may include an exact distance, and an orientation, such as a precise angle between the display device 206 and the eyes of the user 204. Further, the spatial relationship may describe an optimal arrangement of the display device 206 with respect to the user 204. Further, so that the optimal arrangement of the display device 206 with respect to the user 204 may allow the user to clearly view the display data without perceived distortion.

Further, in some embodiments, the disturbance sensor 208 may include an accelerometer configured for sensing the acceleration. Further, in some embodiments, the disturbance sensor 208 may include at least one proximity sensor configured for sensing at least one proximity between the part of the display device 206 and the user 204. Further, in some embodiments, the disturbance sensor 208 may include a deformation sensor configured for sensing a deformation of the deformable layer 216.

Further, in some embodiments, the display device 206 may include a see-through display device 206 configured to allow the user 204 to view a physical surrounding of the wearable device.

Further, in some embodiments, the display data may include at least one object model associated with at least one object. Further, in some embodiments, the generating of the corrected display data may include applying at least one transformation to the object model based on the correction data.

Further, the applying of the transformation to the object model based on the correction data may include translation of the display data to compensate for the angular disturbance. For instance, the correction data may include one or more instructions to translate the display data along a horizontal axis of the display data, a vertical axis of the display data, a diagonal axis of the display data, and so on, to negate the angular displacement of the display data. Accordingly, applying of the transformation to the object model based on the correction data may include translation of the display data along the horizontal axis, the vertical axis, and the diagonal axis of the display data, to negate the angular displacement of the display data. Further, in an instance, if the correction data includes an instruction of translation of the display data to compensate for the longitudinal disturbance, the applying of the transformation to the object model based on the correction data may include translation may include projection of the display data along a distance perpendicular to a line of sight of the user 204 to negate the angular displacement of the display data. For instance, the applying of the transform may include projection of the display data along a distance perpendicular to the line of sight of the user 204 opposite to a direction of the longitudinal disturbance to compensate for the longitudinal disturbance.

Further, in some embodiments, the disturbance sensor 208 may include a camera configured to capture an image of each of a face of the user 204 and at least a part of the head gear. Further, the spatial relationship may include disposition of at least the part of the head gear in relation to the face of the user 204.

Further, in some embodiments, the disturbance sensor 208 may include a camera disposed on the display device 206. Further, the camera may be configured to capture an image of at least a part of a face of the user 204. Further, the wearable display device 200 may include a calibration input device configured to receive a calibration input. Further, the camera may be configured to capture a reference image of at least the part of the face of the user 204 based on receiving the calibration input. Further, the calibration input may be received in an absence of the disturbance. For instance, the calibration input device may include a button configured to be pushed by the user 204 in absence of the disturbance whereupon the reference image of at least the part of the face of the user 204 may be captured. Further, the analyzing of the disturbance may include comparing the reference image with a current image of at least the part of the face of the user 204. Further, the current image may be captured by the camera in the presence of the disturbance. Further, determining the correction data may include determining at least one spatial parameter change based on the comparing. Further, the spatial parameter change may correspond to at least one of a displacement of at least the part of the face relative to the camera and a rotation about at least one axis of at least the part of the face relative to the camera.

Further, in some embodiments, the generating of the corrected display data may include applying at least one image transform on the display data based on the spatial parameter change.

Further, in some embodiments, the wearable display device 200 may include at least one actuator coupled to the display device 206 and the support member 202. Further, the actuator may be configured for modifying the spatial relationship based on a correction data.

Further, the spatial relationship between the display device 206 and the user 204 may include at least one of a distance 218 and an orientation. Further, the disturbance in the spatial relationship between the display device 206 and the user 204 may include a change in at least one of the distance 218, the angle, the direction, or the orientation. Further, the distance 218 may include a perceived distance between the user 204 and the display data. For instance, the disturbance in the spatial relationship may originate due to a forward acceleration of the user 204 and the wearable display device 200. Accordingly, the deformation of the deformable layer 216 may lead to a disturbance in the spatial relationship leading to a change in the distance 218 to a reduced distance between the display device 206 and the user 204. Accordingly, the correction data may include transforming of the display data through object level processing and restoring the display data to the distance 218 from the user 204. Further, the object level processing may include projecting one or more objects in the display data at the distance 218 instead of the reduced distance to oppose the disturbance in the spatial relationship. Further, the disturbance in the spatial relationship may include a change in the angle between the display device 206 and the user 204. Further, the angle between the display device 206 and the user 204 in the spatial relationship may be related to an original viewing angle related to the display data. Further, the original viewing angle related to the display data may be a viewing angle at which the user 204 may view the display data through the display device 206. Further, the disturbance in the spatial relationship may lead to a change in the original viewing angle related to the display data. Accordingly, the display data may be transformed through pixel level processing to restore the original viewing angle related to the display data. Further, the pixel level processing may include translation of the display data to compensate for the change in the angle in the spatial relationship. Further, the display data may be translated along a horizontal axis of the display data, a vertical axis of the display data, a diagonal axis of the display data, and so on, to negate the angular displacement of the display data to compensate for the change in the angle in the spatial relationship, and to restore the original viewing angle related to the display data.

Figure 3:
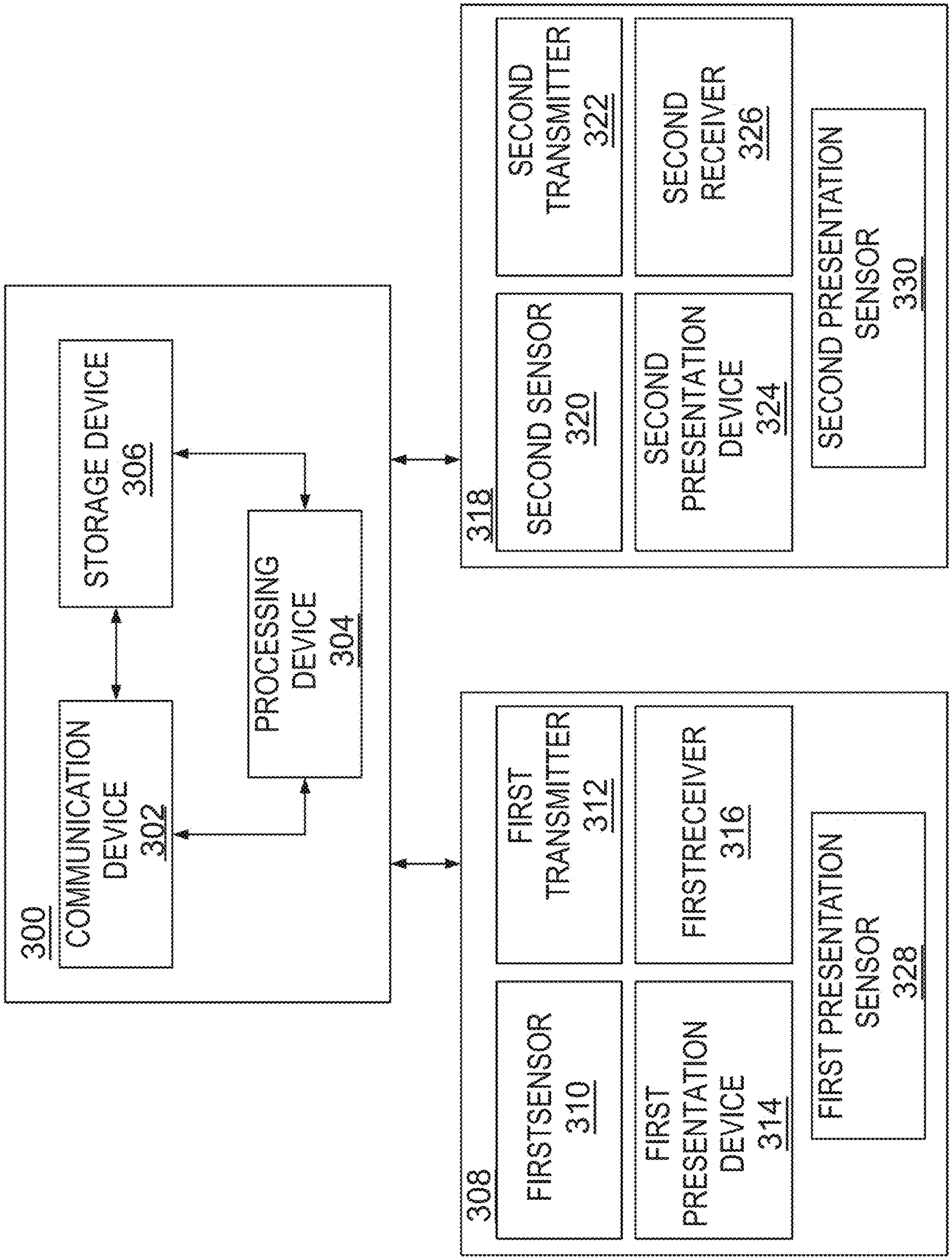
FIG. 3 is a block diagram of a system for facilitating provisioning of a virtual experience in accordance with some embodiments.

FIG. 3 is a block diagram of a system 300 for facilitating provisioning of a virtual experience in accordance with some embodiments. The system 300 may include a communication device 302, a processing device 304 and a storage device 306.

The communication device 302 may be configured for receiving at least one first sensor data corresponding to at least one first sensor 310 associated with a first vehicle 308. Further, the first sensor 310 may be communicatively coupled to a first transmitter 312 configured for transmitting the first sensor data over a first communication channel. In some embodiments, the first vehicle 308 may be a first aircraft. Further, the first user may be a first pilot.

Further, the communication device 302 may be configured for receiving at least one second sensor data corresponding to at least one second sensor 320 associated with a second vehicle 318. Further, the second sensor 320 may be communicatively coupled to a second transmitter 322 configured for transmitting the second sensor data over a second communication channel. In some embodiments, the second vehicle 318 may be a second aircraft. Further, the second user may be a second pilot.

In some embodiments, the first sensor data may be received from a first On-Board-Diagnostics (OBD) system of the first vehicle 308, the second sensor data may be received from a second On-Board-Diagnostics (OBD) system of the second vehicle 318.

Further, the communication device 302 may be configured for receiving at least one first presentation sensor data from at least one first presentation sensor 328 associated with the first vehicle 308. Further, the first presentation sensor 328 may be communicatively coupled to the first transmitter configured for transmitting the first presentation sensor data over the first communication channel. Further, in an embodiment, the first presentation sensor 328 may include a disturbance sensor, such as the disturbance sensor 208 configured for sensing a disturbance in a first spatial relationship between at least one first presentation device 314 associated with the first vehicle 308, and the first user. Further, the spatial relationship between the first presentation device 314 and the first user may include at least one of distance or orientation. For instance, the first spatial relationship may include an exact distance, and an orientation, such as a precise angle between the first presentation device 314 and the eyes of the first user. Further, the disturbance in the first spatial relationship may include a change in the at least of the distance and the orientation between the first presentation device 314 and the first user.

Further, the communication device 302 may be configured for receiving at least one second presentation sensor data from at least one second presentation sensor 330 associated with the second vehicle 318.

Further, in an embodiment, the second presentation sensor 330 may include a disturbance sensor configured for sensing a disturbance in a second spatial relationship between at least one second presentation device 324 associated with the second vehicle 318, and the second user.

Further, the second presentation sensor 330 may be communicatively coupled to the first transmitter configured for transmitting the second presentation sensor data over the second communication channel.

Further, the communication device 302 may be configured for transmitting at least one first optimized presentation data to at least one first presentation device 314 associated with the first vehicle 308. Further, in an embodiment, at least one first presentation device 314 may include a wearable display device facilitating provisioning of a virtual experience, such as the wearable display device 200. Further, in an embodiment, the first optimized presentation data may include a first corrected display data generated based on a first correction data.

Further, the first presentation device 314 may include a first receiver 316 configured for receiving the first optimized presentation data over the first communication channel. Further, the first presentation device 314 may be configured for presenting the first optimized presentation data.

Further, the communication device 302 may be configured for transmitting at least one second optimized presentation data to at least one first presentation device 314 associated with the first vehicle 308. Further, the first receiver 316 may be configured for receiving the second optimized presentation data over the first communication channel. Further, the first presentation device 314 may be configured for presenting the second optimized presentation data.

Further, in an embodiment, the second optimized presentation data may include a second corrected display data generated based on a second correction data.

Further, the communication device 302 may be configured for transmitting at least one second optimized presentation data to at least one second presentation device 324 associated with the second vehicle 318. Further, the second presentation device 324 may include a second receiver 326 configured for receiving the second optimized presentation data over the second communication channel. Further, the second presentation device 324 may be configured for presenting the second optimized presentation data.

Further, the processing device 304 may be configured for analyzing the first presentation sensor data associated with the first vehicle 308.

Further, the processing device 304 may be configured for analyzing the second presentation sensor data associated with the second vehicle 318.

Further, the processing device 304 may be configured for generating the first correction data based on analyzing the first presentation sensor data associated with the first vehicle 308. Further, the first correction data may include an instruction to shift a perspective view of the first optimized presentation data to compensate for the disturbance in the first spatial relationship between the first presentation device 314 and the first user. Accordingly, the first correction data may be generated contrary to the disturbance in the first spatial relationship. For instance, the disturbance may include an angular disturbance, wherein the first presentation device 314 may undergo an angular displacement as a result of the angular disturbance. Accordingly, the first correction data may include an instruction of translation to generate the first corrected display data included in the first optimized presentation data to compensate for the angular disturbance.

Further, the processing device 304 may be configured for generating the second correction data based on the analyzing the second presentation sensor data associated with the second vehicle 318. Further, the second correction data may include an instruction to shift a perspective view of the second optimized presentation data to compensate for the disturbance in the second spatial relationship between the second presentation device 324 and the second user. Accordingly, the second correction data may be generated contrary to the disturbance in the second spatial relationship. For instance, the disturbance may include an angular disturbance, wherein the second presentation device 324 may undergo an angular displacement as a result of the angular disturbance. Accordingly, the second correction data may include an instruction of translation to generate the second corrected display data included in the second optimized presentation data to compensate for the angular disturbance.

Further, the processing device 304 may be configured for generating the first optimized presentation data based on the second sensor data.

Further, the processing device 304 may be configured for generating the first optimized presentation data based on the first presentation sensor data.

Further, the processing device 304 may be configured for generating the second optimized presentation data based on the first sensor data.

Further, the processing device 304 may be configured for generating the second optimized presentation data based on the second presentation sensor data.

Further, the storage device 306 may be configured for storing each of the first optimized presentation data and the second optimized presentation data.

In some embodiments, the first sensor 310 may include one or more of a first orientation sensor, a first motion sensor, a first accelerometer, a first location sensor, a first speed sensor, a first vibration sensor, a first temperature sensor, a first light sensor and a first sound sensor. Further, the second sensor 320 may include one or more of a second orientation sensor, a second motion sensor, a second accelerometer, a second location sensor, a second speed sensor, a second vibration sensor, a second temperature sensor, a second light sensor and a second sound sensor.

In some embodiments, the first sensor 310 may be configured for sensing at least one first physical variable associated with the first vehicle 308. Further, the second sensor 320 may be configured for sensing at least one second physical variable associated with the second vehicle 318. In further embodiments, the first physical variable may include one or more of a first orientation, a first motion, a first acceleration, a first location, a first speed, a first vibration, a first temperature, a first light intensity and a first sound. Further, the second physical variable may include one or more of a second orientation, a second motion, a second acceleration, a second location, a second speed, a second vibration, a second temperature, a second light intensity and a second sound.

In some embodiments, the first sensor 310 may include a first environmental sensor configured for sensing a first environmental variable associated with the first vehicle 308. Further, the second sensor 320 may include a second environmental sensor configured for sensing a second environmental variable associated with the second vehicle 318.

In some embodiments, the first sensor 310 may include a first user sensor configured for sensing a first user variable associated with a first user of the first vehicle 308. Further, the second sensor 320 may include a second user sensor configured for sensing a second user variable associated with a second user of the second vehicle 318.

In further embodiments, the first user variable may include a first user location and a first user orientation. Further, the second user variable may include a second user location and a second user orientation. Further, the first presentation device may include a first head mount display. Further, the second presentation device may include a second head mount display.

In further embodiments, the first head mount display may include a first user location sensor of the first sensor 310 configured for sensing the first user location and a first user orientation sensor of the first sensor 310 configured for sensing the first user orientation. Further, the second head mount display may include a second user location sensor of the second sensor 320 configured for sensing the second user location, a second user orientation sensor of the second sensor 320 configured for sensing the second user orientation.

In further embodiments, the first vehicle 308 may include a first user location sensor of the first sensor 310 configured for sensing the first user location and a first user orientation sensor of the first sensor 310 configured for sensing the first user orientation. Further, the second vehicle 318 may include a second user location sensor of the second sensor 320 configured for sensing the second user location, a second user orientation sensor of the second sensor 320 configured for sensing the second user orientation.

In further embodiments, the first user orientation sensor may include a first gaze sensor configured for sensing a first eye gaze of the first user. Further, the second user orientation sensor may include a second gaze sensor configured for sensing a second eye gaze of the second user.

In further embodiments, the first user location sensor may include a first proximity sensor configured for sensing the first user location in relation to the first presentation device 314. Further, the second user location sensor may include a second proximity sensor configured for sensing the second user location in relation to the second presentation device 324.

Further, in some embodiments, the first presentation sensor 328 may include at least one sensor configured for sensing at least one first physical variable associated with the first presentation device 314 associated with the first vehicle 308, such as due to a G-Force, a frictional force, and an uneven movement of the first vehicle 308. For instance, the first presentation sensor 328 may include at least one camera configured to monitor the movement of the first presentation device 314 associated with the first vehicle 308. Further, the first presentation sensor 328 may include at least one accelerometer sensor configured to monitor an uneven movement of the first presentation device 314 associated with the first vehicle 308, such as due to a G-Force, a frictional force, and an uneven movement of the first vehicle 308. Further, the first presentation sensor 328 may include at least one gyroscope sensor configured to monitor an uneven orientation of the first presentation device 314 associated with the first vehicle 308, such as due to a G-Force, a frictional force, and an uneven movement of the first vehicle 308.

Further, the second presentation sensor 330 may include at least one sensor configured for sensing at least one first physical variable associated with the second presentation device 324 associated with the second vehicle 318, such as due to a G-Force, a frictional force, and an uneven movement of the second vehicle 318. For instance, the second presentation sensor 330 may include at least one camera configured to monitor a movement of the second presentation device 324 associated with the second vehicle 318. Further, the second presentation sensor 330 may include at least one accelerometer sensor configured to monitor an uneven movement of the second presentation device 324 associated with the second vehicle 318, such as due to a G-Force, a frictional force, and an uneven movement of the second vehicle 318. Further, the second presentation sensor 330 may include at least one gyroscope sensor configured to monitor an uneven orientation of the second presentation device 324 associated with the second vehicle 318, such as due to a G-Force, a frictional force, and an uneven movement of the second vehicle 318.

In some embodiments, the first head mount display may include a first see-through display device. Further, the second head mount display may include a second see-through display device.

In some embodiments, the first head mount display may include a first optical marker configured to facilitate determination of one or more of the first user location and the first user orientation. Further, the first sensor 310 may include a first camera configured for capturing a first image of the first optical marker. Further, the first sensor 310 may be communicatively coupled to a first processor associated with the vehicle. Further, the first processor may be configured for determining one or more of the first user location and the first user orientation based on analysis of the first image. Further, the second head mount display may include a second optical marker configured to facilitate determination of one or more of the second user location and the second user orientation. Further, the second sensor 320 may include a second camera configured for capturing a second image of the second optical marker. Further, the second sensor 320 may be communicatively coupled to a second processor associated with the vehicle. Further, the second processor may be configured for determining one or more of the second user location and the second user orientation based on analysis of the second image.

In some embodiments, the first presentation device may include a first see-through display device disposed in a first windshield of the first vehicle 308. Further, the second presentation device may include a second see-through display device disposed in a second windshield of the second vehicle 318.

In some embodiments, the first vehicle 308 may include a first watercraft, a first land vehicle, a first aircraft and a first amphibious vehicle. Further, the second vehicle 318 may include a second watercraft, a second land vehicle, a second aircraft and a second amphibious vehicle.

In some embodiments, the second optimized presentation data may include one or more of a first visual data, a first audio data and a first haptic data. Further, the second optimized presentation data may include one or more of a second visual data, a second audio data and a second haptic data.

In some embodiments, the first presentation device 314 may include at least one environmental variable actuator configured for controlling at least one first environmental variable associated with the first vehicle 308 based on the first optimized presentation data. Further, the second presentation device 324 may include at least one environmental variable actuator configured for controlling at least one second environmental variable associated with the second vehicle 318 based on the second optimized presentation data. In further embodiments, the first environmental variable may include one or more of a first temperature level, a first humidity level, a first pressure level, a first oxygen level, a first ambient light, a first ambient sound, a first vibration level, a first turbulence, a first motion, a first speed, a first orientation and a first acceleration, the second environmental variable may include one or more of a second temperature level, a second humidity level, a second pressure level, a second oxygen level, a second ambient light, a second ambient sound, a second vibration level, a second turbulence, a second motion, a second speed, a second orientation and a second acceleration.

In some embodiments, the first vehicle 308 may include each of the first sensor 310 and the first presentation device 314. Further, the second vehicle 318 may include each of the second sensor 320 and the second presentation device 324.

In some embodiments, the storage device 306 may be further configured for storing a first three-dimensional model corresponding to the first vehicle 308 and a second three-dimensional model corresponding to the second vehicle 318. Further, the generating of the first optimized presentation data may be based further on the second three-dimensional model. Further, the generating of the second optimized presentation data may be based further on the first three-dimensional model.

Further, the generating of the first optimized presentation data may be based on the determining of the unwanted movement of the associated with the first presentation device 314 associated with the first vehicle 308, such as due to a G-Force, a frictional force, and an uneven movement of the first vehicle 308. For instance, the first presentation sensor 328 may include at least one camera configured to monitor the movement of the first presentation device 314 associated with the first vehicle 308. Further, the first presentation sensor 328 may include at least one accelerometer sensor configured to monitor an uneven movement of the first presentation device 314 associated with the first vehicle 308, such as due to a G-Force, a frictional force, and an uneven movement of the first vehicle 308. Further, the first presentation sensor 328 may include at least one gyroscope sensor configured to monitor an uneven orientation of the first presentation device 314 associated with the first vehicle 308, such as due to a G-Force, a frictional force, and an uneven movement of the first vehicle 308.

Further, the generating of the second optimized presentation data may be based on the determining of the unwanted movement of the second presentation device 324 associated with the second vehicle 318, such as due to a G-Force, a frictional force, and an uneven movement of the second vehicle 318. For instance, the second presentation sensor 330 may include at least one camera configured to monitor a movement of the second presentation device 324 associated with the second vehicle 318. Further, the second presentation sensor 330 may include at least one accelerometer sensor configured to monitor an uneven movement of the second presentation device 324 associated with the second vehicle 318, such as due to a G-Force, a frictional force, and an uneven movement of the second vehicle 318. Further, the second presentation sensor 330 may include at least one gyroscope sensor configured to monitor an uneven orientation of the second presentation device 324 associated with the second vehicle 318, such as due to a G-Force, a frictional force, and an uneven movement of the second vehicle 318.

In some embodiments, the communication device 302 may be further configured for receiving an administrator command from an administrator device. Further, the generating of one or more of the first optimized presentation data and the second optimized presentation data may be based further on the administrator command. In further embodiments, the first presentation model may include at least one first virtual object model corresponding to at least one first virtual object. Further, the second presentation model may include at least one second virtual object model corresponding to at least one second virtual object. Further, the generating of the first virtual object model may be independent of the second sensor model. Further, the generating of the second virtual object model may be independent of the first sensor model. Further, the generating of one or more of the first virtual object model and the second virtual object model may be based on the administrator command. Further, the storage device 306 may be configured for storing the first virtual object model and the second virtual object model.

In further embodiments, the administrator command may include a virtual distance parameter. Further, the generating of each of the first optimized presentation data and the second optimized presentation data may be based on the virtual distance parameter.

In further embodiments, the first sensor data may include at least one first proximity data corresponding to at least one first external real object in a vicinity of the first vehicle 308. Further, the second sensor data may include at least one second proximity data corresponding to at least one second external real object in a vicinity of the second vehicle 318. Further, the generating of the first optimized presentation data may be based further on the second proximity data. Further, the generating of the second optimized presentation data may be based further on the first proximity data. In further embodiments, the first external real object may include a first cloud, a first landscape feature, a first man-made structure and a first natural object. Further, the second external real object may include a second cloud, a second landscape feature, a second man-made structure and a second natural object.

In some embodiments, the first sensor data may include at least one first image data corresponding to at least one first external real object in a vicinity of the first vehicle 308. Further, the second sensor data may include at least one second image data corresponding to at least one second external real object in a vicinity of the second vehicle 318. Further, the generating of the first optimized presentation data may be based further on the second image data. Further, the generating of the second optimized presentation data may be based further on the first image data.

In some embodiments, the communication device 302 may be further configured for transmitting server authentication data to the first receiver 316. Further, the first receiver 316 may be communicatively coupled to the first processor associated with the first presentation device. Further, the first processor may be communicatively coupled to a first memory device configured to store first authentication data. Further, the first processor may be configured for performing a first server authentication based on the first authentication data and the server authentication data. Further, the first processor may be configured for controlling presentation of the first optimized presentation data on the first presentation device 314 based on the first server authentication. Further, the communication device 302 may be configured for transmitting server authentication data to the second receiver 326. Further, the second receiver 326 may be communicatively coupled to the second processor associated with the second presentation device. Further, the second processor may be communicatively coupled to a second memory device configured to store a second authentication data. Further, the second processor may be configured for performing a second server authentication based on the second authentication data and the server authentication data. Further, the second processor may be configured for controlling presentation of the second optimized presentation data on the second presentation device 324 based on the second server authentication. Further, the communication device 302 may be configured for receiving a first client authentication data from the first transmitter 312. Further, the storage device 306 may be configured for storing the first authentication data. Further, the communication device 302 may be configured for and receiving a second client authentication data from the second transmitter 322. Further, the storage device 306 may be configured for storing the second authentication data. Further, the processing device 304 may be further configured for performing a first client authentication based on the first client authentication data and the first authentication data. Further, the generating of the second optimized presentation data may be further based on the first client authentication. Further, the processing device 304 may be configured for performing a second client authentication based on the second client authentication data and the second authentication data. Further, the generating of the first optimized presentation data may be further based on the second client authentication.

Figure 4:
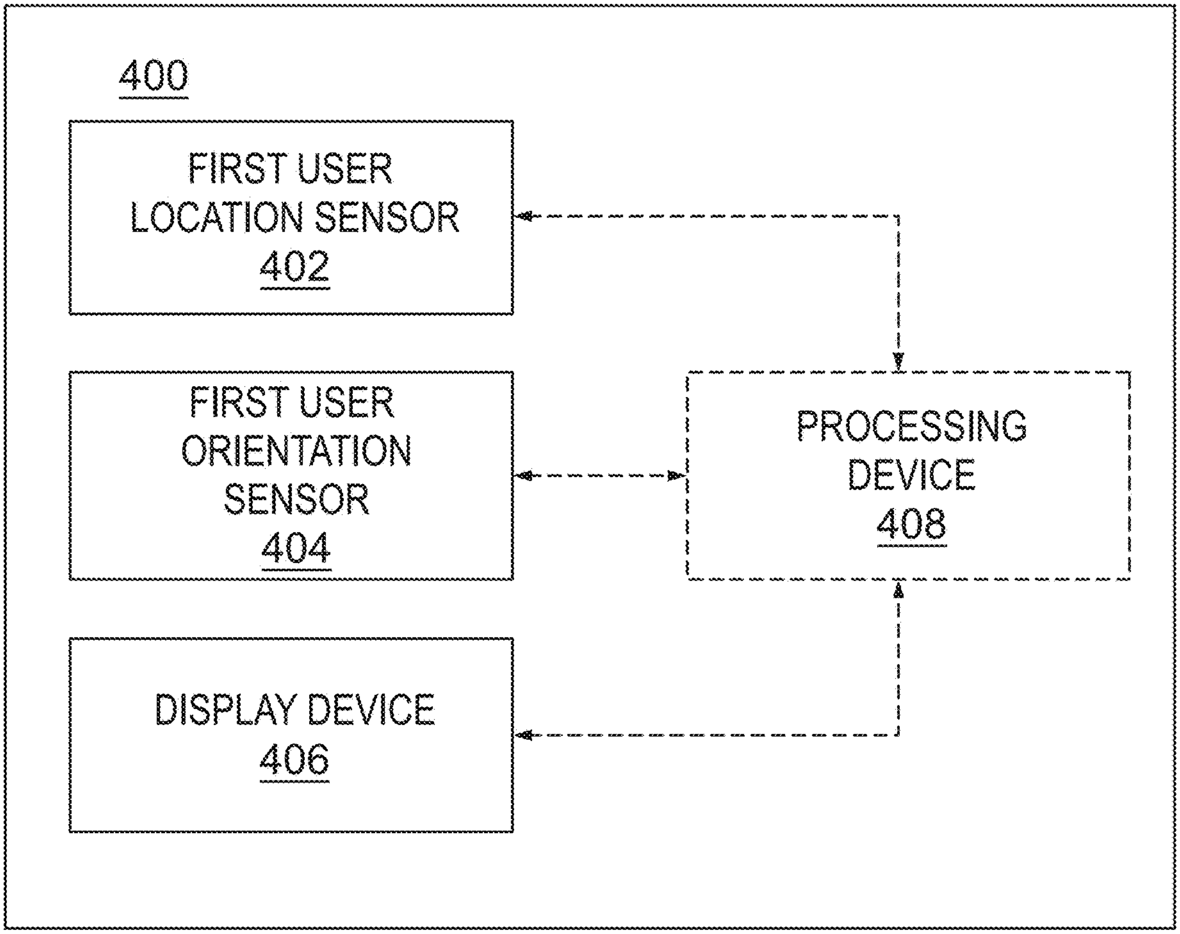
FIG. 4 is a block diagram of a first head mount display for facilitating provisioning of a virtual experience in accordance with some embodiments.

FIG. 4 is a block diagram of a first head mount display 400 for facilitating provisioning of a virtual experience in accordance with some embodiments. The first head mount display 400 may include a first user location sensor 402 of the first sensor configured for sensing the first user location and a first user orientation sensor 404 of the first sensor configured for sensing the first user orientation.

Further, the first head mount display 400 may include a display device 406 to present visuals. Further, in an embodiment, the display device 406 may be configured for displaying the first optimized display data, as generated by the processing device 408.

Further, the first head mount display 400 may include a processing device 408 configured to obtain sensor data from the first user location sensor 402 and the first user orientation sensor 404. Further, the processing device 408 may be configured to send visuals to the display device 406.

Figure 5:
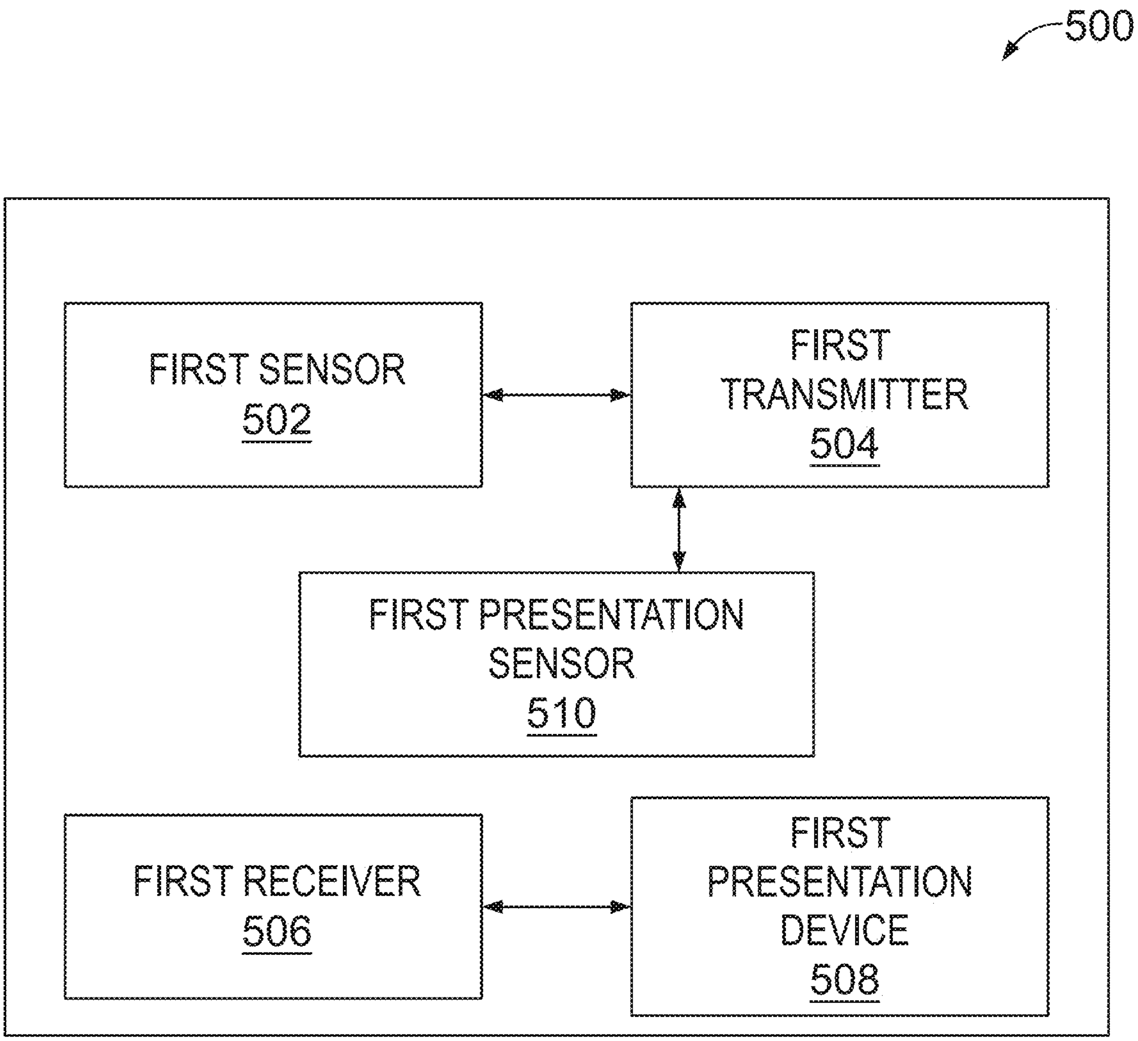
FIG. 5 is a block diagram of an apparatus for facilitating provisioning of a virtual experience in accordance with some embodiments.

FIG. 5 is a block diagram of an apparatus 500 for facilitating provisioning of a virtual experience in accordance with some embodiments. The apparatus 500 may include at least one first sensor 502 (such as the first sensor 310) configured for sensing at least one first sensor data associated with a first vehicle (such as the first vehicle 308).

Further, the apparatus 500 may include at least one first presentation sensor 510 (such as the first presentation sensor 328) configured for sensing at least one first presentation sensor data associated with a first vehicle (such as the first vehicle 308). Further, in an embodiment, the first presentation sensor 510 may include a disturbance sensor, such as the disturbance sensor 208 configured for sensing a disturbance in a first spatial relationship between at least one first presentation device 508 associated with the first vehicle, and a first user. Further, the spatial relationship between the first presentation device 508 and the first user may include at least one of distance or orientation. For instance, the first spatial relationship may include an exact distance, and an orientation, such as a precise angle between the first presentation device 508 and the eyes of the first user. Further, the disturbance in the first spatial relationship may include a change in the at least of the distance and the orientation between the first presentation device 314 and the first user.

Further, the apparatus 500 may include a first transmitter 504 (such as the first transmitter 312) configured to be communicatively coupled to the at least first sensor 502, and the first presentation sensor 510. Further, the first transmitter 504 may be configured for transmitting the first sensor data and the first presentation sensor data to a communication device (such as the communication device 302) of a system over a first communication channel.

Further, the apparatus 500 may include a first receiver 506 (such as the first receiver 316) configured for receiving the first optimized presentation data from the communication device over the first communication channel.

Further, the apparatus 500 may include the first presentation device 508 (such as the first presentation device 314) configured to be communicatively coupled to the first receiver 506. The first presentation device 508 may be configured for presenting the at least one first optimized presentation data.

Further, the communication device may be configured for receiving at least one second sensor data corresponding to at least one second sensor (such as the second sensor 320) associated with a second vehicle (such as the second vehicle 318). Further, the second sensor may be communicatively coupled to a second transmitter (such as the second transmitter 322) configured for transmitting the second sensor data over a second communication channel. Further, the system may include a processing device (such as the processing device 304) communicatively coupled to the communication device. Further, the processing device may be configured for generating the first optimized presentation data based on the second sensor data.

Figure 6:
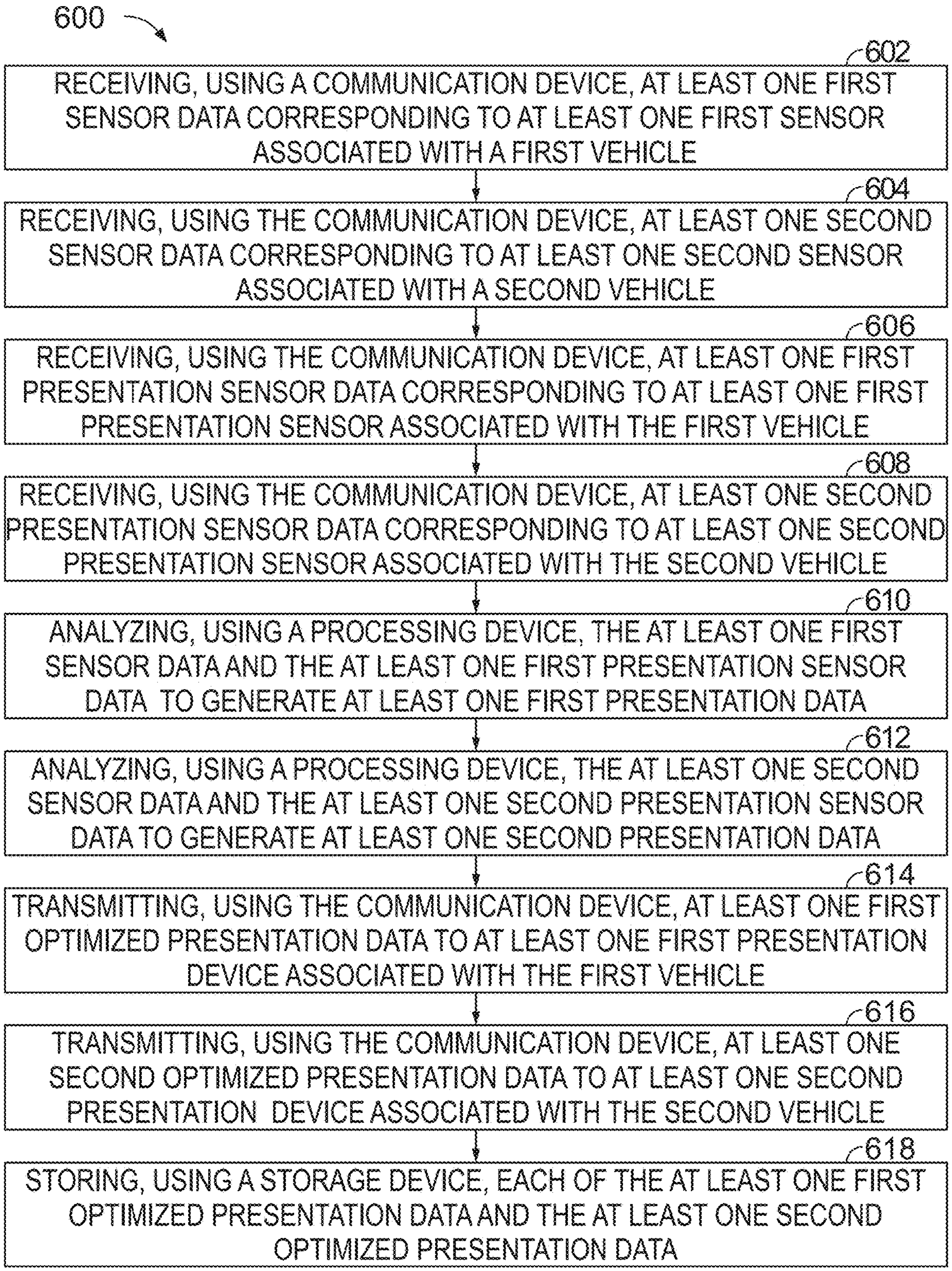
FIG. 6 is a flowchart of a method of facilitating provisioning of a virtual experience in accordance with some embodiments.

FIG. 6 is a flowchart of method 600 of facilitating provisioning of a virtual experience in accordance with some embodiments. At 602, the method 600 may include receiving, using a communication device (such as the communication device 302), at least one first sensor data corresponding to at least one first sensor (such as the first sensor 310) associated with a first vehicle (such as the first vehicle 308). Further, the first sensor may be communicatively coupled to a first transmitter (such as the first transmitter 312) configured for transmitting the first sensor data over a first communication channel.

At 604, the method 600 may include receiving, using the communication device, at least one second sensor data corresponding to at least one second sensor (such as the second sensor 320) associated with a second vehicle (such as the second vehicle 318). Further, the second sensor may be communicatively coupled to a second transmitter (such as the second transmitter 322) configured for transmitting the second sensor data over a second communication channel.

At 606, the method 600 may include receiving, using the communication device, a first presentation sensor data corresponding to at least one first presentation sensor 328 associated with the first vehicle. Further, the first presentation sensor may be communicatively coupled to the first transmitter configured for transmitting the first presentation sensor data over the first communication channel. Further, the first presentation sensor may include at least one sensor configured to monitor a movement of at least one first presentation device associated with the first vehicle, such as due to a G-Force, a frictional force, and an uneven movement of the first vehicle. For instance, the first presentation sensor may include at least one camera configured to monitor the movement of the first presentation device associated with the first vehicle. Further, the first presentation sensor may include at least one accelerometer sensor configured to monitor an uneven movement of the first presentation device associated with the first vehicle, such as due to a G-Force, a frictional force, and an uneven movement of the first vehicle. Further, the first presentation sensor may include at least one gyroscope sensor configured to monitor an uneven orientation of the first presentation device associated with the first vehicle, such as due to a G-Force, a frictional force, and an uneven movement of the first vehicle.

At 608, the method 600 may include receiving, using the communication device, a second presentation sensor data corresponding to at least one second presentation sensor 330 associated with the second vehicle. Further, the second presentation sensor may be communicatively coupled to the second transmitter configured for transmitting the second presentation sensor data over the second communication channel. Further, the second presentation sensor may include at least one sensor configured to monitor a movement of at least one second presentation device associated with the second vehicle, such as due to a G-Force, a frictional force, and an uneven movement of the second vehicle. For instance, the second presentation sensor may include at least one camera configured to monitor the movement of the second presentation device associated with the second vehicle. Further, the second presentation sensor may include at least one accelerometer sensor configured to monitor an uneven movement of the second presentation device associated with the second vehicle, such as due to a G-Force, a frictional force, and an uneven movement of the second vehicle. Further, the second presentation sensor may include at least one gyroscope sensor configured to monitor an uneven orientation of the second presentation device associated with the second vehicle, such as due to a G-Force, a frictional force, and an uneven movement of the second vehicle.

At 610, the method 600 may include analyzing, using a processing device, the first sensor data and the first presentation sensor data to generate at least one first modified presentation data. The analyzing may include determining an unwanted movement of the first presentation device associated with the first vehicle, such as due to a G-Force, a frictional force, and an uneven movement of the first vehicle. Further, the unwanted movement of the first presentation device associated with the first vehicle may include an upward movement, a downward movement, a leftward movement, and a rightward movement. Further, the generating of the first optimized presentation data may be based on the unwanted movement of the first presentation device associated with the first vehicle, such as due to a G-Force, a frictional force, and an uneven movement of the first vehicle. For instance, the generating of the first optimized presentation data may be based on negating an effect of the unwanted movement of the first presentation device associated with the first vehicle. For instance, if the unwanted movement of the first presentation device associated with the first vehicle includes an upward movement, a downward movement, a leftward movement, and a rightward movement, the generating of the first optimized presentation data may include moving one or more components of the first modified presentation data in an oppositely downward direction, an upward direction, a rightward direction, and a leftward direction respectively.

At 612, the method 600 may include analyzing, using a processing device, the second sensor data and the second presentation sensor data to generate at least one second presentation data. The analyzing may include determining an unwanted movement of the second presentation device associated with the second vehicle, such as due to a G-Force, a frictional force, and an uneven movement of the second vehicle. Further, the unwanted movement of the second presentation device associated with the second vehicle may include an upward movement, a downward movement, a leftward movement, and a rightward movement. Further, the generating of the second optimized presentation data may be based on the unwanted movement of the second presentation device associated with the second vehicle, such as due to a G-Force, a frictional force, and an uneven movement of the second vehicle. For instance, the generating of the second optimized presentation data may be based on negating an effect of the unwanted movement of the second presentation device associated with the second vehicle. For instance, if the unwanted movement of the second presentation device associated with the second vehicle includes an upward movement, a downward movement, a leftward movement, and a rightward movement, the generating of the second optimized presentation data may include moving one or more components of the second presentation data in an oppositely downward direction, an upward direction, a rightward direction, and a leftward direction respectively.

At 614, the method 600 may include transmitting, using the communication device, at least one first optimized presentation data to at least one first presentation device associated with the first vehicle. Further, the first presentation device may include a first receiver (such as the first receiver 316) configured for receiving the first modified presentation data over the first communication channel. Further, the presentation device may be configured for presenting the first optimized presentation data.

At 616, the method 600 may include transmitting, using the communication device, at least one second optimized presentation data to at least one second presentation device (such as the second presentation device 324) associated with the second vehicle. Further, the second presentation device may include a second receiver (such as the second receiver 326) configured for receiving the second presentation data over the second communication channel. Further, the presentation device may be configured for presenting the second optimized presentation data.

At 618, the method 600 may include storing, using a storage device (such as the storage device 306), each of the first optimized presentation data and the second optimized presentation data.

Figure 7:
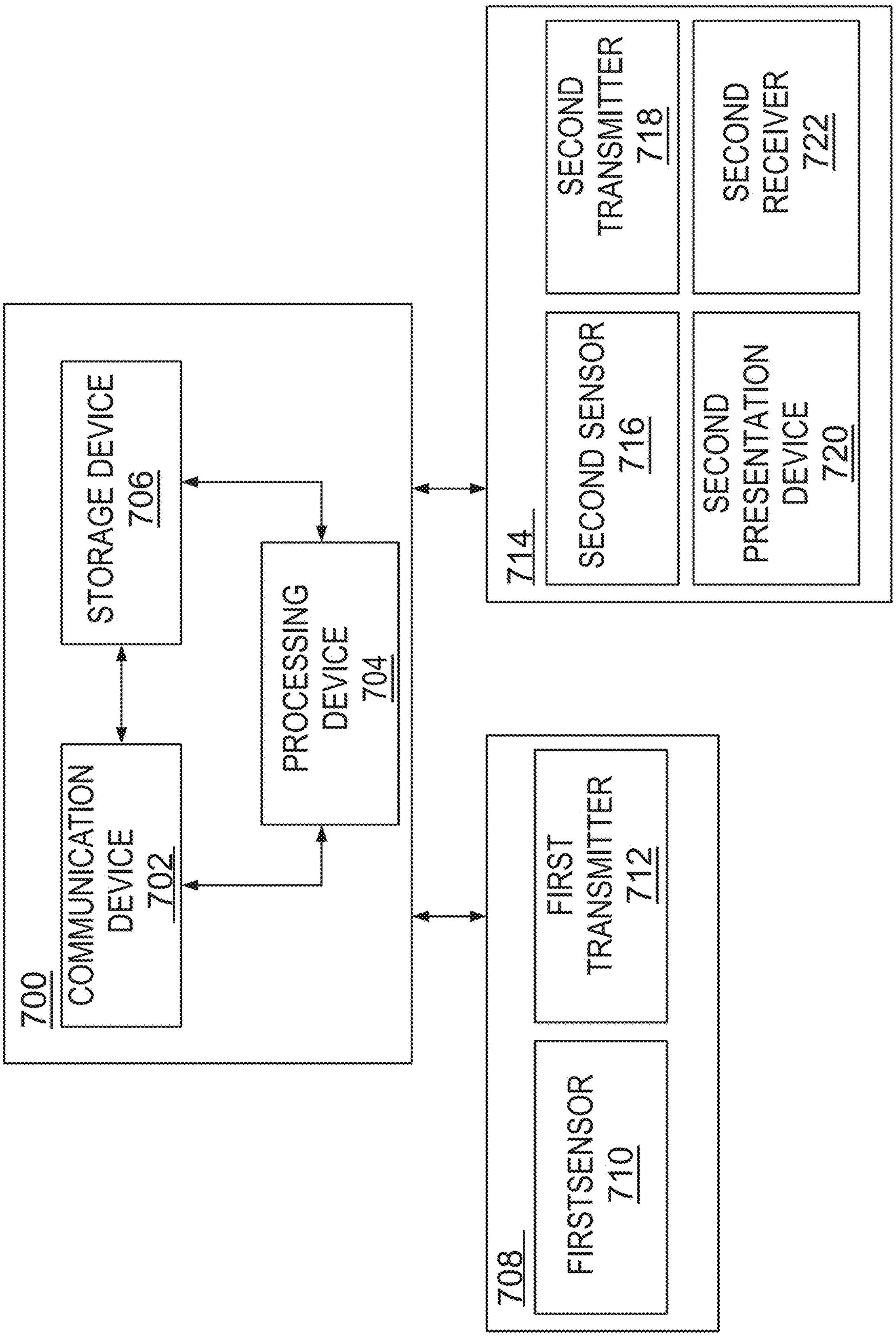
FIG. 7 shows a system for facilitating provisioning of a virtual experience, in accordance with some embodiments.

FIG. 7 shows system 700 for facilitating provisioning of a virtual experience, in accordance with some embodiments. The system 700 may include a communication device 702 configured for receiving at least one first sensor data corresponding to at least one first sensor 710 associated with a first vehicle 708. Further, the first sensor 710 may be communicatively coupled to a first transmitter 712 configured for transmitting the first sensor data over a first communication channel.

Further, the communication device 702 may be configured for receiving at least one second sensor data corresponding to at least one second sensor 716 associated with a second vehicle 714. Further, the second sensor 716 may include a second location sensor configured to detect a second location associated with the second vehicle 714. Further, the second sensor 716 may be communicatively coupled to a second transmitter 718 configured for transmitting the second sensor data over a second communication channel. Further, in some embodiments, the second sensor 716 may include a second user sensor configured for sensing a second user variable associated with a second user of the second vehicle 714. Further, the second user variable may include a second user location and a second user orientation.

Further, in some embodiments, the second sensor 716 may include a disturbance sensor, such as the disturbance sensor 208 configured for sensing a disturbance in a spatial relationship between a second presentation device 720 associated with the second vehicle 714 and the second user of the second vehicle 714. Further, the spatial relationship between the second presentation device 720 and the second user may include at least one of distance or orientation. For instance, the spatial relationship may include an exact distance, and an orientation, such as a precise angle between the second presentation device 720 and the eyes of the second user.

Further, the disturbance in the spatial relationship may include a change in at least of distance or orientation between the second presentation device 720 and the second user. Further, the disturbance in the spatial relationship may lead to an alteration in how the second user may view at least one second presentation data. For instance, if the disturbance in the spatial relationship leads to a reduction in the distance between the second presentation device 720 and the second user, the second user may perceive one or more objects in the second presentation data to be closer. For instance, if the spatial relationship between the second presentation device 720 and the second user specifies a distance of "x" centimeters, and the disturbance in the spatial relationship leads to a reduction in the distance between the second presentation device 720 and the second user to "y" centimeters, the second user may perceive the second presentation data to be closer by "x-y" centimeters.

Further, the communication device 702 may be configured for transmitting the second presentation data to the second presentation device 720 associated with the second vehicle 714. Further, the second presentation data may include at least one second virtual object model corresponding to at least one second virtual object. Further, in some embodiments, the second virtual object may include one or more of a navigational marker and an air-corridor.

Further, in an embodiment, the second presentation data may include a second corrected display data generated based on a second correction data. Further, the second presentation device 720 may include a second receiver 722 configured for receiving the second presentation data over the second communication channel. Further, the second presentation device 720 may be configured for presenting the second presentation data. Further, in some embodiments, the second presentation device 720 may include a second head mount display. Further, the second head mount display may include a second user location sensor of the second sensor 716 configured for sensing the second user location and a second user orientation sensor of the second sensor 716 configured for sensing the second user orientation. Further, the second head mount display may include a second see-through display device.

Figure 8:
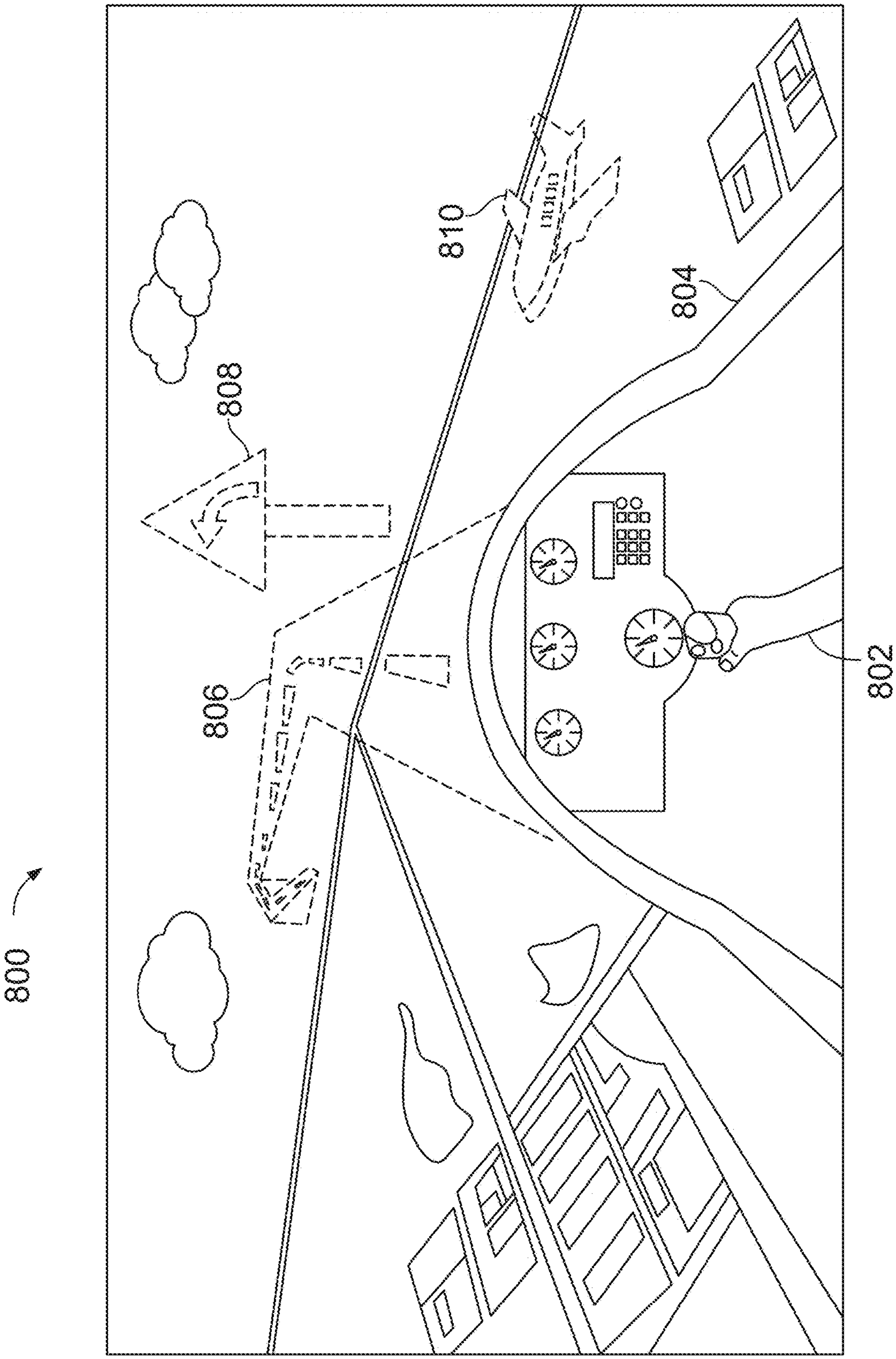
FIG. 8 shows a corrected augmented reality view, in accordance with some embodiments.

Further, in some embodiments, the second virtual object model may include a corrected augmented reality view, such as the corrected augmented reality view 800. Further, the augmented reality view 800 may include one or more second virtual objects such as a navigational marker 808, and a skyway 806 as shown in FIG. 8).

Further, the system 700 may include a processing device 704 configured for generating the second presentation data based on the first sensor data and the second sensor data. Further, the generating of the second virtual object model may be independent of the first sensor data. Further, in some embodiments, the processing device 704 may be configured for determining a second airspace class associated with the second vehicle 714 based on the second location including a second altitude associated with the second vehicle 714. Further, the generating of the second virtual object model may be based on the second airspace class.

Further, the processing device 704 may be configured for generating the second correction data based on the analyzing the second sensor data associated with the second vehicle 714. Further, the second correction data may include an instruction to shift a perspective view of the second presentation data to compensate for the disturbance in the spatial relationship between the second presentation device 720 and the second user. Accordingly, the second correction data may be generated contrary to the disturbance in the spatial relationship. For instance, the disturbance may include an angular disturbance, wherein the second presentation device 720 may undergo an angular displacement as a result of the angular disturbance. Accordingly, the second correction data may include an instruction of translation to generate the second corrected display data included in the second presentation data to compensate for the angular disturbance.

For instance, if the second presentation data includes the second virtual object model may include a corrected augmented reality view, such as the corrected augmented reality view 800, the second correction data may include an instruction to shift a perspective view of the second presentation data to compensate for the disturbance in the spatial relationship between the second presentation device 720 and the second user (such as a pilot 802). For instance, if the disturbance in the spatial relationship includes a reduction in the distance between the second presentation device 720, the second correction data may include an instruction to shift a perspective view of the second presentation data to compensate for the disturbance in the spatial relationship between the second presentation device 720 and the second user, such as by projection of the one or more second virtual objects, such as the navigational marker 808, and the skyway 806 at a distance to compensate the disturbance and to generate the corrected augmented reality view 800.

Further, the system 700 may include a storage device 706 configured for storing the second presentation data. Further, in some embodiments, the storage device 706 may be configured for retrieving the second virtual object model based on the second location associated with the second vehicle 714. Further, in some embodiments, the storage device 706 may be configured for storing a first three-dimensional model corresponding to the first vehicle 708. Further, the generating of the second presentation data may be based on the first three-dimensional model.

Further, in some embodiments, the communication device 702 may be configured for receiving an administrator command from an administrator device. Further, the generating of the second virtual object model may be based on the administrator command.

Further, in some embodiments, the communication device 702 may be configured for transmitting at least one first presentation data to at least one first presentation device (not shown) associated with the first vehicle 708. Further, the first presentation device may include a first receiver configured for receiving the first presentation data over the first communication channel. Further, the first presentation device may be configured for presenting the first presentation data. Further, in some embodiments, the processing device 704 may be configured for generating the first presentation data based on the second sensor data. Further, in some embodiments, the storage device 706 may be configured for storing the first presentation data. Further, in some embodiments, the storage device 706 may be configured for storing a second three-dimensional model corresponding to the second vehicle 714. Further, the generating of the first presentation data may be based on the second three-dimensional model.

Further, in some embodiments, the first presentation data may include at least one first virtual object model corresponding to at least one first virtual object. Further, the generating of the first virtual object model may be independent of the second sensor data. Further, the storage device 706 may be configured for storing the first virtual object model.

Figure 9:
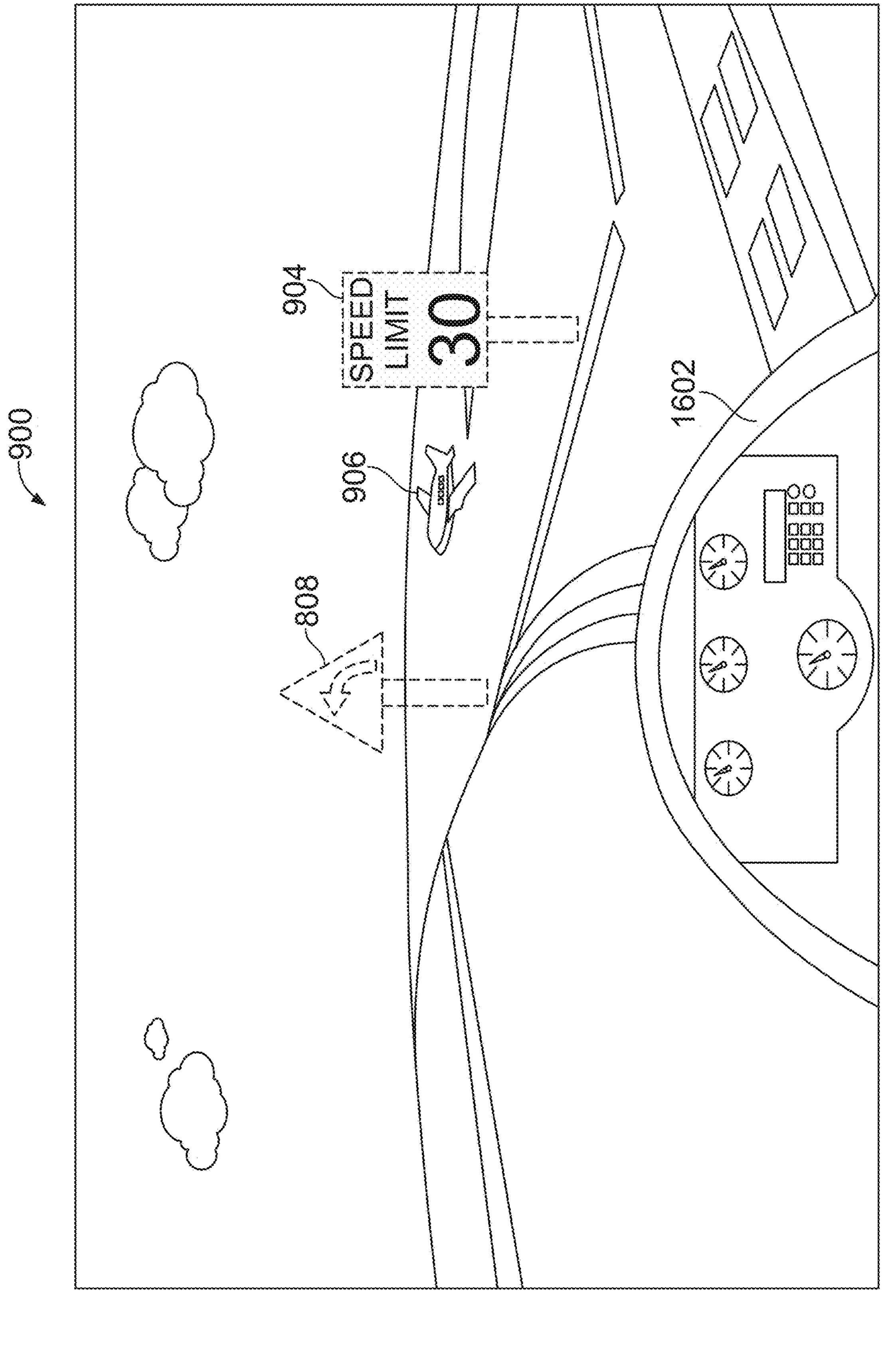
FIG. 9 shows an augmented reality view shown to a real pilot while a civilian aircraft is taxiing at an airport, in accordance with an exemplary embodiment.

Further, in some exemplary embodiment, the communication device 702 may be configured for receiving at least one second sensor data corresponding to at least one second sensor 716 associated with a second vehicle 714. Further, the second sensor 716 may be communicatively coupled to a second transmitter 718 configured for transmitting the second sensor data over a second communication channel. Further, the communication device 702 may be configured for receiving at least one first sensor data corresponding to at least one first sensor 710 associated with a first vehicle 708. Further, the first sensor 710 may include a first location sensor configured to detect a first location associated with the first vehicle 708. Further, the first sensor 710 may be communicatively coupled to a first transmitter 712 configured for transmitting the first sensor data over a first communication channel. Further, in some embodiments, the first sensor 710 may include a first user sensor configured for sensing a first user variable associated with a first user of the first vehicle 708. Further, the first user variable may include a first user location and a first user orientation. Further, the communication device 702 configured for transmitting at least one first presentation data to at least one first presentation device (not shown) associated with the first vehicle 708. Further, the first presentation data may include at least one first virtual object model corresponding to at least one first virtual object. Further, in some embodiments, the first virtual object may include one or more of a navigational marker (such as a navigational marker 808, and/or a signboard 904 as shown in FIG. 9) and an air-corridor (such as a skyway 806 as shown in FIG. 8). Further, the first presentation device may include a first receiver configured for receiving the first presentation data over the first communication channel. Further, the first presentation device may be configured for presenting the first presentation data. Further, in some embodiments, the first presentation device may include a first head mount display. Further, the first head mount display may include a first user location sensor of the first sensor 710 configured for sensing the first user location and a first user orientation sensor of the first sensor 710 configured for sensing the first user orientation. Further, the first head mount display may include a first see-through display device. Further, the processing device 704 may be configured for generating the first presentation data based on the second sensor data and the first sensor data. Further, the generating of the first virtual object model may be independent of the second sensor data. Further, in some embodiments, the processing device 704 may be configured for determining a first airspace class associated with the first vehicle 708 based on the first location including a first altitude associated with the first vehicle 708. Further, the generating of the first virtual object model may be based on the first airspace class. Further, in some embodiments, the storage device 706 may be configured for storing the first presentation data. Further, in some embodiments, the storage device 706 may be configured for retrieving the first virtual object model based on the first location associated with the first vehicle 708. Further, in some embodiments, the storage device 706 may be configured for storing a second three-dimensional model corresponding to the second vehicle 714. Further, the generating of the first presentation data may be based on the second three-dimensional model. Further, in some embodiments, the communication device 702 may be configured for receiving an administrator command from an administrator device. Further, the generating of the first virtual object model may be based on the administrator command. Further, in some embodiments, the communication device 702 may be configured for transmitting at least one second presentation data to at least one second presentation device (such as the second presentation device 720) associated with the second vehicle 714. Further, the second presentation device may include a second receiver (such as the second receiver 722) configured for receiving the second presentation data over the second communication channel. Further, the second presentation device may be configured for presenting the second presentation data. Further, in some embodiments, the processing device 704 may be configured for generating the second presentation data based on the first sensor data. Further, in some embodiments, the storage device 706 may be configured for storing the second presentation data. Further, in some embodiments, the storage device 706 may be configured for storing a first three-dimensional model corresponding to the first vehicle 708. Further, the generating of the second presentation data may be based on the first three-dimensional model. Further, in some embodiments, the second presentation data may include at least one second virtual object model corresponding to at least one second virtual object. Further, the generating of the second virtual object model may be independent of the first sensor data. Further, the storage device 706 may be configured for storing the second virtual object model.

FIG. 8 shows the corrected augmented reality view 800. Further, the augmented reality view 800 may include a road drawn in the sky (such as the skyway 806) indicating a path that a civilian aircraft 804 may take in order to land at an airport. Further, the augmented reality view 800 may include the navigation marker 808 indicating to a pilot 802 that the civilian aircraft 804 should take a left turn. The navigation marker 808 may assist the pilot 802 in navigating towards a landing strip to land the civilian aircraft 804.

Therefore, the corrected augmented reality view 800 may provide pilots with a similar view as seen by public transport drivers (e.g. taxi or bus) on the ground. The pilots (such as the pilot 802) may see roads (such as the skyway 806) that the pilot 802 needs to drive on. Further, the pilot 802, in an instance, may see signs just like a taxi driver who may just look out of a window and see road signs.

Further, the corrected augmented reality view 800 may include (but not limited to) one or more of skyways (such the skyway 806), navigation markers (such as the navigation marker 808), virtual tunnels, weather information, an air corridor, speed, signboards for precautions, airspace class, one or more parameters shown on a conventional horizontal situation indicator (HSI) etc. The skyways may indicate a path that an aircraft (such as the civilian aircraft 804) should take. The skyways may appear similar to roads on the ground. The navigation markers may be similar to regulatory road signs used on the roads on the ground. Further, the navigation markers may instruct pilots (such as the pilot 802) on what they must or should do (or not do) under a given set of circumstances. Further, the navigation markers may be used to reinforce air-traffic laws, regulations or requirements which apply either at all times or at specified times or places upon a flight path. For example, the navigation markers may include one or more of a left curve ahead sign, a right curve ahead sign, a keep left sign, and a keep to right sign. Further, the virtual tunnels may appear similar to tunnels on roads on the ground. The pilot 802 may be required to fly the aircraft through the virtual tunnel. Further, the weather information may include real-time weather data that affects flying conditions. For example, the weather information may include information related to one or more of wind speed, gust, and direction; variable wind direction; visibility, and variable visibility; temperature; precipitation; and cloud cover. Further, the air corridor may indicate an air route along which the aircraft is allowed to fly, especially when the aircraft is over a foreign country. Further, the corrected augmented reality view 800 may include speed information. The speed information may include one or more of a current speed, a ground speed, and a recommended speed. The signboards for precautions may be related to warnings shown to the pilot 802. The one or more parameters shown on a conventional horizontal situation indicator (HSI) include NAV warning flag, lubber line, compass warning flag, course select pointer, TO/FROM indicator, glideslope deviation scale, heading select knob, compass card, course deviation scale, course select knob, course deviation bar (CDI), symbolic aircraft, dual glideslope pointers, and heading select bug.

Further, in some embodiments, information such as altitude, attitude, airspeed, the rate of climb, heading, autopilot and auto-throttle engagement status, flight director modes and approach status etc. that may be displayed on a conventional primary flight display may also be displayed in the corrected augmented reality view 800.

Further, in some embodiments, the corrected augmented reality view 800 may include one or more of other vehicles (such as another airplane 810). Further, the one or more other vehicles, in an instance, may include one or more live vehicles (such as representing real pilots flying real aircraft), one or more virtual vehicles (such as representing real people on the ground, flying virtual aircraft), and one or more constructed vehicles (such as representing aircraft generated and controlled using computer graphics and processing systems).

In some embodiments, a special use airspace class may be determined. The special use airspace class may include alert areas, warning areas, restricted areas, prohibited airspace, military operation area, national security area, controlled firing areas etc. For an instance, if an aircraft (such as the civilian aircraft 804) enters a prohibited area by mistake, then a notification may be displayed in the corrected augmented reality view 800. Accordingly, the pilot 802 may reroute the aircraft towards a permitted airspace.

Further, the corrected augmented reality view 800 may include one or more live aircraft (representing real pilots flying real aircraft), one or more virtual aircraft (representing real people on the ground, flying virtual aircraft) and one or more constructed aircraft (representing aircraft generated and controlled using computer graphics and processing systems). Further, the corrected augmented reality view 800 shown to a pilot (such as the pilot 802) in a first aircraft (such as the civilian aircraft 804) may be modified based on sensor data received from another aircraft (such as another airplane). The sensor data may include data received from one or more internal sensors to track and localize the pilot's head within the cockpit of the aircraft. Further, the sensor data may include data received from one or more external sensors to track the position and orientation of the aircraft. Further, the data received from the one or more internal sensors and the one or more external sensors may be combined to provide a highly usable augmented reality solution in a fast-moving environment.

FIG. 9 shows an augmented reality view 900 shown to a real pilot while a civilian aircraft 902 is taxiing at an airport, in accordance with an exemplary embodiment. The augmented reality view 900 may include one or more navigational markers (such as the navigation marker 808) and signboards (such as a signboard 904) that assist a pilot to taxi the civilian aircraft 902 at the airport. The navigational markers may indicate the direction of movement. The signboards may indicate the speed limits.

The augmented reality view 900 may help the pilot to taxi the civilian aircraft 902 towards a parking location after landing. Further, augmented reality view 900 may help the pilot to taxi the civilian aircraft 902 towards a runway for take-off. Therefore, a ground crew may no longer be required to instruct the pilot while taxiing the civilian aircraft 902 at the airport.

Further, the augmented reality view 900 may include one or more live aircraft (such as a live aircraft 906) at the airport (representing real pilots in real aircraft), one or more virtual aircraft at the airport (representing real people on the ground, controlling a virtual aircraft) and one or more constructed aircraft at the airport (representing aircraft generated and controlled using computer graphics and processing systems). Further, the augmented reality view 900 shown to a pilot in a first aircraft may be modified based on sensor data received from another aircraft. The sensor data may include data received from one or more internal sensors to track and localize the pilot's head within the cockpit of the aircraft. Further, the sensor data may include data received from one or more external sensors to track the position and orientation of the aircraft. Further, the data received from the one or more internal sensors and the one or more external sensors may be combined to provide a highly usable augmented reality solution in a fast-moving environment.

In accordance with exemplary and non-limiting embodiments, the process of acquiring sensor information from one or more vehicles, maintaining a repository of data describing various real and virtual platforms and environments, and generating presentation data may be distributed among various platforms and among a plurality of processors.

Figure 10:
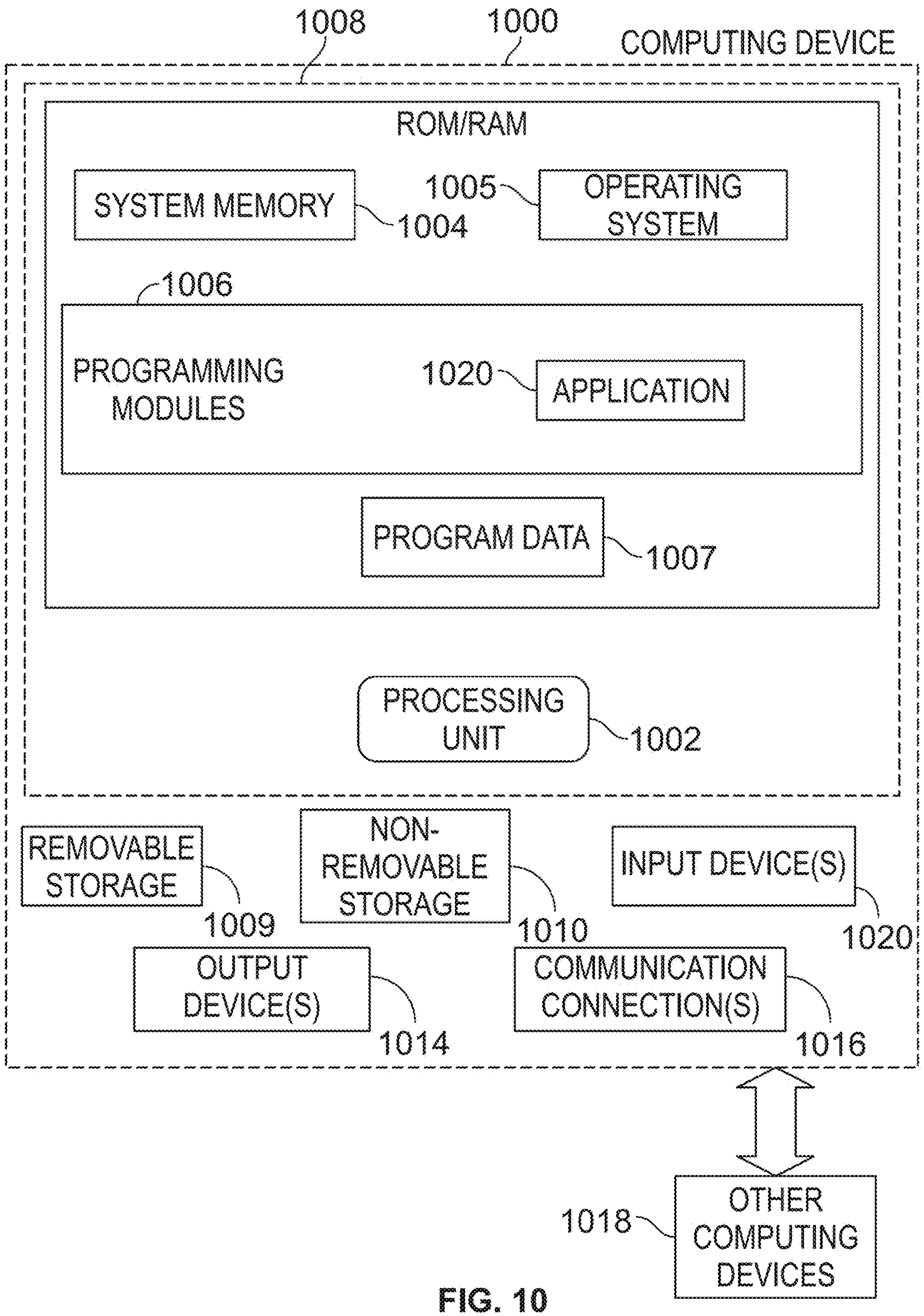
FIG. 10 is a block diagram of a computing device for implementing the methods disclosed herein, in accordance with some embodiments.

With reference to FIG. 10, a system consistent with an embodiment of the disclosure may include a computing device or cloud service, such as computing device 1000. In a basic configuration, computing device 1000 may include at least one processing unit 1002 and a system memory 1004. Depending on the configuration and type of computing device, system memory 1004 may include, but is not limited to, volatile (e.g. random-access memory (RAM)), non-volatile (e.g. read-only memory (ROM)), flash memory, or any combination. System memory 1004 may include operating system 1005, one or more programming modules 1006, and may include a program data 1007. Operating system 1005, for example, may be suitable for controlling computing device 1000's operation. In one embodiment, programming modules 1006 may include image-processing module, machine learning module and/or image classifying module. Furthermore, embodiments of the disclosure may be practiced in conjunction with a graphics library, other operating systems, or any other application program and is not limited to any particular application or system. This basic configuration is illustrated in FIG. 10 by those components within a dashed line 1008.

Computing device 1000 may have additional features or functionality. For example, computing device 1000 may also include additional data storage devices (removable and/or non-removable) such as, for example, magnetic disks, optical disks, or tape. Such additional storage is illustrated in FIG. 10 by a removable storage 1009 and a non-removable storage 1010. Computer storage media may include volatile and nonvolatile, removable and non-removable media implemented in any method or technology for storage of information, such as computer-readable instructions, data structures, program modules, or other data. System memory 1004, removable storage 1009, and non-removable storage 1010 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1000. Any such computer storage media may be part of device 1000. Computing device 1000 may also have input device(s) 1012 such as a keyboard, a mouse, a pen, a sound input device, a touch input device, a location sensor, a camera, a biometric sensor, etc. Output device(s) 1014 such as a display, speakers, a printer, etc. may also be included. The aforementioned devices are examples and others may be used.

Computing device 1000 may also contain a communication connection 1016 that may allow device 1000 to communicate with other computing devices 1018, such as over a network in a distributed computing environment, for example, an intranet or the Internet. Communication connection 1016 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1004, including operating system 1005. While executing on processing unit 1002, programming modules 1006 (e.g., application 1020 such as a media player) may perform processes including, for example, one or more stages of methods, algorithms, systems, applications, servers, databases as described above. The aforementioned process is an example, and processing unit 1002 may perform other processes. Other programming modules that may be used in accordance with embodiments of the present disclosure may include sound encoding/decoding applications, machine learning application, acoustic classifiers etc.

Asset operators, ground troops and others involved in military combat may find themselves in complex situations and they may have to make a series of decisions in quick succession to accomplish a mission. These individuals may have a plan and a leader, but each one, or group of people, still have to make individual decisions based on their training and information that they have about the situation. Communication and adherence to validated tactics is vital in such situations and insightful guidance provides a path to success. AI systems may process vast amounts of combat field data and provide insightful guidance to individuals, groups, leaders, etc. while they are being trained and while they are in combat situations.

There are many combat situations where AI systems may provide useful suggestions to military personnel in training and combat situations. For example, in accordance with an exemplary and non-limiting embodiment, a fighter pilot may be on a mission to escort and protect a strike package on a mission. The flight may encounter enemy fighters approaching to disrupt the package's mission. The escorting fighter pilot(s) has to make a decision on how to deal with the incoming fighters. The enemy may be a simple configuration of a manageable few assets, but the enemy may be a well-organized force with an advanced Integrated Air Defense System (IADS). The fighter pilot, and his flight, must manage this complex situation to accomplish the mission and avoid losses.

In accordance with exemplary and non-limiting embodiments, a mixed reality optical system is disclosed designed to provide high-resolution along with a very wide, and tall, field of view (FOV). As a reference, some augmented reality glasses achieve 60 degrees horizontal FOV. As described below, embodiments of the system expand the FOV to well over 100 degrees; in some cases, reaching 180 degrees or more. Some design embodiments are essentially only limited by the physical constraints provided by the user's head and mechanical systems holding the optical system. These very wide FOV optics may provide an uninterrupted user view from as far left to as far right as the user can move her eyes and see in her peripheral vision.

This wide effective FOV enables the creation of a mixed reality environment (e.g., augmented reality, virtual reality, etc.) where content positioning essentially never "snaps" out of the field of view while the user may see into the surrounding environment around and behind the virtual content. Because it is often times undesirable to have content disappear suddenly when it reaches the end of an artificial FOV, maximizing the field of view may be considered a requirement for certain applications (e.g., driving a car, piloting an airplane).

There exist limitations in the FOV of existing mixed reality system caused by both form factor and optical clarity, distortion, and resolution. From a form factor perspective, many virtual reality headsets (e.g., Oculus Quest®) have a non-trivial field of view, but the system is front-loaded and relatively heavy, so it does not provide long term wearability. From an optical standpoint, there are a number of different optical arrangements that provide a relatively wide FOV in virtual reality, but the resolution is generally low. Augmented reality headsets generally do not have wide FOVs. Microsoft's® Halolens®, for example, has a FOV of less than 50 degrees. Further, the augmented reality systems tend to use holographic surfaces, which create a blur and effect resolution.

Figure 11:
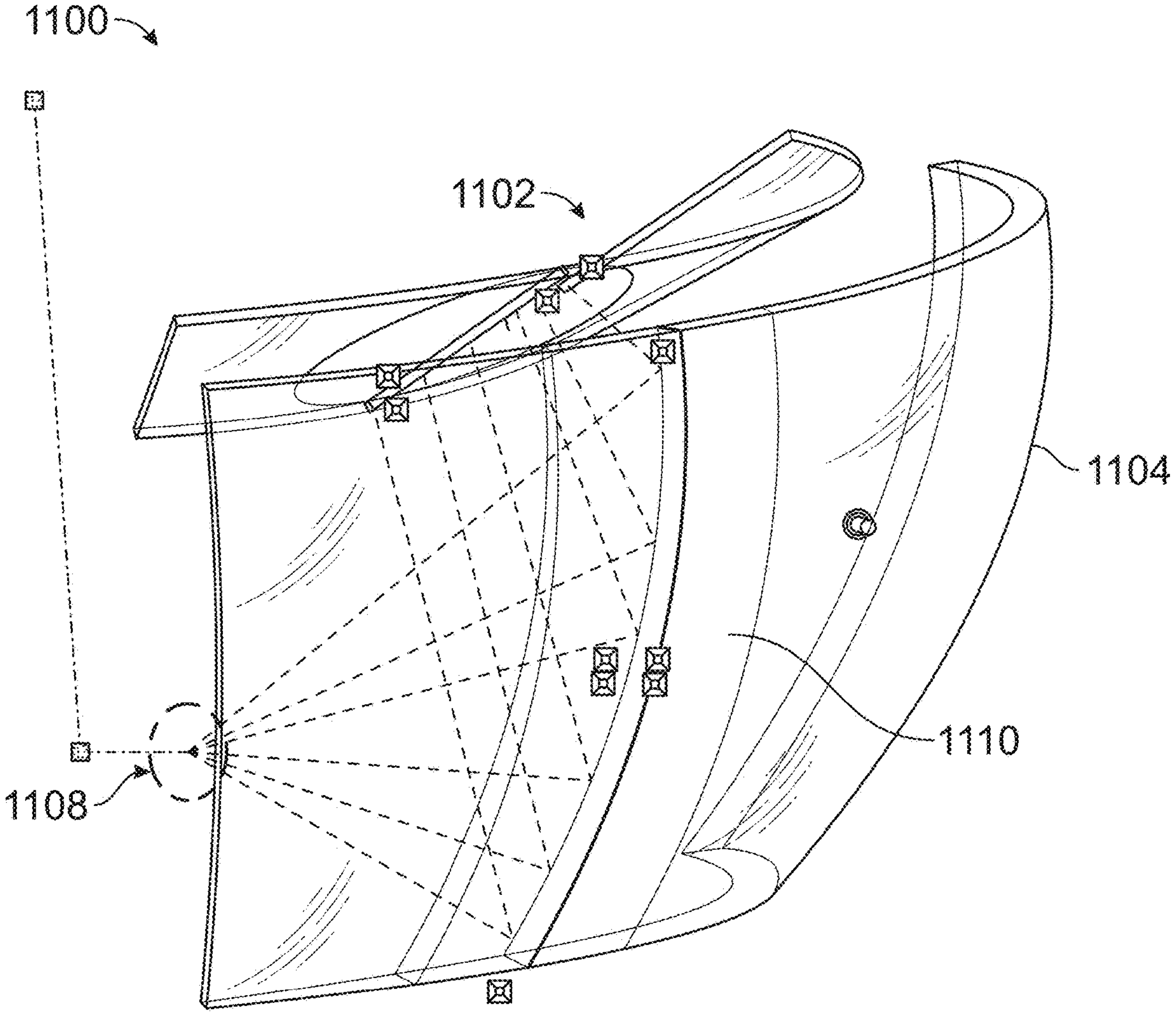
FIG. 11 is an illustration of an optical arrangement according to some embodiments.

With reference to FIG. 11, there is illustrated an exemplary and non-limiting embodiment of an optical arrangement to overcome the above noted limitations. Optical system 100 has an acceptable form factor with a very-wide FOV. The optical system 100 may include the use of curved display panels (e.g., LCD, OLED, MicroLED, etc.) and a matching reflective surface(s). A flat display panel has limitations in both form factor and optical clarity. For example, a flat display panel need be relatively large to produce a high resolution wide FOV, which causes a larger than desirable form factor. A large flat display panel also tends to cause optical distortion around the edges of the FOV because of an optical mismatch between the flat panel emission, transmission, or reflection, and the partially see-through optic in front of the user's eye. However, matching optical surfaces with a curved display panel creates a high-resolution image (e.g., 1040p, 4k, 8k) over essentially the entire FOV, very large FOV (e.g., 100, 120, 140, 160, 180 degrees horizontal), and compactness for a smaller form factor.

Display panel 1102 is fixed into a curved shape. The display panel 1102 emits image light (e.g., OLED, microLED), transmits image light (e.g., from a backlit LCD) or reflects image light (e.g., LCoS). The image light diverges according to the surface shape of the display panel. A combiner optic 1104, to be positioned in front of a user's eye, is shaped to match the shape of the display panel 1102 such that the image light converges at a point representing a user's eye 1108. The combiner optic may be partially reflective and partially see through (e.g., partial mirror, polarized, etc.), reflective (e.g., full mirror) or otherwise depending on the desired application. For example, the combiner optic 1104 may be partially reflective and partially see-through if an augmented reality headset is desired. Or, the combiner optic 1104 may be essentially fully reflective if a virtual reality head set is desired.

The curved shape of the combiner 1104 may be created by determining an intersection of a plane of image light, perpendicular to the display 1102 surface, with a combiner 1104 plane shaped 1110 to reflect the plane of image light through the middle of the eye 1108. Once this image plane intersection is determined, the intersection is rotated about the center of the eye. The curved display 1102 and the curved combiner 1104 can be made as wide as desired, which effectively determines the FOV.

Figure 12:
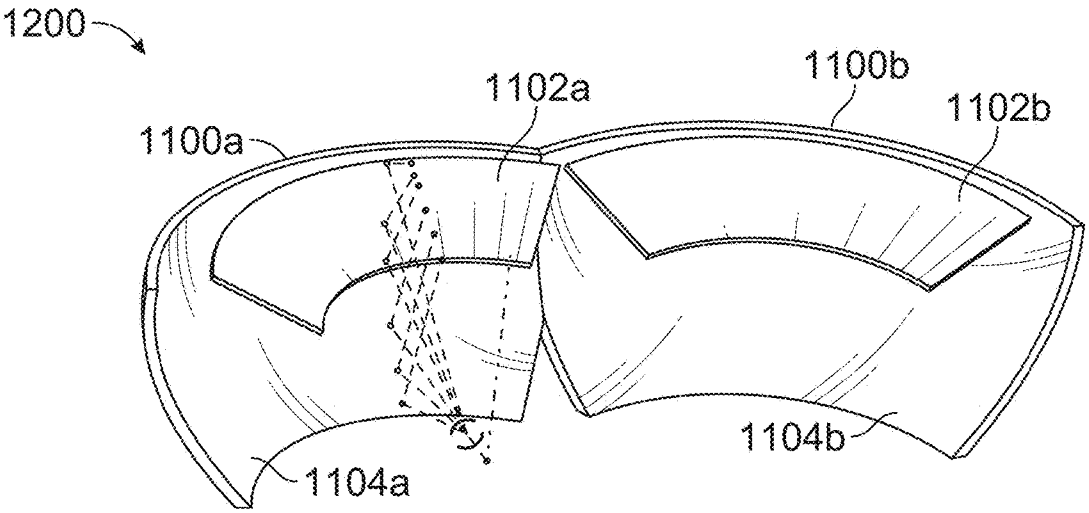
FIG. 12 is an illustration of a binocular mixed reality optical system according to some embodiments.

With reference to FIG. 12, there is illustrated an exemplary and non-limiting embodiment of a binocular mixed reality optical system 1200 in accordance with the principles of the present inventions. The optical system 1200 includes two optical modules 1100*a*, 1100*b*, one for each eye of a user. While the shapes of the curved display panels 1100*a*, 1100*b* may be identical or mirror images of one another, the curved display panels 1100*a*, 1100*b* may be independently controlled to display different images for a 3D experience. In embodiments, the curved display panels 1100*a*, 1100*b* are independently controlled, controlled by the same controller, or otherwise controlled and may present the same image, different images, or one may produce an image while the other does not.

Figure 13:
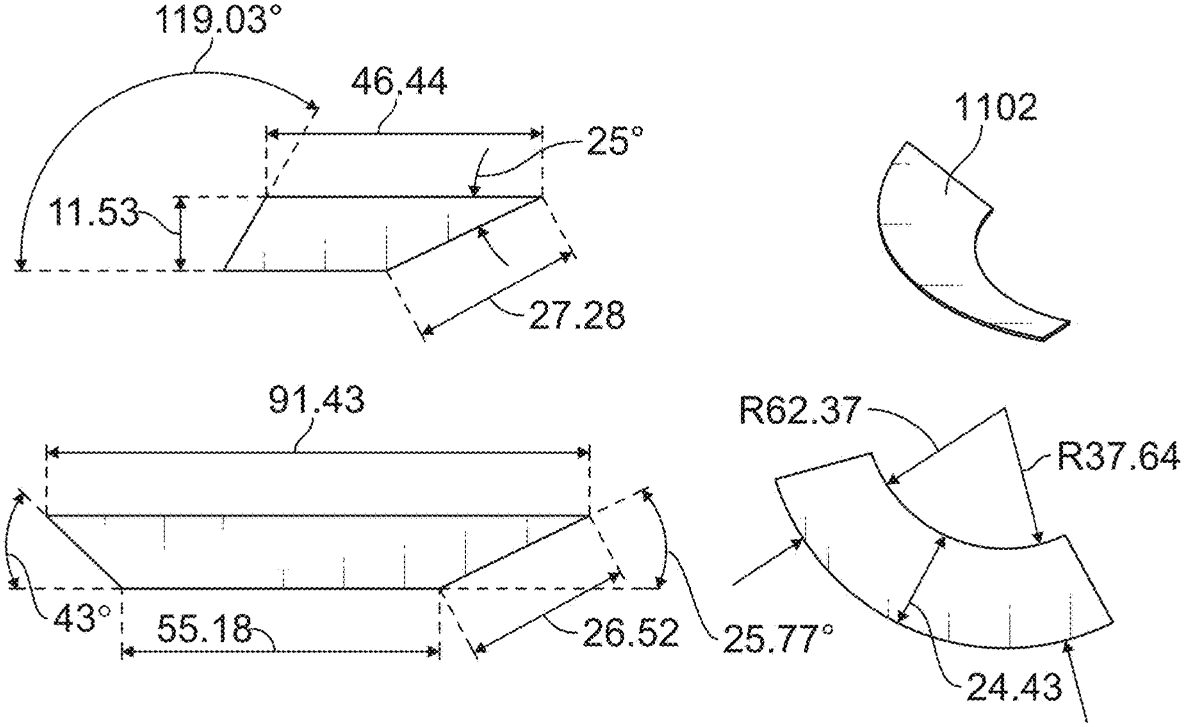
FIG. 13 is an illustration of a curved display panel according to some embodiments.

With reference to FIG. 13, there is illustrated an exemplary and non-limiting embodiment of the dimensions of a curved display panel 1102 in accordance with the principles of the present invention that may be used to generate a FOV of over 150 degrees horizontal, when used in connection with a properly shaped combiner 1104. The combiner 1104 of the mixed reality optical system 1100 and/or binocular mixed reality optical system may be made as a surface on a substrate (e.g., glass, polycarbonate), free-form solid optic, or other form.

The mixed reality optical system 1100 and/or binocular mixed reality optical system 100 may be mounted in a mounting system designed to be head worn (e.g., helmet, glasses, visor) and may be configured for AR, VR or a system that is switchable between AR and VR (e.g., by using an electrochromic surface on or proximate the combiner surfaces 1104).

An aspect of the present inventions relates to the modification of the image data at the graphical processing unit ("GPU"). Generally, in computer graphics the GPU draws in triangles to produce the presented graphics. For planar surfaces, such as flat monitors, a pinhole camera model is usually used where it takes the vertices of those millions of triangles and apply a projection matrix. The matrix operates linearly until a "perspective divide" operation is applied to project to the flat 2D image plane. For non-planar surfaces, such as described in connection with the mixed reality optical system 1100, the use of the highly mechanized linear algebra techniques are suboptimal. In embodiments, the shape of the screen is defined as a function in 3D space. The 2D surface of that shape is then parameterized in a way that matches the physical pixels. A non-linear function between the pinhole and the parameterized surface is then generated in a way that also does a "perspective divide" to keep compatibility with existing geometry engines. Using such a technology removes the losses and intermediate calculations of projecting onto a plane and then having to filter/distort it into angle space.

It was discovered that too much curvature in the LCD display panel can cause issues due to misalignment of the LCD pixels and their respective filters (e.g., red, green, blue). In embodiments, the issue is overcome as described below. The inventors further discovered that a smaller curvature than that illustrated in FIG. 13 avoids the issues and still provides a wide field of view (e.g., 150 horizontal degrees or more). For example, a minimum bend radius of 250 mm, as opposed to the 86.5 degrees illustrated in FIG. 13 with an LCD panel that includes filters does not substantially suffer from misalignment issues.

As described above, display panel 1102 may emit image light, transmit image light or reflect image light. In embodiments, such a display may be formed of an LCD layer comprised of a display panel of LCDs that is backlit by an LED panel. The LCD panel may include filters (e.g., red green and blue) to filter and transmit appropriate pixel light to form an image. The filter layer may filter the backlight from the LED layer on a pixel by pixel basis. Each pixel of filter layer may be further divided into subpixels representing red, blue and green components of each pixel wherein the sub-pixels of the filter layer correspond to sub-pixels of the LED layer. By altering the relative color and transparency of each sub-pixel, the filter layer can produce a color formed of the combination of varying amounts of red, green and blue.

In such a scenario, the backlight is commonly activated to emit white light via emission from all three sub-pixels while the pixels of the filter layer are activated on a sub-pixel basis to produce a color image on the display. As a result, each pixel and/or sub-pixel of the LCD layer are aligned with and correspond to a pixel and sub-pixels of the filter layer. In practice, such displays are generally flat with both the display layer and filter layer comprising generally flat planes of similar size placed in close proximity to one another. As a result, it is possible to maintain alignment of the pixels and sub-pixels of the LED layer and filter layer.

When, as above, either layer deviates from a flat plane, alignment problems may arise. Specifically, when both layers are curved to provide a wide field of view as described above, it becomes increasingly difficult to maintain pixel alignment between the two layers.

In accordance with exemplary and non-limiting embodiments, this alignment problem may be addressed via temporally separating the provision of red, green and blue as opposed to the spatial separation described above. For example, rather than emitting a white light from a phosphor type LED, red, blue and green light may be emitted by the backlight such that each pixel in the LCD layer emits the color generated by the backlight. By sequencing the color emitted by the backlight very quickly (e.g., r,g,b,r,g,b . . . ) and controlling the LCD pixels to coordinate such as to transmit the appropriate color at the appropriate pixel at the appropriate time, the display becomes full color capable without the need for filters. Once the filters are removed, the filter alignment problem is eliminated and the curved display can work well even with extreme shapes.

By cycling through the emission of red, green and blue light on the order of thousands of times per second, the brain merges the three separate images into a full color whole. Note that there is not required a perfect alignment of the LEDs forming the LED layer and the pixels of the filter layer. Note also that there is no longer the need for sub-pixels as the separation of colored light is achieved via temporal separation rather than spatial separation.

As a result, a curved display may be created which deviates considerably from a flat plane and which may be fabricated to wrap around a viewer's field of view without experiencing any degradation in image fidelity resulting from misalignment at the sub-pixel level of corresponding LED layer and filter layer pixels.

Figure 14:
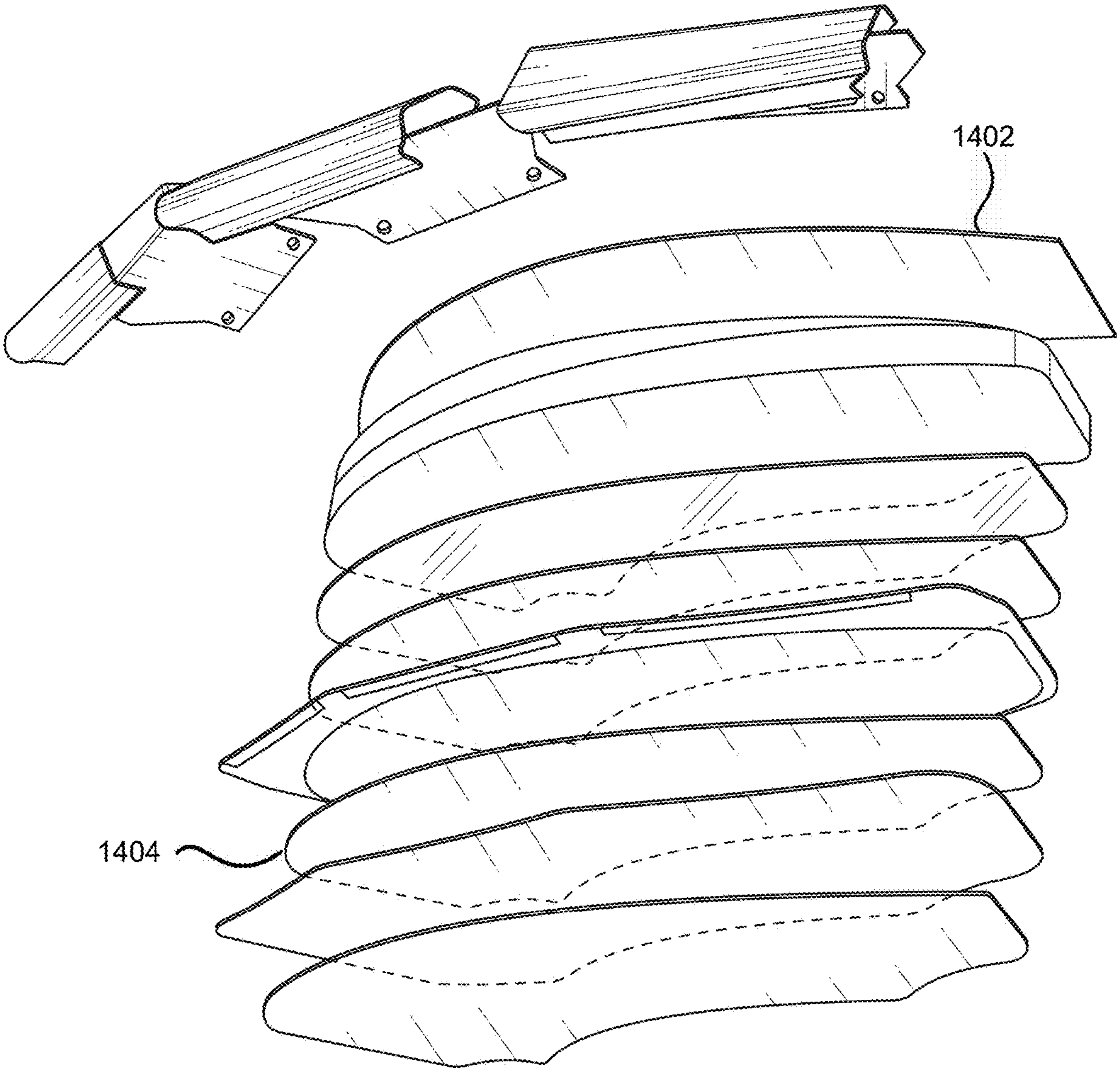
FIG. 14 is an illustration of a backlit LCD display according to some embodiments.

With reference to FIG. 14, there is illustrated an exemplary and non-limiting embodiment of a curved display incorporating the temporal color displacement discussed above. As illustrated, PCBA 1402 comprises an LED board functioning as the above described LED backlight. LC 1404 signifies the liquid crystal filter layer. Note the wide field of view and curvature of the constituent components.

In addition to providing a helmet display with a wide FOV, there exist a number of attendant challenges when creating an XR environment for a pilot of a real aircraft. One such challenge arises from the high brightness encountered when flying on a sunny day. The blue sky and the reflection of the sun off the clouds is so bright it overwhelms conventional see-through XR displays to the point where the digital content is not observable. In addition, there are times when the pilot may want to look near the sun, where an enemy combatant may be lurking. Looking anywhere close to the sun exacerbates the issue because the view becomes much brighter.

The brightness of a cloud reflecting the sun can range from about 10,000 nits to about 20,000 nits, and it gets much higher than that the closer to the sun one looks. This may be compared to the drastic difference one might find in an indoor space, which tends to be 50 to 300 nits. Displays made in accordance with disclosures herein are capable of providing 32,000 nits, which is controllable down to below 5 nits. An optical configuration may have an additional surface(s) to reduce the environmental light that transmits through to the XR optical system and the eye of the user. For example, a tinted shield, electrochromic surface, photochromic surface, etc. may be mounted exterior to the XR optics. On a helmet, for example, a tinted shield may be mounted in a fixed or movable position to shade the user's eyes. The shield may only transmit 20%, 40%, 60%, etc. of light, such that the user is comfortable in the current environment. If, for example, a 20% transmissive shield was used on a bright day with 10,000 nits, only 2,000 nits would pass through the shield. In embodiments, such a shield may provide the benefit of reducing power usage and reducing heat generation by requiring a lower brightness from the XR system.

In addition, the combiners of the XR optical system may also be tinted, polarized, filtered, etc. such that they only transmit some of the light that passes through the shield. For example, the combiners may be 50%-80% transmissive, which, at 50%, would reduce the light passing through the combiners to approximately 16,000 nits. The 1,000 nits would then be the environmental light upon which the XR digital content is presented. This means that the artificial light for the XR content needs to overcome the 1,000 nits, in this example, to be viewable. A backlit display system generating image light at 10,000 nits would, after reflecting off a 50% reflective surface deliver 5,000 nits to the eye. This provides enough image light to substantially overcome the background environmental light to create an acceptable XR experience outdoors on a bright day.

Figure 15:
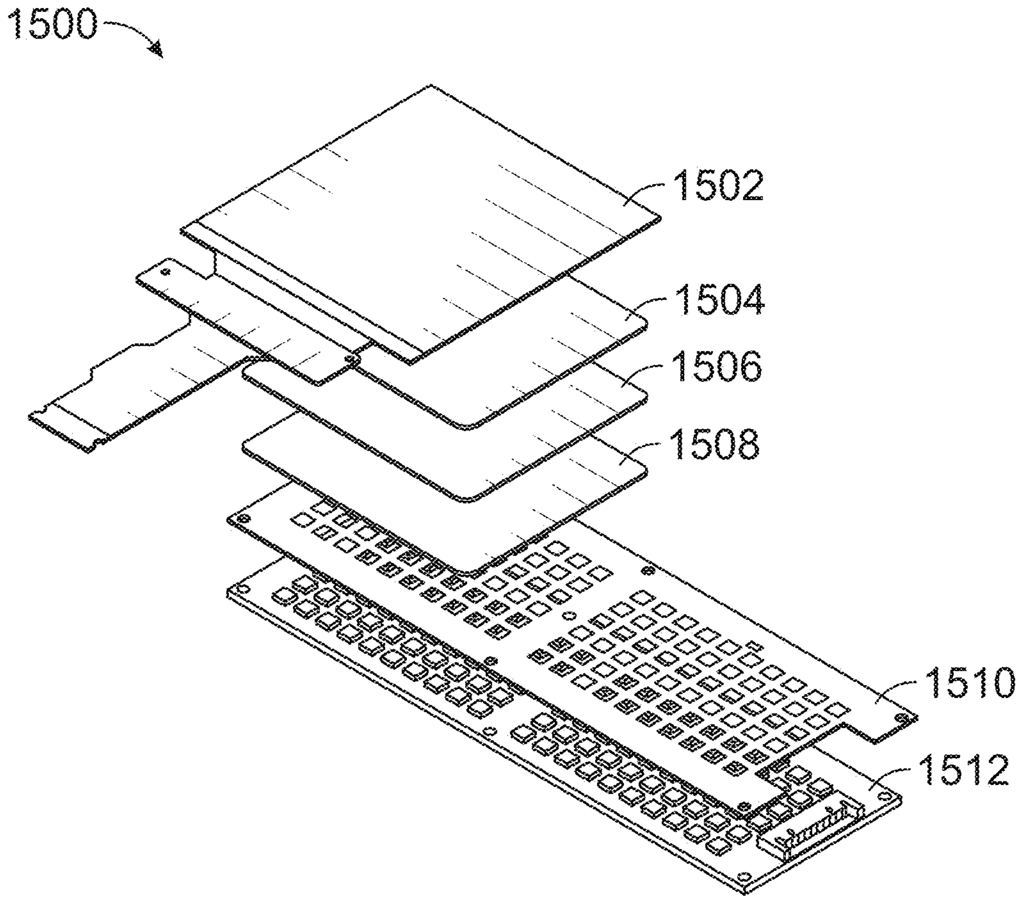
FIG. 15 is an illustration of an LCD display according to some embodiments.

FIG. 15 illustrates an exemplary and non-limiting embodiment of an exploded view of a backlit LCD display 1500. Increasing the brightness of the display system that projects images onto a see-through combiner results in a number of problems having to do with optical clarity, consistent brightness throughout the field of view, increased heat, etc. In this embodiment, the LCD is backlit by a plane of LEDs mounted behind the LCD panel. This configuration would generally result in spots of high intensity and spots of low intensity lighting, which pass to the combiner providing an uneven intensity of the content presented on the combiner. To remedy this, there are added films to manage the light that ultimately passes through the LCD pixels. The first layer above (below as shown in FIG. 15) the LED circuit board 1512 is an enhanced spectral reflector ("ESR") 1510 configured to reflect light that has been reflected backwards by the films or LCD back towards the LCD as a recycling effect. This recycling of light contributes to a more energy efficient and thermally efficient design. Without the ESR 1510, a significant portion of the wasted light would be absorbed by the printed circuit board and its components, which would convert to heat that would need to be managed. The second layer is a diffusion film 1508 with a shiny side (i.e., a relatively high reflective surface) facing the LEDs. This causes light from the LEDs to reflect back and forth between the LED board 1512 and the diffusion film 1508 to spread the light that ultimately passes through the diffusion film 1508. A layer of brightness enhancement film ("BEF") 1506, with a zero-degree orientation is included to reflect, through total internal reflections caused by the prisms on the film, light that is 'off-angle'. This results in recycling of more light and narrowing the beam angle of the light that ultimately passes through the BEF 1508. A layer of BEF with a ninety-degree orientation 1504 is positioned above the first layer of BEF 1506. There may be additional films in the optical stack, but in this embodiment, the narrowed beam angle light irradiates the LCD panel 1502 from behind and then passes through activated sub-pixels. The recycling and redirected diffused light produces a substantially evenly lit field of view at a combiner as described below.

The backlit LCD display 1500 represents a high brightness display (e.g., 32,000 nits) and can be dimmed to 100 or fewer nits. This enables, along with other XR optics, a display system that can produce viewable digital content in an outdoor environment on a bright day. The dimming capability provides for adjustments for other than blue-sky days (e.g., cloudy day, evening, night, indoors, etc.). In embodiments, the XR system may include a photodetector or other sensor system to measure the environmental light and then adjust the display lighting brightness to an appropriate light level. In embodiments, the XR system may include a photodetector or other sensor system to measure the display brightness, image brightness, image brightness ("Image Brightness") after reflecting off or through a combiner. These measurements may be used to assess the image brightness that is presented to the eye. In embodiments, the XR system may have both an environmental light sensor and an image brightness sensor such that the two can be compared. The system may then operate to dim the display lighting system to follow a relationship between the two (e.g., a fixed ratio, an increasing ratio, a decreasing ratio, a linear relationship, a non-linear relationship). A ratio of approximately 1.5:1 is found to function well. The systems of the present inventions can provide much higher and lower values, but once the ratio gets much higher than 1.5:1 the user's pupil tends to constrict. As the ratio increases much beyond 1.5:1, the pupil tends to constrict more and more. This results in the user's perception that the digital content is maintaining a brightness but the environment begins to darken. While this effect may be desirable in certain situations, it may be undesirable when the goal is to provide both a bright background environment and bright content.

In accordance with exemplary and non-limiting embodiments, the optical configuration may include an eye tracking sensor. The eye tracking sensor may track the position of the user's eye and/or monitor the size of the user's pupil. If the user's pupil is constricting, it may be an indication that the presented content is too bright and is reducing the environmental light perceived by the user. A processor may monitor pupil size and regulate the brightness of the XR content. The processor may also regulate the transmission of the outer shield and/or combiners in response to pupil size.

While backlit LCD display 1500 illustrates a direct backlighting arrangement (i.e., the plane of the LEDs is similar to the plane of the LCDs) it should be understood that a side lit optical waveguide could also be used. In addition, the backlighting may be folded for certain display configurations. Further, such a lighting system may be used as a front lighting system for a reflective pixelated display (e.g., LCOS, DLP, etc.).

Figure 16:
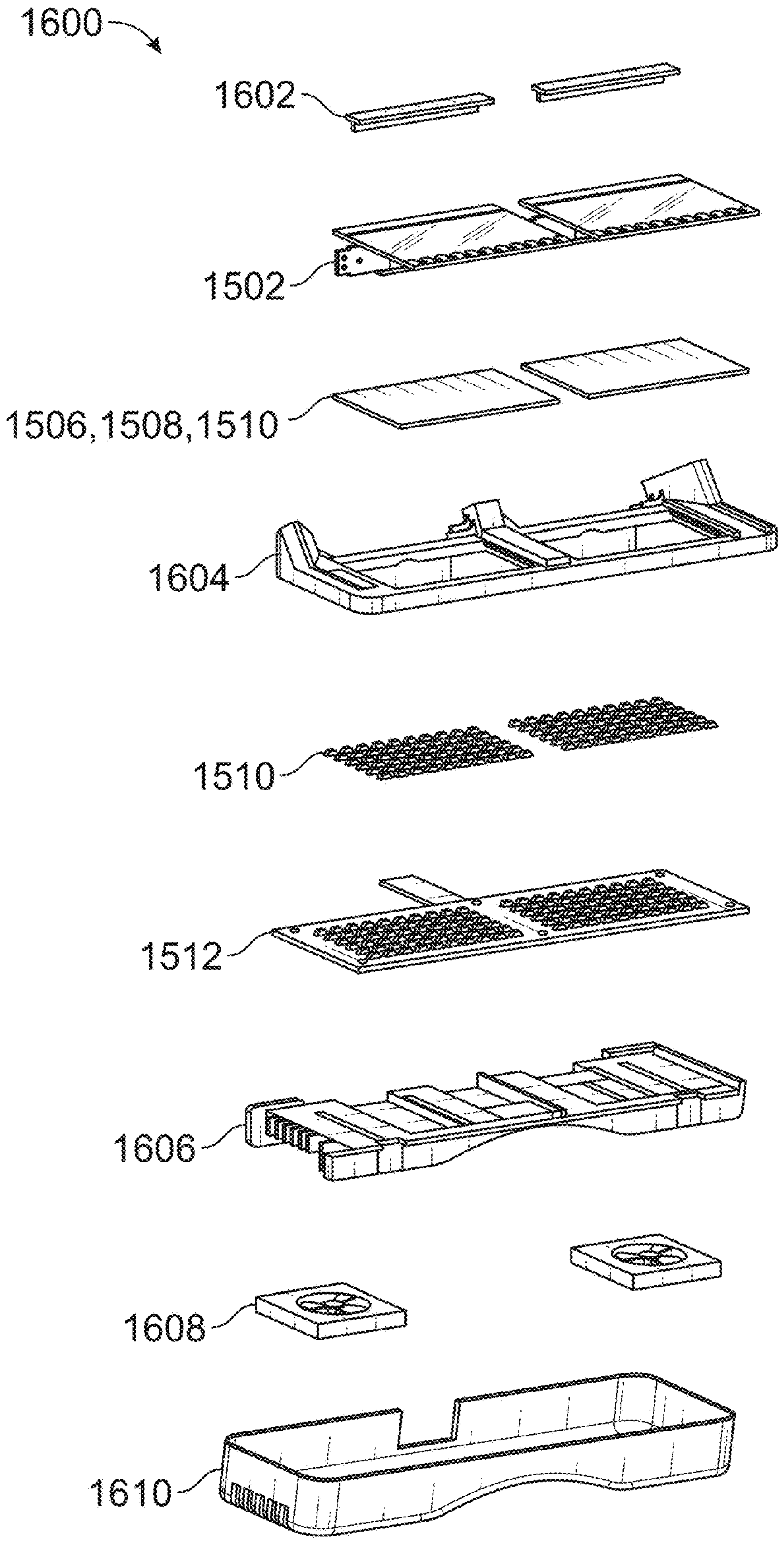
FIG. 16 is an illustration of a bridge assembly according to some embodiments.

In addition to the energy and thermally efficient backlighting of the LCD panel, additional thermal management may be required given the operating environment. In accordance with exemplary and non-limiting embodiments, a heat sink is thermally connected to the LED PCB to draw the heat backwards, away from the LCD. The heat sink may be metal (e.g., aluminum, titanium, etc.) or other material (e.g., graphene). The heat sink may have features to enhance cooling (e.g., fins) and/or be actively cooled (e.g., with air, water, etc.). The embodiment illustrated in FIG. 16 shows active cooling with fans 1608 to actively draw heat from the heat sink into the environment. Directing the air away from the user may be desirable as well. The optical assembly is relatively close to a user's forehead so moving heat away from the user would be generally desirable. Further, directing the airflow away from or not towards the user's eyes helps prevent eye dryness and fatigue.

While LEDs are gaining efficiency at converting electricity into photons at a rapid pace, the high brightness backlight may still draw significant power. In embodiments, the power drawn by each LED panel may be on the order of watts. This further highlights the need for thermal management of the system. The backlights behind each of the LCD displays illustrated in FIG. 15 have 120 LEDs, each having specified dimensions of approximately 2.8 mm×2.8 mm. The size of the active area of each LCD display is substantially the same as its backlight, which in this embodiment is approximately 28 mm deep (i.e., front to back) and 51.4 mm wide. In embodiments, each or a sub-group of the LEDs in the backlight may be addressable such that each can be controlled to provide a brightness in association with content displayed at a corresponding position. The control may be continuous, stepped, on-off, etc. In embodiments, the addressed arrangement may be used to increase the brightness of the display in a portion of the field of view where content is being presented and decreased, or turned off, in a portion where no content is presented. This can increase the contrast of the displayed content, save power, reduce heat, etc.

With reference to FIG. 16, there is illustrated an exemplary and non-limiting embodiment in the form of an exploded view of a bridge assembly 1600, which contains the backlit LCD display 1500 along with other components. In addition to the backlit LCD display components, the bridge assembly 1600 has a back cover 1610, which acts as a main enclosure, two fans 1608 on either end of the assembly to provide active cooling, a heat sink 1606 (e.g., metal such as aluminum or titanium, or other material such as graphene), a top housing 1604 to cover the top of the LED backlight assembly and provide mounting for the LCD displays 1502 and films 1506, 1508, and 1510, and a display gap filler 1602 to position the LCD assembly.

Figure 17:
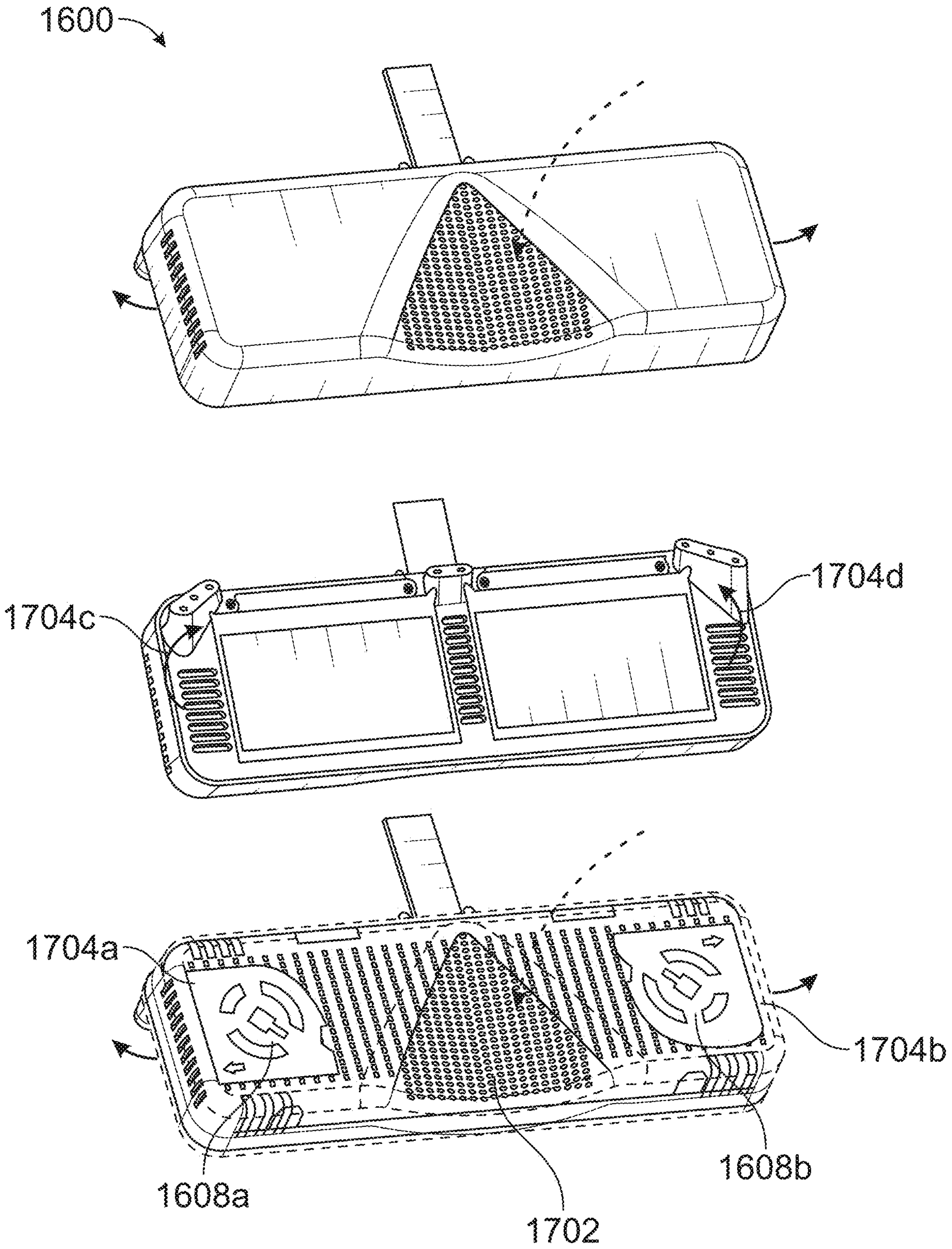
FIG. 17 is an illustration of a bridge assembly according to some embodiments.
Figure 18:
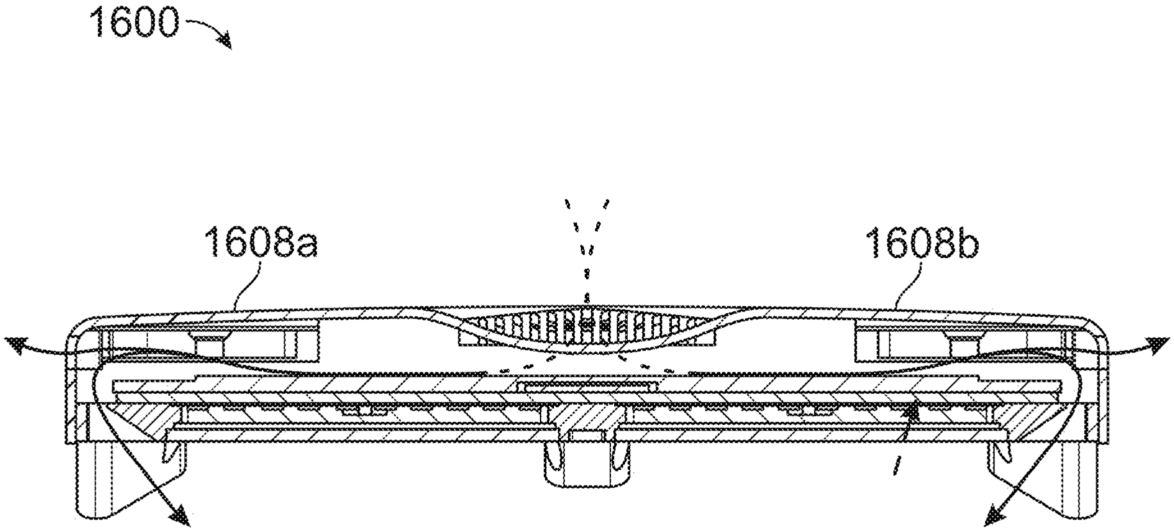
FIG. 18 is an illustration of a bridge assembly according to some embodiments.

Wirth reference to FIG. 17, there is illustrated an exemplary and non-limiting embodiment of the bridge assembly 1600 showing the general airflow through it. Fans **1608*a* and 1608*b* draw cool environmental air into a center vent 1702 and push hotter air, from the heat sink 1606 and other components, back out to the environment through vents 1704*a*, 1704*b*, 1704*c*, and 1704*d***.

With reference to FIG. 8, there is illustrated an exemplary and non-limiting embodiment of the bridge assembly 1600 showing the general airflow within the body. The fans **1608*a* and 1608*b* draw the air into the assembly and force a substantial amount of the air to pass over the heat sink 1606** in opposite directions.

Figure 19:
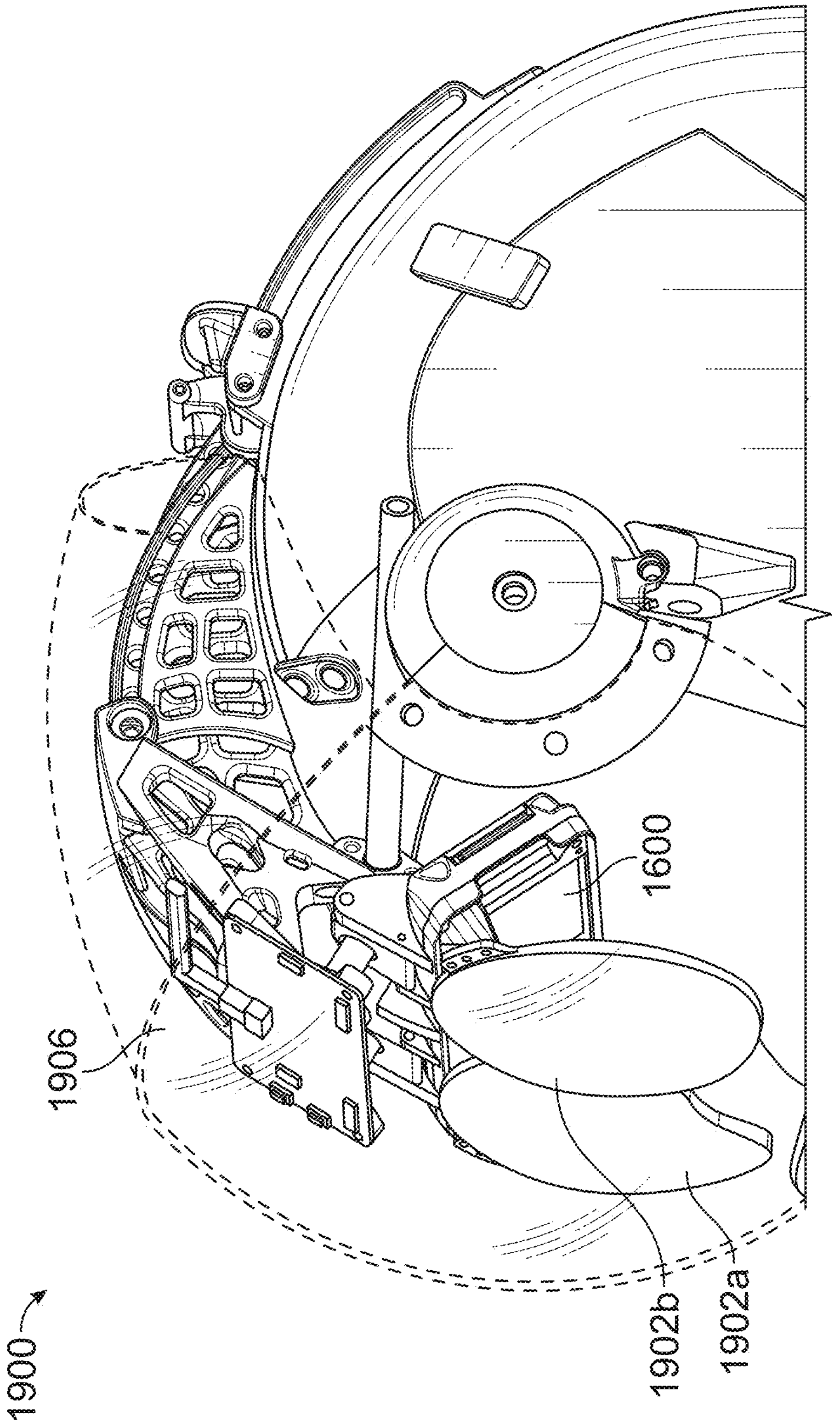
FIG. 19 is an illustration of a helmet according to some embodiments.

With reference to FIG. 19, there is illustrated an exemplary and non-limiting embodiment of an XR helmet 1900. The bridge assembly 1600 with see-through combiners **1902*a* and 1902*b* mounted on a helmet 1900** is shown. The XR see-through display system also needs to be compact to be usable by a pilot or operator of any vehicle while using a helmet. This configuration, with the high brightness displays, produce a horizontal field of view of approximately 70 degrees. This is a very wide field of view and is adequate for the display of content to a user. This system has such high brightness with respect to the external environment that the digital content can be substantially opaque, which was an unexpected result. XR displays that are see-through generally produce relatively faint images that appear substantially see through.

Figure 20:
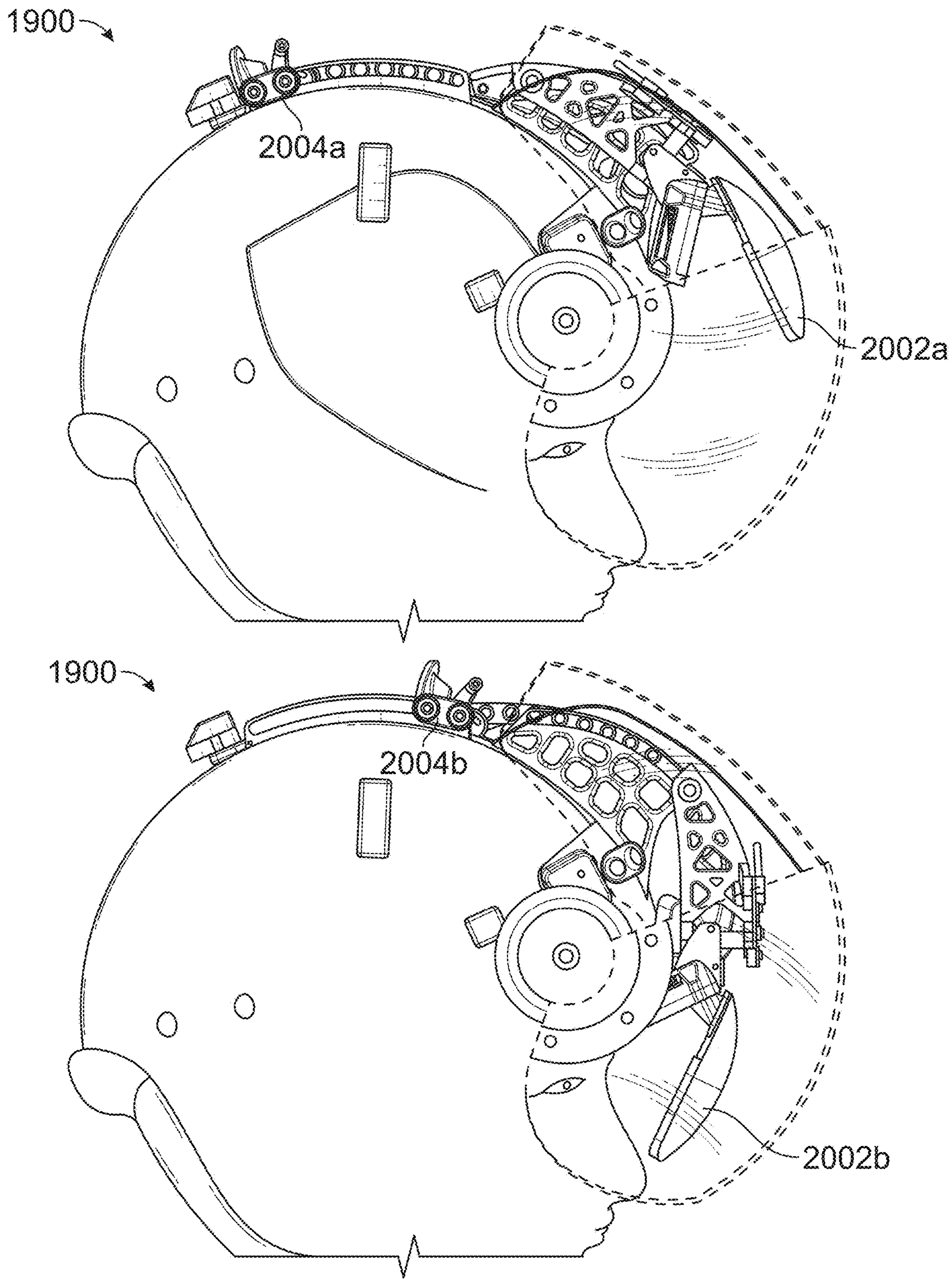
FIG. 20 is an illustration of a helmet according to some embodiments.

With reference to FIG. 20, there is illustrated the XR helmet 1900 in two views: one with the XR optics in an active position **2002*a* and one with the XR optics in a non-active position 2002*b*. There are times when a user may want to view XR content and use the mechanical system 2004 to lock the XR optics in the active position 2002*a* so he is seeing through the combiners. There are other times when the user may want to get the XR optics out of the way and use the mechanical system 2004 to lock the XR optics in the non-active position 2002*b*. The sliding mechanism 2004 may be operated with one hand and guide the positioning of the XR optics in and out of position within the confines of the outer shield 1906. The outer shield 1906** may be independently positional.

The mechanical system may include a number of other adjusters to cause the XR optics to be properly positioned when in the active position **2002*a***. For example, the adjusters may position the XR optics closer or further from the user's eyes and forehead. This may be important to compensate for helmet positional changes in-flight (e.g., caused by G-forces). There may be interpupillary adjusters to position each combiner to the correct position. There may be eye-box adjusters to move the XR optics within the vertical plane (e.g., up, down, laterally, angularly) to position the eye-box in front of the user's eyes.

An aspect of the present inventions relates to removing or diminishing the brightness of XR content being displayed. In embodiments, a pilot of a real aircraft may be flying in an airspace having pre-defined geo-fenced boundaries and as the pilot approaches a boundary the digital content brightness may be lowered or eliminated to draw the pilot's attention to the surrounding environment. A pupil size monitor may also be used to understand how the current ratio of XR light to environmental light is impacting the user's eye dilation. The content brightness may be reduced to a point where the pupil's size is only effected by the environmental light and then it may be further reduced until it is imperceptible. This controlled dimming may be programmed to take effect over a period of time between a current location and the decreasing distance to the boundary.

While many embodiments herein refer to an XR system, it should be understood that the term XR is meant as an augmented reality system, virtual reality system, mixed system, etc.

In accordance with exemplary and non-limiting embodiments, there is disclosed a lighting system and methods for the backlighting of LCD or other transmissive displays, front lighting of a LCoS, DLP or other reflective display, and other lighting situations involving a requirement for precise beam control, low heat, high efficiency and/or panel lighting needs. In some embodiments, there is utilized laser light, wave guides and holographic surfaces to create a plane of light. The beam angle of the plane of light is generally controlled by the holographic surfaces used in connection with the waveguides. Laser light may be injected into the side of a waveguide such that the light reflects off a holographic surface at a defined angle. The holographic surface may include a holographic pattern across its surface that is homogenous or non-homogenous, depending on the needs of the resulting beam angle. Holographic surfaces may be designed to generate a converging, diverging, columnated, symmetrical, non-symmetrical, or other beam shape.

As discussed herein, AR, VR, and XR displays may use front or backlights to generate light that ultimately forms an image through or from a display (e.g., LCD, DLP). The laser panel light described herein below represents design principles that may be used in such AR, VR and XR displays. The laser panel light has superior beam control so much less light is wasted, which may result in higher efficiencies and lower heat.

Figure 21:
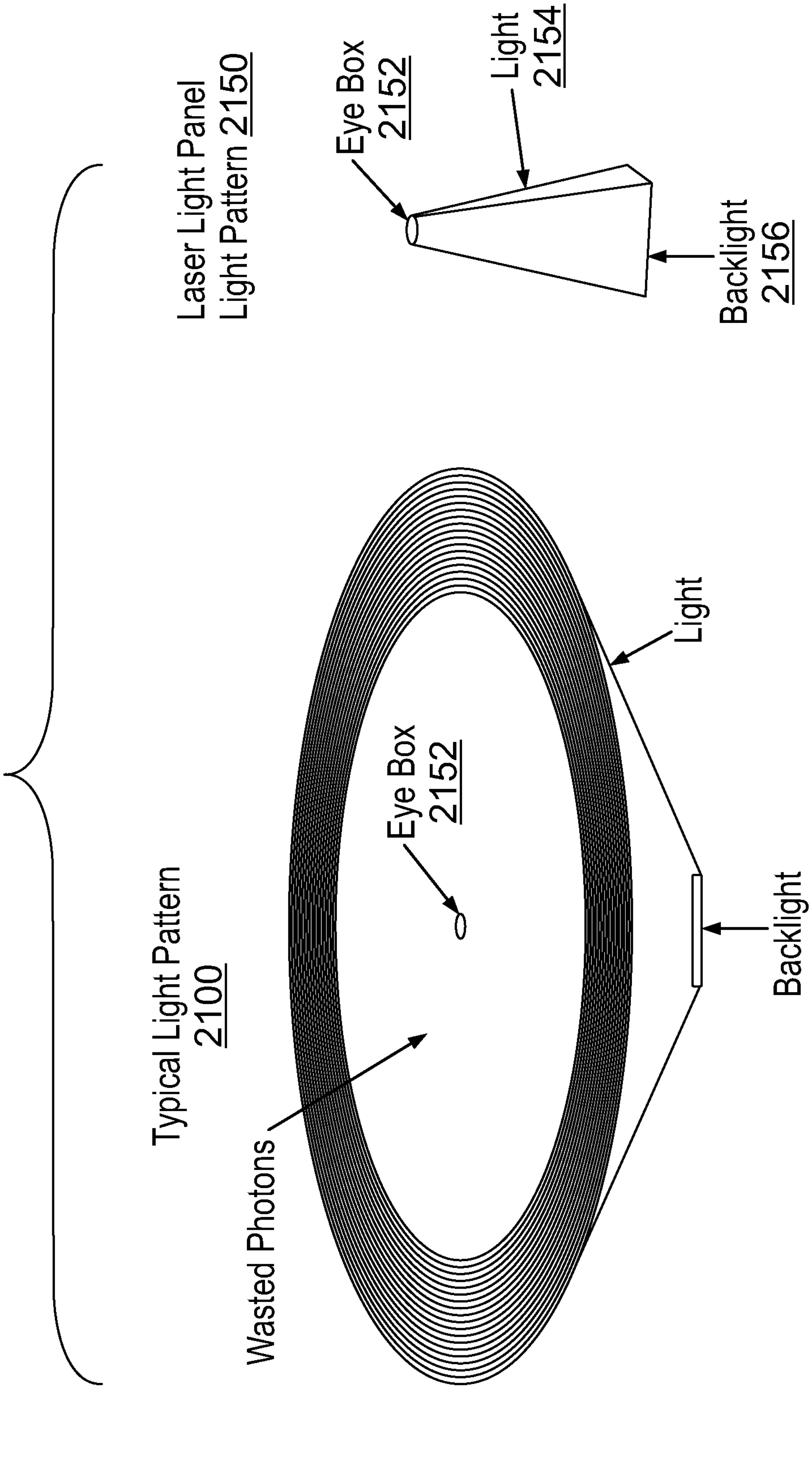
FIG. 21 is an illustration of a beam pattern according to some embodiments.

FIG. 21 illustrates a beam pattern from a typical backlight 2100 and from a laser light panel 2150 in accordance with the principles of the present inventions. The typical backlight 2102 is generally designed to provide most of its light forward with some expanding beam angle. The typical backlight 2102 tends to not have a sharp cut-off and sends a significant portion of the light well beyond the intended beam angle. As a result, it is difficult to precisely control, and therefore use as intended, much of the light produced by the typical backlight 2102. In contrast, the laser panel light 2150 comprises a laser panel backlight 2156, which will be explained in further detail below, controls the beam angle very well and can even be designed to converge on a precise area. An eye-box is illustrated in FIG. 21. This is meant to represent an eye-box 2152 of a person wearing an AR, VR, or XR optical system. The laser panel light 2154, in embodiments, may be focused on the eye box 2152, or a slightly larger area around the eye box to accommodate alignment issues caused by mechanical systems, to drastically reduce the amount of wasted light. Wasted light is light that is not aimed at its targeted location.

Figure 22:
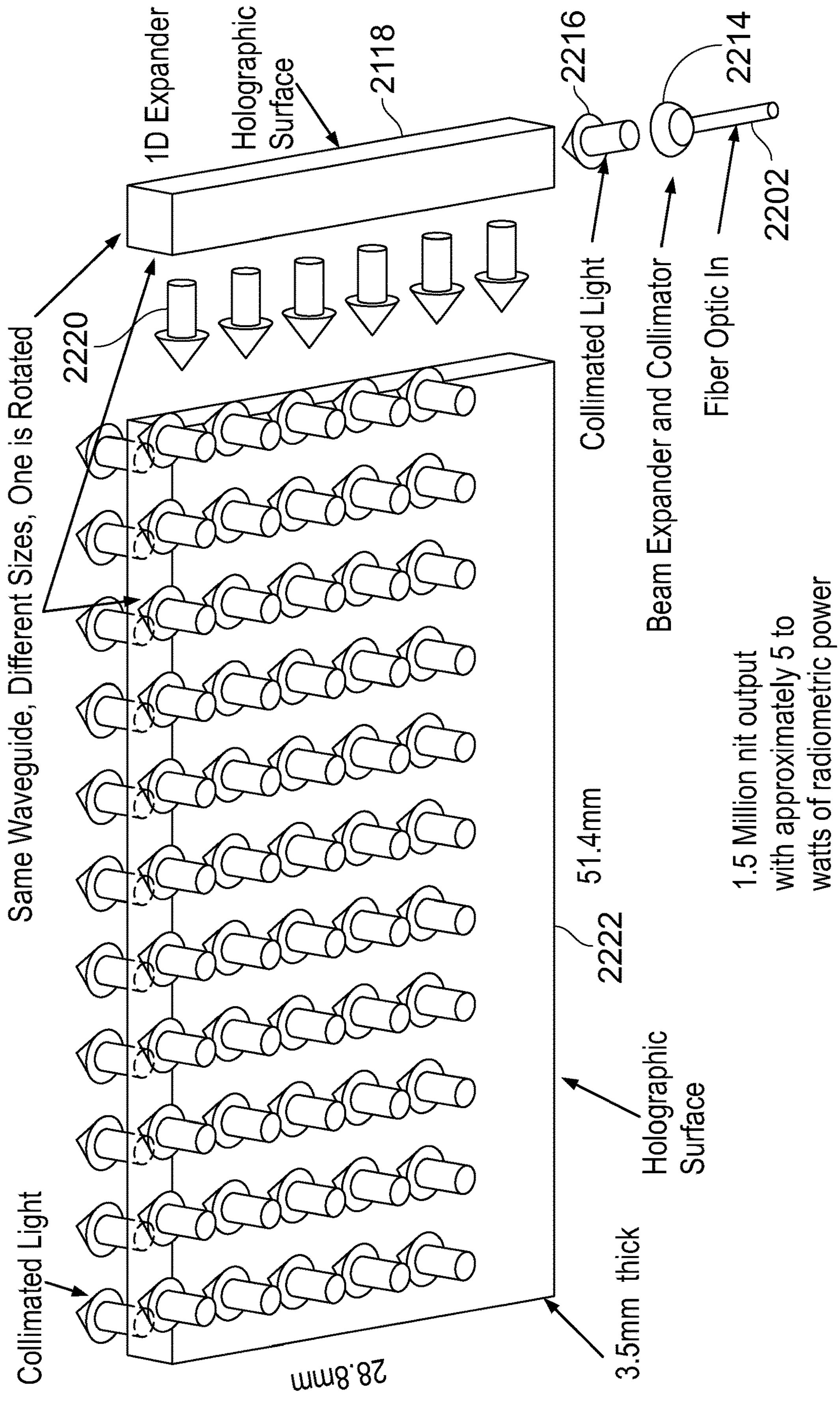
FIG. 22 is an illustration of an optical system according to some embodiments.

With reference to FIG. 22 there is illustrated an exemplary and non-limiting embodiment of an optical system designed to direct light. A laser (not shown) generates coherent light and the light is directed into a fiber optic 2202 of the laser panel light. In the event white light is desired, an R,G,B laser, phosphor-based laser, or other white producing laser may be used. With an R,G,B laser, all of the colors may be on at the same time to produce a perceptively combined white light that may be filtered by LCD filters or the different colors may be turned on sequentially in a system either not having filters. The laser light is directed into a beam expander/collimator 2214 to expand the diameter of the laser light and maintain a column of light. The columnized light 2216 is directed into a waveguide that has at least one holographic surface 2218. The light is directed such that it reflects off of the holographic surface 2218. The reflection from the holographic surface forms a line of light 2220 emitted from the first waveguide into a second waveguide. The second waveguide also has a holographic surface 2222 arranged such that the light of light gets expanded and projected as a plane of light from a front surface of the waveguide.

The holographic surfaces 2218, 2222 of the waveguides control the direction of the reflected light with a high precision. The holographic surfaces may be patterned to generate different beam shapes (e.g., converging, diverging, round, oval, square, rectangular, symmetric, asymmetric).

In some embodiments, the laser may be positioned remote from the display. For example, when used to backlight an LCD display in an AR, VR, or XR application (e.g., a head worn system) the Laser, power supply and control circuitry may be positioned away from the user's head to further reduce the heat near the user. For example, the laser system may be positioned in an area of the cockpit or otherwise in the airplane that is remote from the pilot.

In some embodiments, a de-speckler may be used in the system to reduce or eliminate speckle from the light emitted from the laser panel light. This is generally desirable when the panel light is used as a backlight or front-light in an image display system (e.g., backlit LCD, front lit LCoS). A de-speckler may be installed before or after the fiber optic. For example, it may be positioned after the fiber optic and before the beam collimator/expander.

Figure 23:
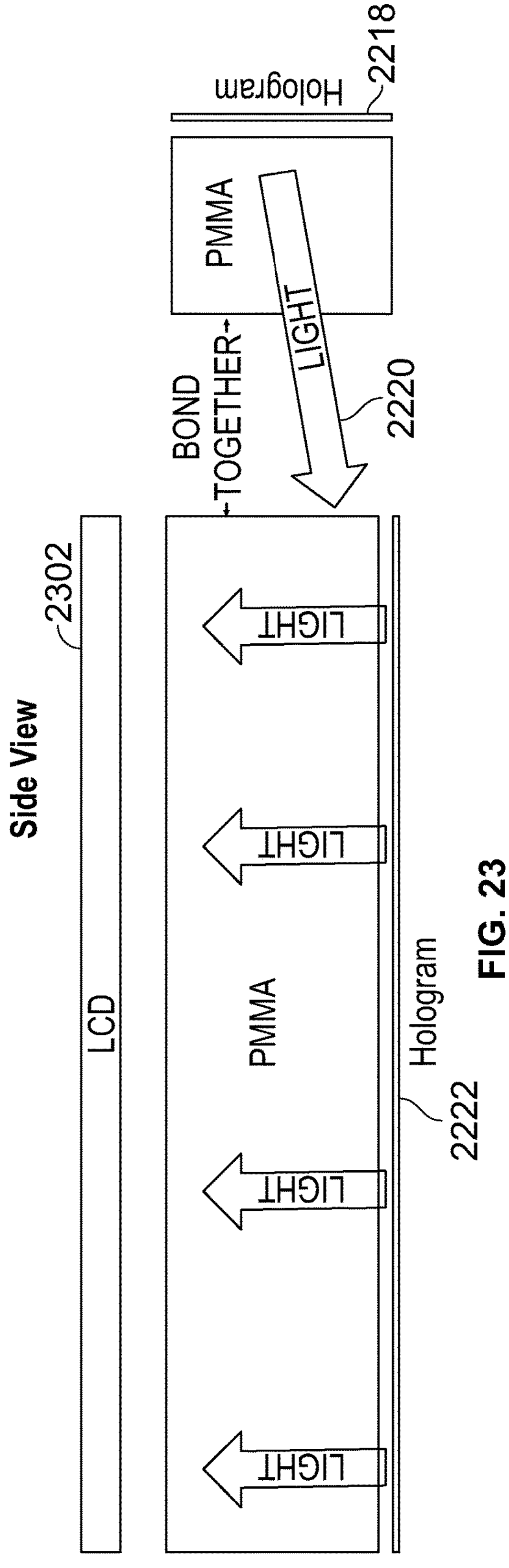
FIG. 23 is an illustration of a laser panel light according to some embodiments.

With reference to FIG. 23, there is illustrated an exemplary and non-limiting embodiment of a side view of the laser panel light. As illustrated, the line of light 2220 emitting from the first waveguide is directed to reflect off the holographic surface 2222 in the second wave guide. The line of light 2220 is a relatively thick line because it has been expanded and collimated and has reflected off the first holographic surface. The thick line of light is directed to substantially cover the entire surface of the second holographic surface. The second holographic surface 2222 is designed to reflect the light out of the second waveguide. As illustrated, the panel light is configured to backlight an LCD panel 2302.

Figure 24:
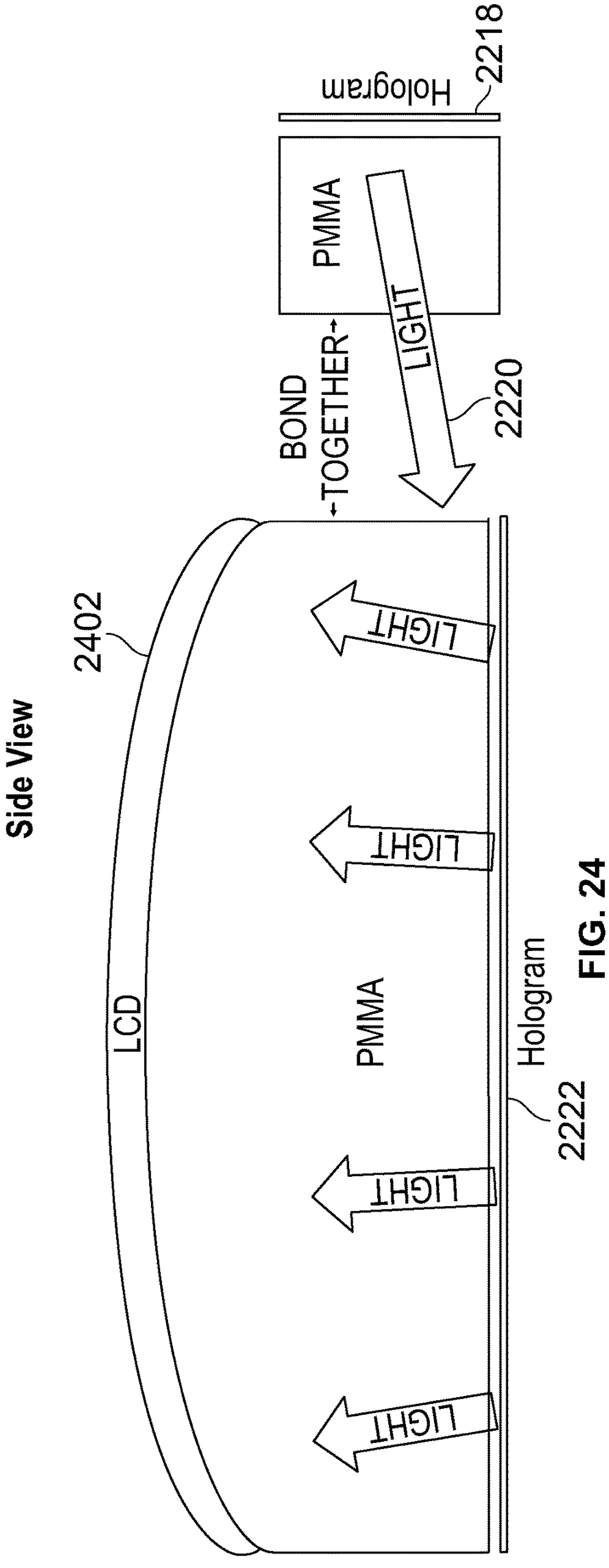
FIG. 24 is an illustration of a laser panel light according to some embodiments.

With reference to FIG. 24 there is illustrated an exemplary and non-limiting embodiment of the side view of a laser panel light. This embodiment illustrates that the light reflected from the second holographic surface may be shaped to light a shaped display panel (e.g., a shaped LCD panel) 2402.

Figure 25:
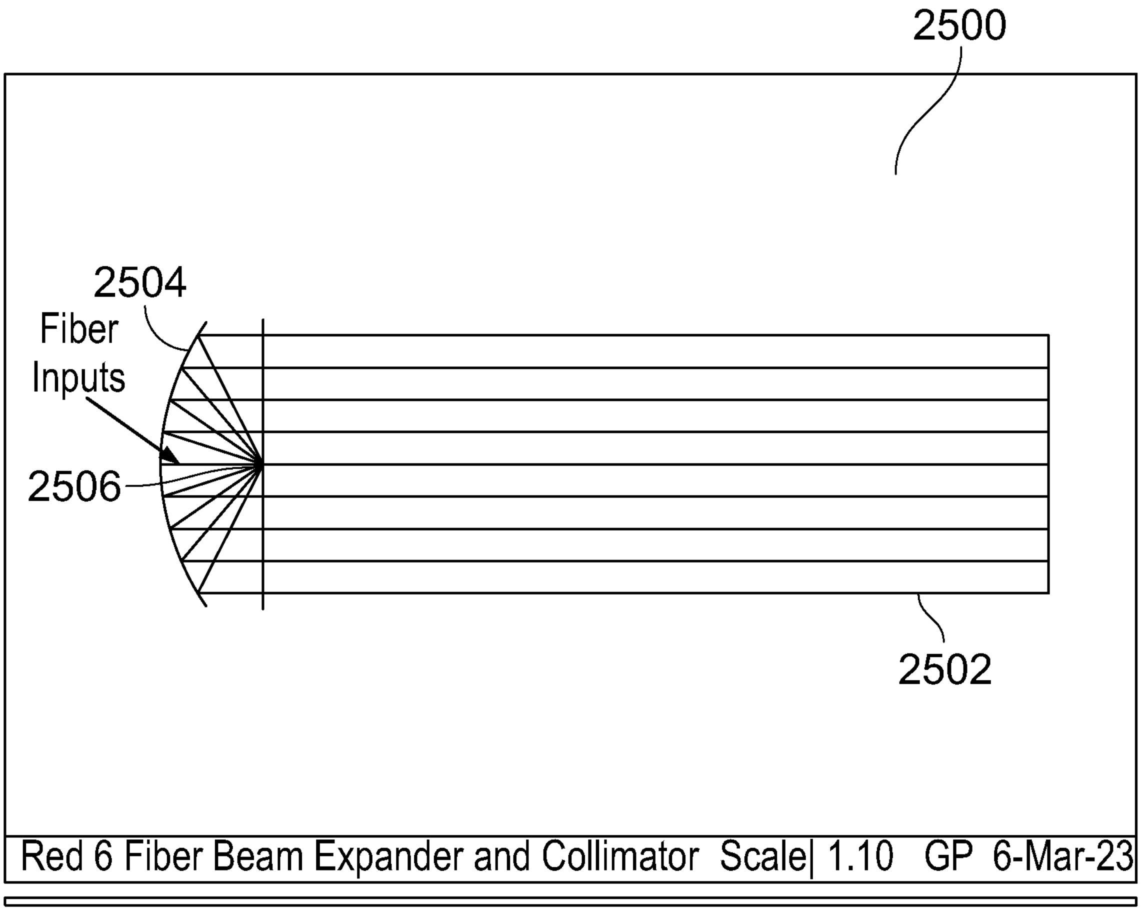
FIG. 25 is an illustration of a laser beam expander and light collimator.

FIG. 25 illustrates an exemplary and non-limiting embodiment of the expander/collimizer 2500. Laser light is directed to pass through a reflective sphere 2506, which then spreads the light which is then re-directed off of a reflective asphere surface 2504. The light may then be directed as a column of light 2502 into a fiber optic for transmission of the columnized light to the needed location.

An aspect of the present invention relates to an eye imaging and tracking system that is compact and works with a holographic-laser backlight. A laser backlight with holographic surfaces as described above is substantially see-through and, in the infrared, the LCD display is semi-transparent. The eye of a user may be imaged and tracked by capturing infrared reflections off of the user's eye that are directed towards the LCD display. They created an eye imaging system that is positioned behind the laser-based backlight to capture reflections from the user's eye that travel along, in reverse, of image light produced by the LCD display and reflecting from a partially reflective image combiner optic. The system further includes an infrared light source positioned behind the backlight to generate and transmit infrared light along a similar path to illuminate the eye to generate reflections from the eye that are then captured by the camera behind the backlight.

Figure 26:
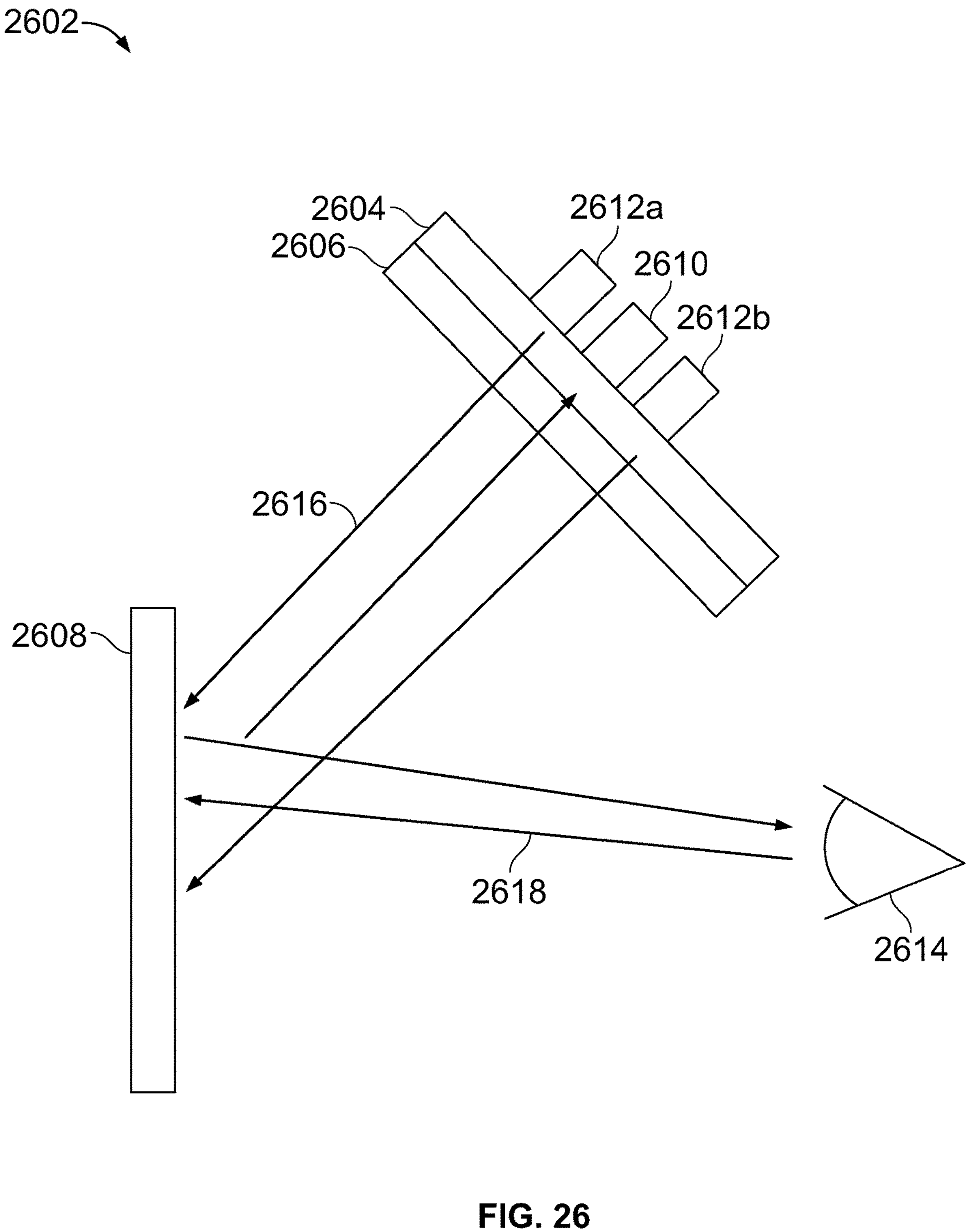
FIG. 26 is an illustration of eye imaging according to some embodiments.

FIG. 26 illustrates an eye-imaging system 2602 in accordance with the principles of the present invention. The eye-imaging system 2602 includes a backlit LCD computer display 2606 and a holographic laser backlight 2604. The holographic laser backlight 2604 (e.g., described in greater detail herein) is substantially transparent when looking through it from the back towards the LCD display 2606. The holographic surface of the backlight is substantially transparent as is the material between the backlight holographic surface and the LCD display 2606. By making the material behind the backlight holographic surface as well as making the entire thickness of the backlight 2604 substantially transparent, light may be transmitted through the entire thickness, including through the holographic surface, towards the back of the LCD display 2606. Further, a camera 2610 (e.g., IR camera, visible light camera, event camera, UV camera) could image light that was directed to pass through the backlight 2606.

The eye-imaging system 2602 includes solid state light source(s) 2612*a* and 2612*b* (e.g., infrared producing LEDs). The light sources are configured to produce light and direct it through the back of the backlight 2604 such that passes through the substantially clear material of the backlight and towards the back of the LCD display 2606. As the LCD display 2606 is transparent or partially transparent in the infrared, near-infrared and long-red regions of light, infrared light from the light sources 2612 substantially passes through the LCD display 2606. So, the light from the light source(s) 2612 may generate light that passes through the backlight and the LCD to illuminate things on the other side of the LCD display 2606.

The LCD display 2606 may be transparent or semi-transparent to near-IR, IR and other desirable imaging wavelengths including when pixels are on and/or off. In other words, the LCD material used to cause visible light to be absorbed or otherwise blocked when a pixel is 'off' may be transmissive to near-IR or IR light. This provides an LCD display based system that can produce a single color, multi-color or full color XR image while allowing eye-imaging through the LCD device no matter the state of the individual pixels.

LCD displays include a prism surface or material on the backside of the LCD display to help in spreading the light from a conventional backlight to generate a more even surface of light for more even display brightness across the surface of the LCD display. Once the prism material is removed, the light from the light source(s) 2612 is less dispersed and maintains a more well defined beam angle with sharper beam angle edge. In other words, it is a beam angle with greater control over the beam angle passing through the LCD display 2606. In embodiments, the prism material is used and in other embodiments is it not included. The holographic surface of the laser backlight generates a substantially even surface of light and, in embodiments, the LCD display prism material is not needed for even display lighting.

Light 2616 from the light source(s) 2612 passes through the backlight 2604 and 2606 and is directed at a reflective or semi-reflective combiner 2608. Light 2616 is then reflected off of the combiner 2608 and directed towards the eye 2614 of a user. The eye 2614 in turn reflects the light 2618 back towards the combiner, which then reflects the light back towards the LCD display 2606. The light then passes through the LCD display 2606 and backlight 2604 where it reaches the camera 2610 and can be imaged. This arrangement forms an eye imaging system that images the eye through the backlight 2604 and LCD display 2606 making a good use of the generally limited available space for camera(s) and light sources and provides good optical clarity for eye imaging.

In embodiments, the combiner 2608 is a partially reflective combiner that the user may see through and also perceived digitally presented content for an augmented reality experience. The partially reflective surface may be a partial mirror or other partially reflective surface. The partially reflective surface may be a holographic surface. The holographic surface may be designed to reflect wavelengths of light similar to the wavelengths reflected by the backlight's holographic surfaces. In embodiments, the partially reflective surface is designed to reflect light emitted from the LCD display 2606 and the infrared light source(s) 2612*a* and 2612*b*.

A combiner 2608 may include a holographic surface to perform the function of reflecting certain wavelengths of light while allowing others to be transmitted through the surface. For example, the holographic surface of the see-through combiner 2608 may be designed with a pattern substantially the same as the holographic surface of the holographic surface(s) of the backlight 2604 and include a pattern to reflect infrared light emitted from the infrared light source(s) 2612*a* and 2612*b*. This structure allows the infrared light to pass through the backlight and reflect off of the combiner.

The holographic surface may be designed to reflect light at an angle to suit a particular mechanical assembly. For example, it may be designed to reflect light off of the combiner at 30, 45, 60 or some other predominant angle if the mechanical demands of the overall system would benefit from it. In other words, the combiner 2608 may be physically positioned at about 45 degrees with respect to a front surface of the LCD display LCD 2606 and the combiner's holographic surface may be designed to reflect light at 30 degrees such that it is directed at the user's eye in a certain head worn design.

In embodiments, the combiner 2608 may be fully or substantially fully reflective. A fully reflective design could be used to provide a more immersive virtual reality system.

In embodiments, the light source(s) 2612 may be remote from the proximity of the backlight 2604. For example, the light source(s) 2612 may be remotely positioned and configured to pump light into a fiber optic delivery system, which is positioned to transmit the light through the backlight 2604 and LCD display 2606. Similarly, the camera 2610 may be remotely positioned and associated with a fiber optic system to receive the reflected light for imaging.

In embodiments, the light source 2612*a* may generate light of a different wavelength that the light generated by the light source 2612*b*. For example, the first light source 2612*a* may produce near IR light and the second light source 2612*b* may produce IR light. The camera 2610 may be capable of imaging light in the wavelength range of the first and/or second light source 2612*a* and 2612*b*.

Figure 27:
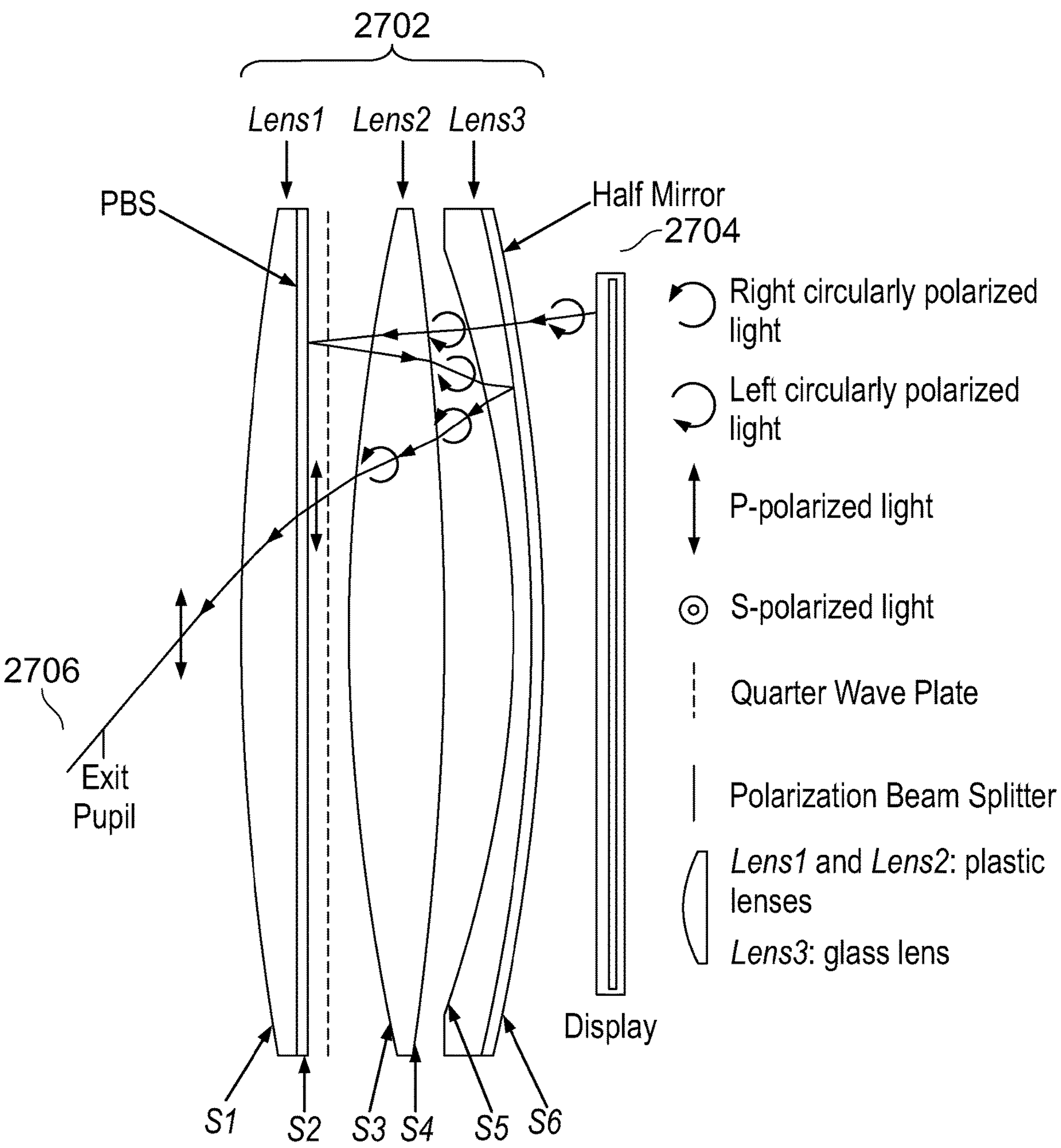
FIG. 27 illustrates a optical design used in mixed reality headsets.

FIG. 27 illustrates a optical design used in mixed reality headsets. The optical design uses a compact lens arrangement (e.g., a pancake lens) 2702 and a display (e.g., LCD, OLED) 2704. Light from the display is pixilated into an image and is directed through the first lens of the compact lens array and then it propagates through the remaining lenses reflecting and transmitting based on polarization states and reflective surface designs. The image light is folded, in some cases several times, within the lens stack to reduce the overall width of the lens. Each of the surfaces of the lenses creates an opportunity to propagate the light in a wanted direction as well as in unwanted directions. The light that propagates in the unwanted directions is referred to as stray light. Stray light may be light that does not make it, or does not properly make it, to the eye box or exit pupil 2706 of the mixed reality optical system.

Figure 28:
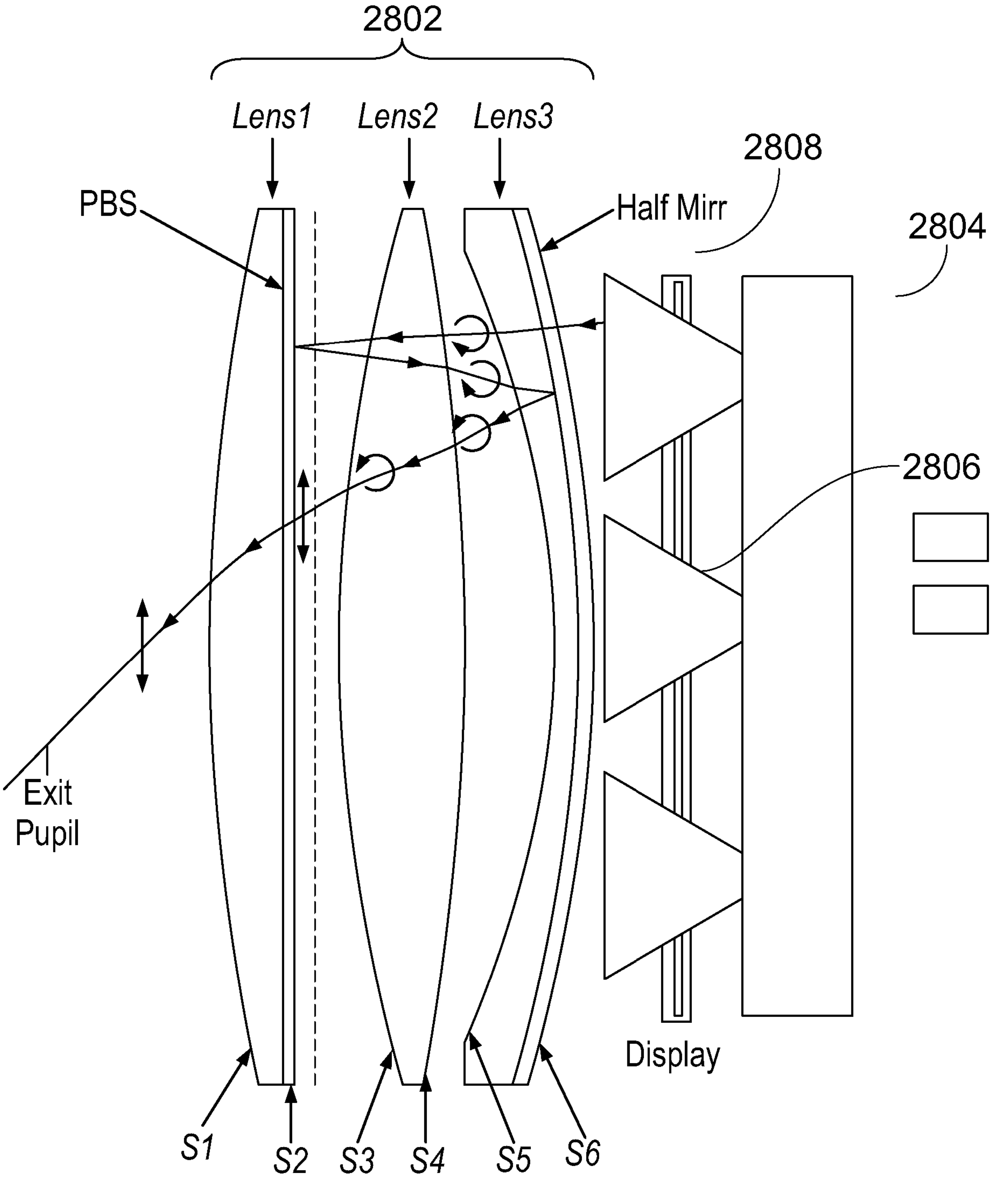
FIG. 28 illustrates an optical design used in mixed reality headsets.

FIG. 28 illustrates a compact lens design 2802 used in mixed reality headsets. The design illustrated in FIG. 28 is similar to the design illustrated in FIG. 27; however beam angles of light 2808 generated from the backlight 2804 and transmitted through the display 2806 are illustrated in FIG. 28. Traditional backlight systems, such as illustrated in FIG. 28, generate beam angles of approximately 120°, which is approximately 60° on either side of a maximum generated near the center of the beam. Such beam angles generate a lot of stray light within the stack of lenses because much of the light directed into the first lens of the stack is off of the desired reception angle. Light received off of the desired angle reflects strongly in undesirable directions causing stray light.

Figure 29:
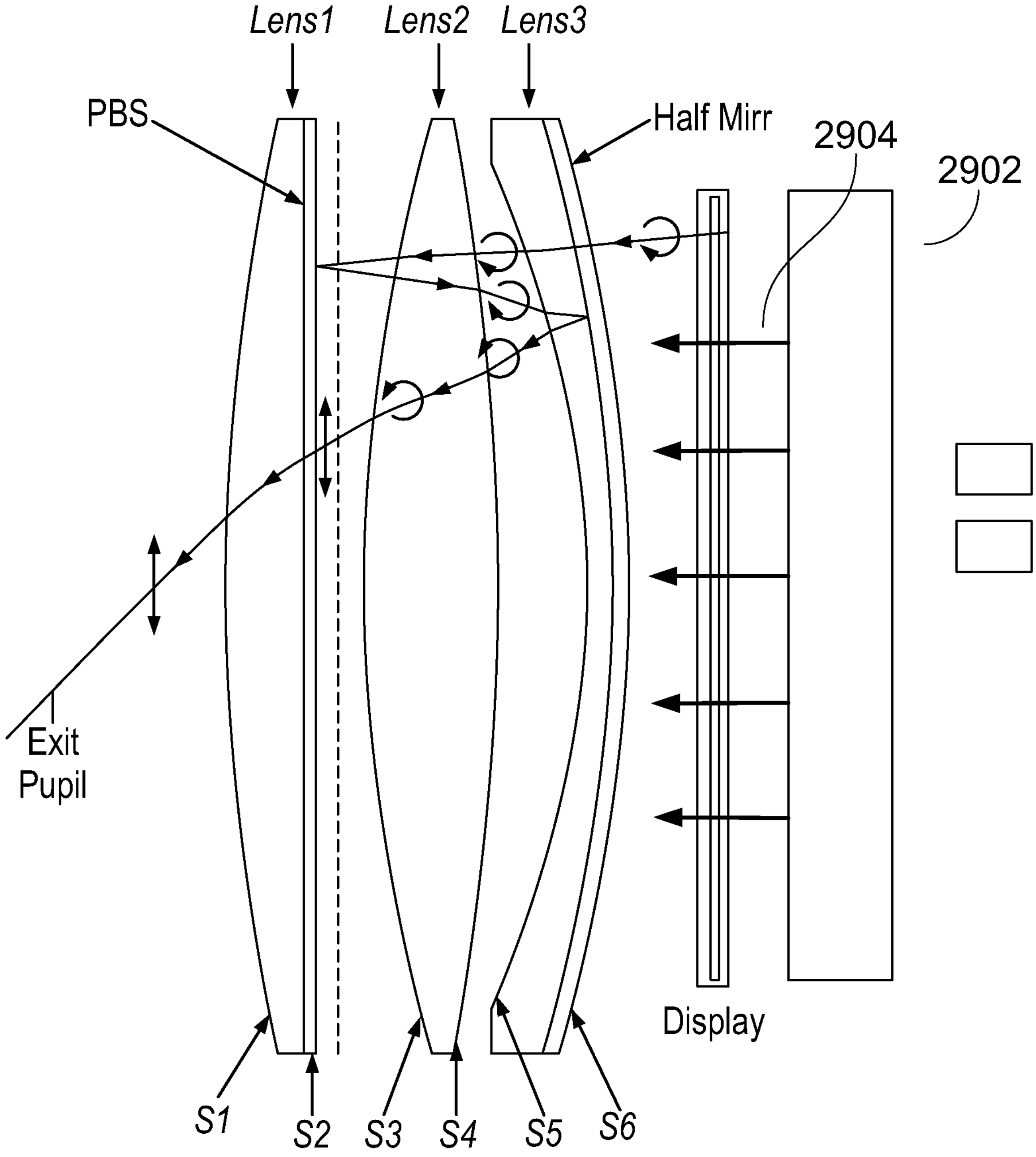
FIG. 29 illustrates an optical system with a backlight in accordance with aspects of the present inventions.

FIG. 29 illustrates an optical system with a backlight in accordance with aspects of the present inventions. Backlight 2902 illustrated in FIG. 29 is a laser based holographic surface backlight that generates highly directed narrow beam angles of light 2904 towards the back of the LCD display (e.g., as described herein elsewhere). The laser light may be despeckled prior to reflecting off of a first holographic surface to generate a line of narrow beam angle light which is then directed to a second holographic surface where the line is expanded into a box, or two dimensional wave front, and the box of light has a narrow beam angle. The narrow beam angle is controlled by two main factors; the beam angle of the despeckled laser light and the design of the holographic surfaces. The beam angle resulting from the laser driven holographic backlight are less than approximately 0.1°. The stray light of the system is dramatically decreased when using such precisely controlled beam angles transmitted into the lens array. Beam angles greater than 0.1° may be used to create desired effects and/or to optimize various compact lens designs. For example, the holographic surfaces may be printed to generate beam angles of 1°, 2°, 3°, 4°, 5°, less than 10°, 15°, 20°, etc.

Figure 30:
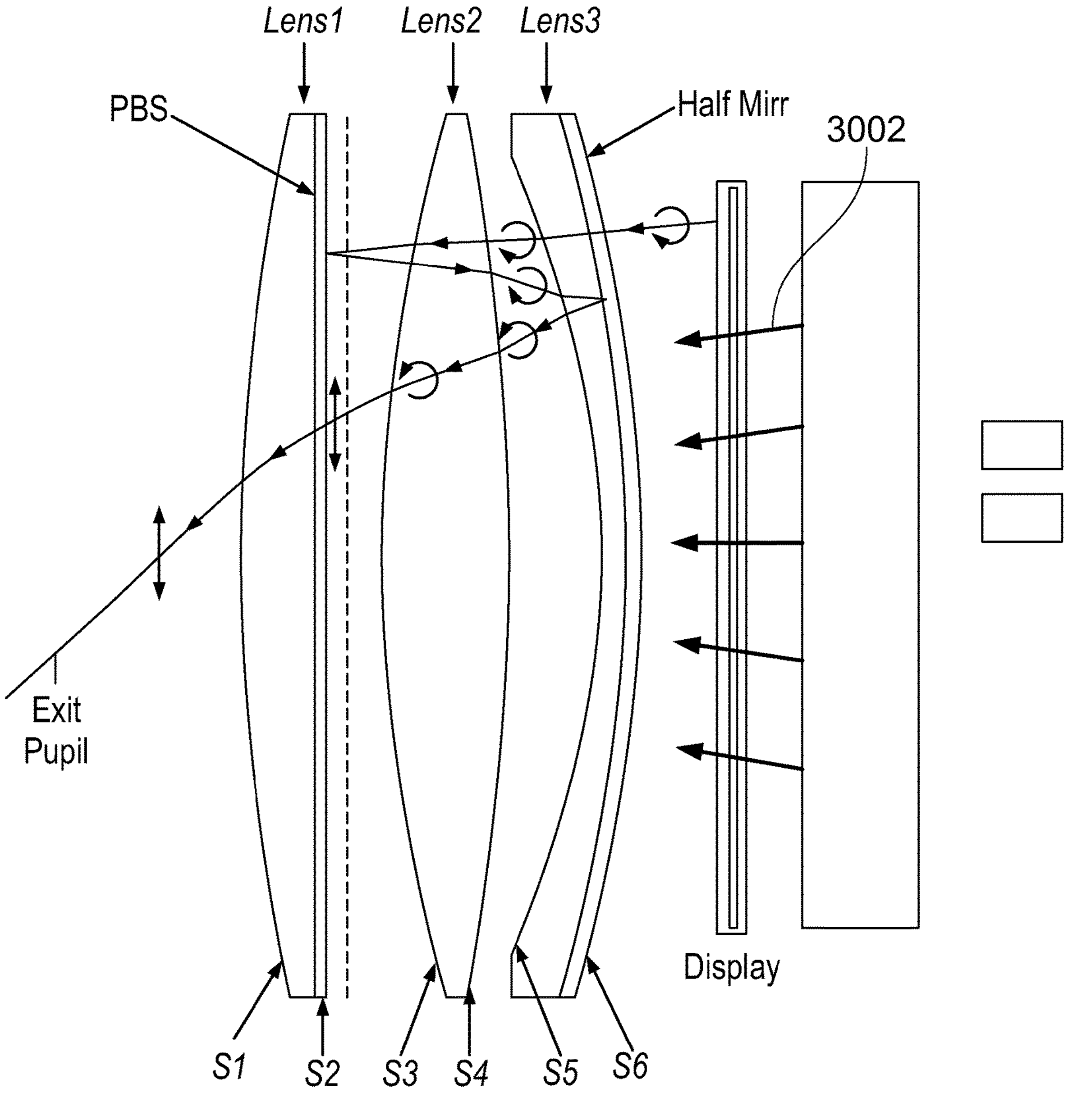
FIG. 30 illustrates an optical system with a backlight in accordance with aspects of the present inventions.

FIG. 30 illustrates an optical system with a backlight in accordance with aspects of the present inventions. Backlight 3002 generates the narrow beam angle of light that has a shaped wavefront. As illustrated the wave front is converging as it approaches the first lens of the lens stack. This configuration may be useful in matching a front surface of a first lens, for example. The holographic surface within backlight 3002 can be patterns to create symmetric or asymmetric or other patterns of light any of which can maintain precisely controlled beam angles of light. This creates flexibility in lens designs as well as further reducing stray light in any of the lens designs.

These and other advantages may be realized in accordance with the specific embodiments described as well as other variations. It is to be understood that the above description is intended to be illustrative, and not restrictive. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled.

Although the invention has been explained in relation to its preferred embodiment, it is to be understood that many other possible modifications and variations can be made without departing from the spirit and scope of the invention.

These and other advantages may be realized in accordance with the specific embodiments described as well as other variations. It is to be understood that the above description is intended to be illustrative, and not restrictive. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled.

What is claimed is:

1. A lighting system, comprising:

a laser light source configured to transmit laser light into a collimator and expander optical system to output a column of light;

a first waveguide with at least one first holographic surface configured to receive the column of light, wherein the at least one first holographic surface is configured to reflect the column of light out of the first waveguide as a line of light;

a second waveguide with at least one second holographic surface configured to receive the line of light, wherein the second holographic surface is configured to reflect the line of light as a two-dimensional plane of light; and an image display configured to receive the two-dimensional plane of light and convert the two-dimensional plane of light into an image.

2. The lighting system of claim 1, further comprising a de-speckler system configured to de-speckle the laser light before it is transmitted to the collimator and expander optical system.

3. The lighting system of claim 1, wherein the image display is an LCD display and the two-dimensional plane of light is arranged as a backlight for the LCD display.

4. The lighting system of claim 1, wherein the image display is a reflective display and the two-dimensional plane of light is arranged as a front light for the reflective display.

5. An XR display system, comprising:

a laser light source configured to illuminate a holographic surface to generate a plane of light; and an image display configured to receive the plane of light and convert the plane of light into image light, wherein the image light is convergent on an eye-box of the XR display system.

6. The XR display system of claim 5, wherein the image display is an LCD display and the plane of light is configured to backlight the LCD display.

7. The XR display system of claim 5, wherein the image display is a reflective display and the plane of light is configured to front light the reflective display.

8. The XR display system of claim 5, further comprising a head mounting system to arrange the eye-box to be positioned in front of a user's eye.

9. An XR helmet, comprising:

a backlit display system to generate image light;

a backlight comprising a holographic surface positioned to reflect coherent light and configured to backlight the backlit display system;

a combiner configured to reflect the image light towards an eye of a user; and a mechanism configured to move a position of the combiner in at least one of first position wherein the user sees XR content or a second position wherein the combiner is not in front of the user's eye.

* * * * *